(12) United States Patent
Yamakoshi et al.

(10) Patent No.: US 11,300,532 B2
(45) Date of Patent: Apr. 12, 2022

(54) PARTICULATE MATTER DETECTION SYSTEM

(71) Applicant: DENSO CORPORATION, Kariya (JP)

(72) Inventors: Kota Yamakoshi, Kariya (JP); Shingo Nakata, Kariya (JP); Shusaku Yamamura, Kariya (JP)

(73) Assignee: DENSO CORPORATION, Kariya (JP)

( * ) Notice: Subject to any disclaimer, the term of this patent is extended or adjusted under 35 U.S.C. 154(b) by 237 days.

(21) Appl. No.: 16/682,078

(22) Filed: Nov. 13, 2019

(65) Prior Publication Data

US 2020/0080953 A1 Mar. 12, 2020

Related U.S. Application Data

(63) Continuation of application No. PCT/JP2018/018866, filed on May 16, 2018.

(30) Foreign Application Priority Data

May 26, 2017 (JP) .............................. JP2017-104788
Mar. 12, 2018 (JP) .............................. JP2018-044496

(51) Int. Cl.
*G01M 15/10* (2006.01)
*G01N 27/04* (2006.01)
*F01N 13/00* (2010.01)

(52) U.S. Cl.
CPC ......... *G01N 27/043* (2013.01); *F01N 13/008* (2013.01); *G01M 15/102* (2013.01); *F01N 2560/05* (2013.01)

(58) Field of Classification Search
CPC . G01M 15/102; G01N 27/043; F01N 2560/05
See application file for complete search history.

(56) References Cited

U.S. PATENT DOCUMENTS

| | | | | |
|---|---|---|---|---|
| 2011/0283773 A1* | 11/2011 | Suzuki | ............... | G01N 15/0656 73/25.05 |
| 2012/0059598 A1* | 3/2012 | Yokoi | ................ | G01N 15/0656 702/24 |
| 2012/0103058 A1* | 5/2012 | Maeda | ............... | G01N 15/0656 73/23.33 |
| 2020/0158617 A1* | 5/2020 | Oh | ......................... | G01N 21/09 |

FOREIGN PATENT DOCUMENTS

| | | |
|---|---|---|
| DE | 10 2012 001 044 A1 | 7/2013 |
| JP | 2651051 | 5/1997 |
| JP | 2885417 | 2/1999 |
| JP | 2012-13639 | 1/2012 |
| JP | 2012-37369 | 2/2012 |

\* cited by examiner

*Primary Examiner* — Eric S. McCall
(74) *Attorney, Agent, or Firm* — Nixon & Vanderhye P.C.

(57) ABSTRACT

A particulate matter detection system detects a particulate matter in exhaust gas. The particulate matter detection system includes: a particulate matter detection sensor in which at least one detection portion is provided, the at least one detection portion including at least one pair of multiple electrodes and a deposition surface which is interposed between the pair of electrodes and which the particulate matter is deposited on; a capacitor connected to the at least one detection portion in series; a power supply configured to apply a direct voltage to a series body including the at least one detection portion and the capacitor; and a voltage measurement portion configured to measure a voltage of the capacitor.

20 Claims, 46 Drawing Sheets

PARTICULATE MATTER DETECTION SYSTEM

CROSS REFERENCE TO RELATED APPLICATIONS

The present application is a continuation application of International Patent Application No. PCT/JP2018/018866 filed on May 16, 2018, which designated the U.S. and claims the benefit of priority from Japanese Patent Application No. 2017-104788 filed on May 26, 2017, and Japanese Patent Application No. 2018-044496 filed on Mar. 12, 2018. The entire disclosures of all of the above applications are incorporated herein by reference.

TECHNICAL FIELD

The present disclosure relates to a particulate matter detection system for detecting a particulate matter in exhaust gas.

BACKGROUND

A particulate matter detection system for detecting a particulate matter (hereinafter, may be referred to as a PM detection system) in exhaust gas has a configuration including a pair of electrodes and a detection portion that is formed between the pair of electrodes and has a deposition surface on which the particulate matter is deposited.

SUMMARY

A particulate matter detection system may detect the particulate matter in the exhaust gas. The particulate matter detection system may include a particulate matter detection sensor in which at least one detection portion is provided, the at least one detection portion including at least one pair of electrodes and a deposition surface which is interposed between the pair of electrodes and which the particulate matter is deposited on; a capacitor connected to the at least one detection portion in series; a power supply that may apply a direct voltage to a series body including the at least one detection portion and the capacitor; and a voltage measurement portion that may measure a voltage of the capacitor.

BRIEF DESCRIPTION OF DRAWINGS

The above object and other objects, features and advantages of the present disclosure will become more apparent from the following detailed description with reference to the attached drawings. In the drawings.

DETAILED DESCRIPTION

Figure 1:
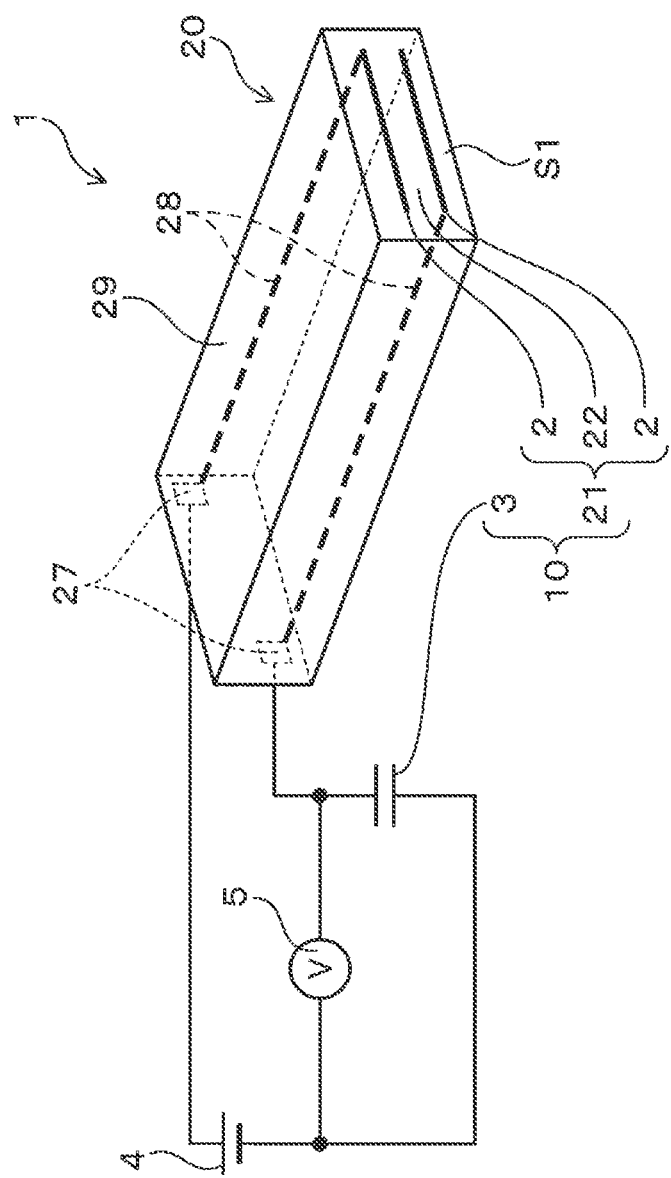
FIG. 1 is a conceptual diagram of a particulate matter detection system in a first embodiment.

A particulate matter detection system for detecting a particulate matter (hereinafter, may be referred to as a PM detection system) in exhaust gas has a configuration including a pair of electrodes and a detection portion that is formed between the pair of electrodes and has a deposition surface on which the particulate matter described above is deposited.

A PM is deposited on the deposition surface, a current path is formed between the pair of electrodes described above due to the PM, and a current flows between these pair of electrodes. The PM detection system described above detects an amount of the PM deposited on the deposition surface, that is, the amount of the PM in the exhaust gas by measuring the current flowing between this pair of electrodes. For example, a current sensor is connected to the electrodes described above, and the current sensor measures the current flowing when the pair of electrodes is conducted by the PM.

The PM detection system described above tends to take a time for detecting the PM. That is, when the detection of the PM starts, the PM is collected on the deposition surface and the current path of the PM is formed between the pair of electrodes. Thereby, a slight current starts to flow between the electrodes. Thereafter, the number of the current paths progressively increases, and the current path gradually increases (see FIG. 57). An increase speed of this current is relatively slow, and it takes a time to reach a value that is measurable by the current sensor. Accordingly, it tends to take a time for detecting the PM.

A resistivity of the PM largely changes depending on an operation state of an engine exhausting the PM, a temperature of the PM, or the like. Therefore, when the resistivity of the PM is different, the value of the current flowing between the pair of electrodes fluctuates even though a deposition amount of the PM (see FIG. 58) is same. Accordingly, a detection accuracy of the PM is low.

An example embodiment provides a particulate matter detection system capable of detecting a PM in a short time and improving a detection accuracy of the PM.

According to a first example embodiment, a particulate matter detection system may detect the particulate matter in the exhaust gas. The particulate matter detection system may include a particulate matter detection sensor in which at least one detection portion is provided, the at least one detection portion including at least one pair of electrodes and a deposition surface which is interposed between the pair of electrodes and which the particulate matter is deposited on; a capacitor connected to the at least one detection portion in series; a power supply that may apply a direct voltage to a series body including the at least one detection portion and the capacitor; and a voltage measurement portion that may measure a voltage of the capacitor.

According to a second reference example embodiment, a particulate matter detection system detects the particulate matter in the exhaust gas. The particulate matter detection system may include a particulate matter detection sensor in which at least one detection portion is provided, the at least one detection portion including at least one pair of electrodes and a deposition surface which is interposed between the pair of electrodes and which the particulate matter is deposited on; a resistor connected to the at least one detection portion in series; a power supply that may apply a direct voltage to a series body including the at least one detection portion and the resistor; and a voltage measurement portion that may measure a voltage drop of the resistor. The voltage drop is generated when the pair of electrodes is conducted by the particulate matter. A resistance value of the resistor is set so that the generated voltage drop is equal to or higher than $1/1000$ of a direct voltage of the power supply.

In the first example embodiment, the capacitor is connected in series to the detection portion. The voltage of the capacitor is measured by the voltage measurement portion described above. Thereby, it may be possible to detect the PM in a short time and also improve the detection accuracy of the PM. That is, in the configuration described above, the path of the current is formed by the PM. Even when the current slightly flows, charge is stored in the capacitor and the voltage of the capacitor suddenly increases. Therefore, it may be possible to detect that the pair of electrodes is conducted by the PM, in a short time. Even when the resistivity of the PM varies, the voltage of the capacitor largely increases as long as the current flows between the pair of electrodes. Therefore, it may be possible to detect with high accuracy that the pair of electrodes is conducted by the PM without being largely affected by the resistivity of the PM.

In the second reference example embodiment, the resistor is connected in series to the detection portion. The voltage drop of this resistor is measured by the voltage measurement portion. The resistance value of the resistor is set so that the voltage drop described above is equal to or higher than $1/1000$ of the direct voltage of the power supply. That is, the resistor having the large resistance is connected in series to the detection portion. Thereby, it may be possible to detect the PM in a short time and also improve the detection accuracy of the PM. That is, in the configuration described above, even when one current path of the PM is formed between the pair of electrodes and the slight current flows, it may be possible to generate the large voltage drop (=RI) in the resistor due to the connection to the large resistor. Therefore, it may be possible to detect that the pair of electrodes is conducted by the PM, in a short time. Even when the resistivity of the PM varies, it may be possible to generate the large voltage drop in the resistor as long as the current flows between the pair of electrodes. Therefore, it may be possible to detect with high accuracy that the pair of electrodes is conducted by PM without being affected by the resistivity of the PM.

As the above, in the aspects described above, it may be possible to provide the particulate matter detection system capable of detecting the PM in a short time and also improving the detection accuracy of the PM.

First Embodiment

Embodiments according to the particulate matter detection system described above will be described with reference to FIGS. 1 to 6. A particulate matter detection system 1 (that is, a PM detection system 1) in the embodiment is utilized for detecting a PM 8 in exhaust gas g (see FIG. 5). As shown in FIG. 1, the PM detection system 1 includes a particulate matter detection sensor 20 (that is, a PM sensor 20), a capacitor 3, a power supply 4, and a voltage measurement portion 5.

A detection portion 21 is formed in the PM sensor 20. The detection portion 21 includes a pair of electrodes 2 and a deposition surface 22 which is interposed between the pair of corresponding electrodes 2 and which the PM 8 is deposited on. The capacitor 3 is connected to the detection portion 21 in series.

The power supply 4 applies a direct voltage to a series body 10 (see FIG. 2 and FIG. 3) including the detection portion 21 and the capacitor 3. The voltage measurement portion 5 is configured to measure a voltage of the capacitor 3.

Figure 5:
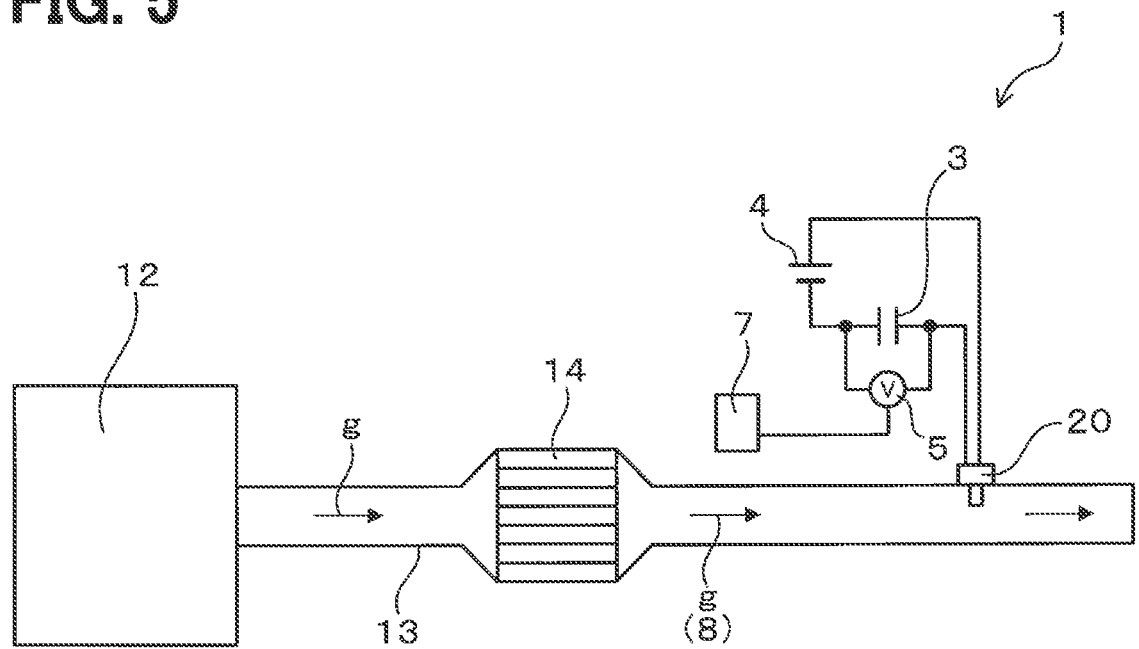
FIG. 5 is an explanatory diagram exemplifying an attachment position of a PM sensor in the first embodiment.

The PM detection system 1 in the embodiment is mounted on a vehicle. As shown in FIG. 5, an exhaust pipe 13 is connected to an engine 12 of the vehicle. A filter 14 and the PM sensor 20 are attached to the exhaust pipe 13. The filter 14 collects the PM 8 in the exhaust gas g. The PM sensor 20 is placed in a downstream side of the exhaust gas g than the filter 14. The capacitor 3 described above or the like is connected to the PM sensor 20. The PM detection system 1 in the embodiment includes a control portion 7. The control portion 7 calculates the amount of the PM 8 in the exhaust gas g based on the voltage measured by the voltage measurement portion 5. It is determined that the filter 14 is broken when this calculated value exceeds a predetermined upper limit value.

More specifically, the PM sensor 20 includes a heater (not shown). The control portion 7 causes the heater described above to heat when detecting the PM 8. Thereby, the PM 8 deposited on the deposition surface 22 is burned to be removed. Thereafter, the heat by the heater is stopped and measurement of the PM 8 is started. It is determined that the filter 14 is broken when the voltage of the capacitor 3 exceeds a predetermined value within a predetermined time after the measurement starts.

As shown in FIG. 1, the PM sensor 20 includes a main portion 29 made of an insulation material, the pair of electrodes 2 embedded in the corresponding main portion 29, a wire 28, and a connection terminal 27. The main portion 29 is formed in a quadrilateral plate shape. The electrodes 2 described above is exposed from an end surface S1 of this main portion 29. The electrodes 2 are electrically connected to the power supply 4 and the capacitor 3 via the wire 28 and the connection terminal 27.

Figure 2:
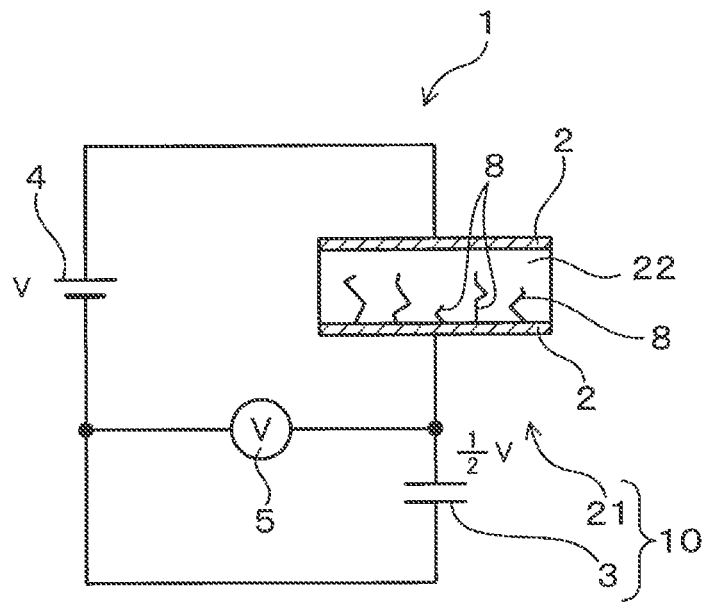
FIG. 2 is a conceptual diagram of the particulate matter detection system in a state where a detection portion is not conducted by a PM in the first embodiment.
Figure 3:
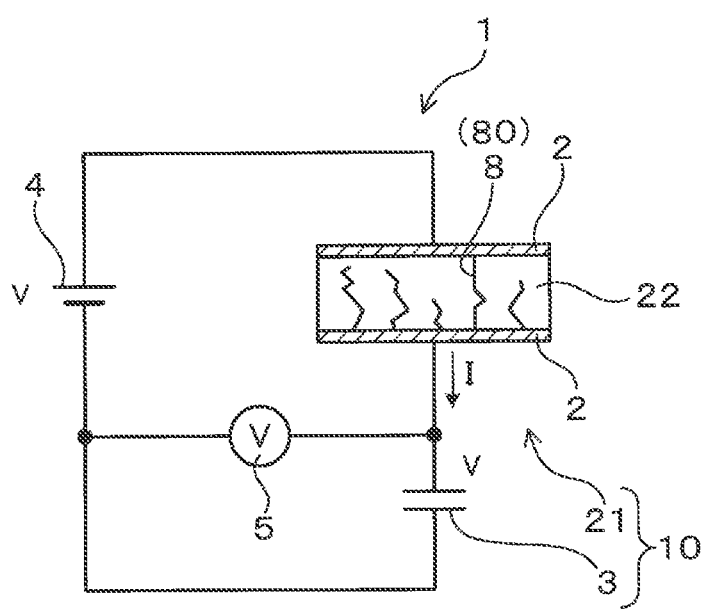
FIG. 3 is a conceptual diagram of the particulate matter detection system in a state where the detection portion is conducted by the PM in the first embodiment.

The PM 8 in the exhaust gas g is slightly charged. Therefore, as shown in FIG. 2, when the voltage is applied between the pair of electrodes 2, an electric field is generated and the PM 8 is collected by the electrodes 2. When many PMs 8 gather, as shown in FIG. 3, the PMs 8 form a current path 80 and the PMs 8 electrically connect the pair of electrodes 2.

In the embodiment, a capacitance between the pair of electrodes 2 and a capacitance of the capacitor 3 are set to be equal. Therefore, as shown in FIG. 2, when the current path 80 of the PM 8 is not formed between the electrodes 2, a voltage applied to the capacitor 3 becomes ½ of a voltage V of the power supply 4. As shown in FIG. 3, when the current path 80 of the PM 8 is formed between the electrodes 2, a current I flows between the pair of electrodes 2 and a potential difference between the pair of electrodes 2 becomes substantially 0. Therefore, the voltage of the capacitor 3 is substantially equal to the voltage V of the power supply 4.

Figure 4:
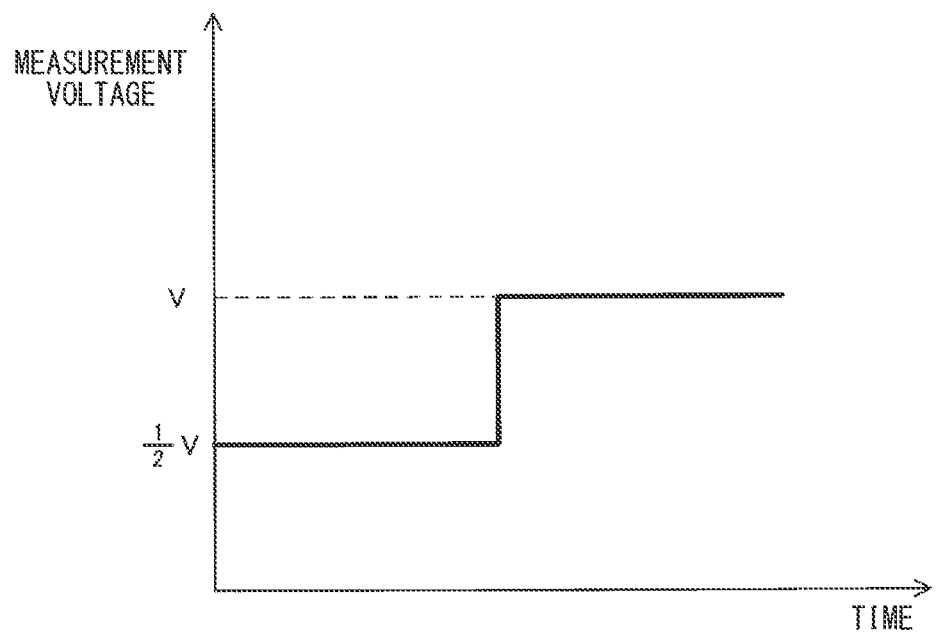
FIG. 4 is a graph showing a time change of a voltage of a capacitor in the first embodiment.

FIG. 4 shows a relationship between the deposition amount of the PM 8 and the voltage of the capacitor 3. As shown in FIG. 4, before the current path 80 of the PM 8 is formed between the pair of electrodes 2, the voltage of the capacitor 3 is ½V. After the current path 80 of the PM 8 is formed between the pair of electrodes 2, the voltage of the capacitor 3 suddenly increases and becomes V. In the embodiment, when the voltage of the capacitor 3 changes from ½V to V within the predetermined time after the detection of the PM 8 starts, it is determined that the filter 14 (see FIG. 5) is broken since concentration of the PM 8 in the exhaust gas g is high.

The operation effect of the embodiment will be described. In the embodiment, as shown in FIG. 2 and FIG. 3, the capacitor 3 is connected to the detection portion 21 in series. The voltage of the capacitor 3 is measured by the voltage measurement portion 5. Thereby, it may be possible to detect the PM 8 in a short time and also improve the detection accuracy of the PM 8. That is, in the configuration described above, even when the PM 8 forms one current path 80 between the pair of electrodes 2 and the current I slightly flows, the charge is stored in the capacitor 3 and the voltage of the capacitor 3 suddenly increases. Therefore, it may be possible to detect in a short time that the pair of electrodes 2 is conducted by the PM 8. Even when the resistivity of the PM 8 varies, the voltage of the capacitor 3 largely increases as long as the current I flows between the pair of electrodes 2. Therefore, it may be possible to detect with high accuracy that the pair of electrodes 2 is conducted by the PM 8 without being affected by the resistivity of the PM 8.

Figure 56:
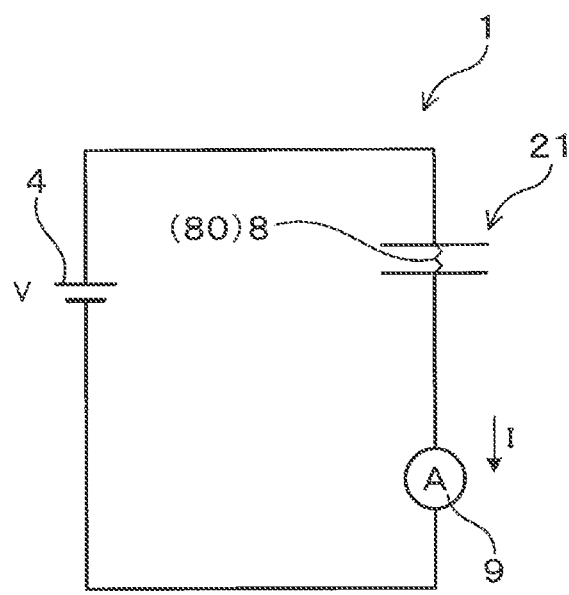
FIG. 56 is a conceptual diagram of the particulate matter detection system in a first comparative embodiment.
Figure 57:
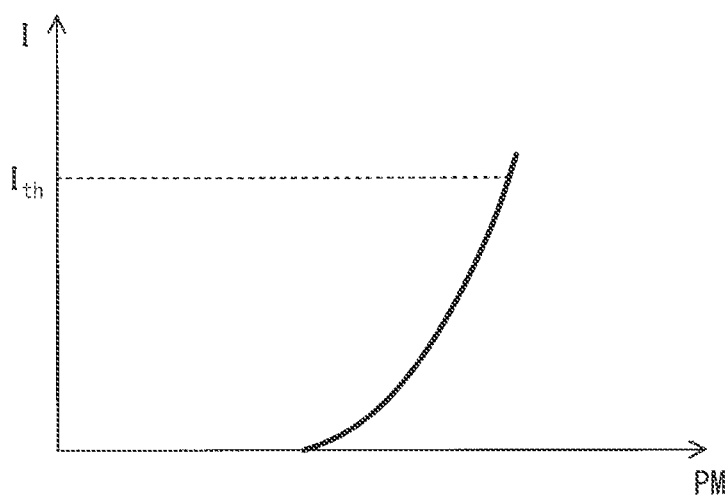
FIG. 57 is a graph showing a relationship between the deposition amount of the PM and a measurement current in the first comparative embodiment.

In the PM detection system 1 as one example, as shown in FIG. 56, a current sensor 9 is connected to the detection portion 21 and the current I flowing in the detection portion 21 is measured by utilizing this current sensor 9. In this case, the relationship between the deposition amount of the PM 8 and the measurement current is as shown in a graph of FIG. 57. That is, when the PM 8 is deposited, first, one current path 80 (see FIG. 3) of the PM 8 is formed between the pair of electrodes 2 and the current I starts to slightly flow. The deposition amount of the PM 8 increases. As the number of the current paths 80 increases and thereby the current I gradually increases. Therefore, as shown in FIG. 57, a current value does not suddenly increase but gradually increases. Accordingly, it takes a long time for the current value to increase to a value that is measurable by the current sensor 9. Therefore, it is not detectable in a short time that the filter 14 (see FIG. 5) is broken. On the other hand, when the voltage of the capacitor 3 is measured as the embodiment, the current path 80 of the PM 8 is slightly formed between the pair of electrodes 2 and the voltage of the capacitor 3 suddenly increases (see FIG. 4). Therefore, it may be possible to detect in a short time that the pair of electrodes 2 is conducted by the PM 8. Accordingly, it may be possible to detect in a short time that the filter 14 is broken.

Figure 58:
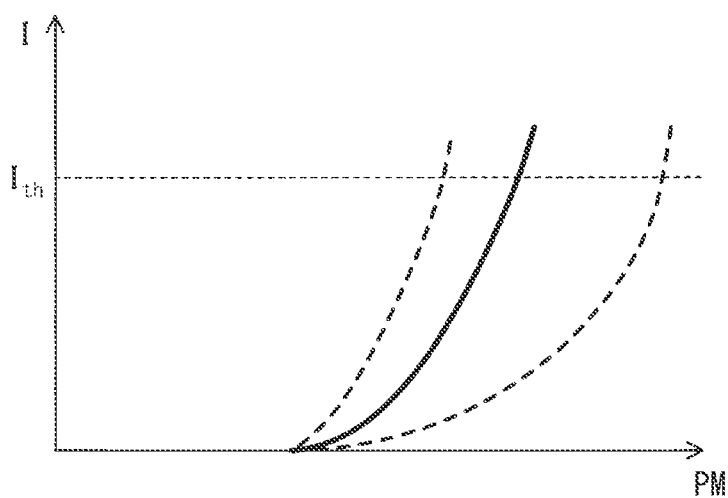
FIG. 58 is a graph showing a relationship between the deposition amount of the PM and the measurement current for each PM having a different resistivity in the first comparative embodiment.

When the current I is measured as the one example, it may be difficult to improve the detection accuracy of the PM 8. That is, the resistivity of the PM 8 largely changes depending on a state of the engine 12 (see FIG. 5), the temperature of the PM 8, or the like. Therefore, when the amount of the exhausted PM 8 is the same and the resistivity is different, the value of the current I changes. Accordingly, as shown in FIG. 58, the current value largely changes depending on the resistivity of the PM 8. It may be difficult to accurately measure the amount of the PM 8 in the exhaust gas g. On the other hand, in a case where the capacitor 3 is utilized as the embodiment, even when the resistivity of the PM 8 is different, the voltage of the capacitor 3 suddenly increases as long as the pair of electrodes 2 is conducted by the PM 8. Therefore, it may be possible to accurately measure the amount of the PM 8 in the exhaust gas g without being largely affected by the resistivity of the PM 8.

In the embodiment, as shown in FIG. 1, the PM sensor 20 and the capacitor 3 are separately formed. As described later, the capacitor 3 is formable in the PM sensor 20 (see FIG. 10). However, in this case, difficulties such as adjustment of the capacitance of the capacitor 3 may be difficult may occur. However, when the PM sensor 20 and the capacitor 3 are separately formed as the embodiment, it may be possible to utilize the capacitor 3 having a desired capacitance.

As the above, in the embodiment described above, it may be possible to provide the particulate matter detection system capable of detecting the PM in a short time and also improving the detection accuracy of the PM.

Figure 6:
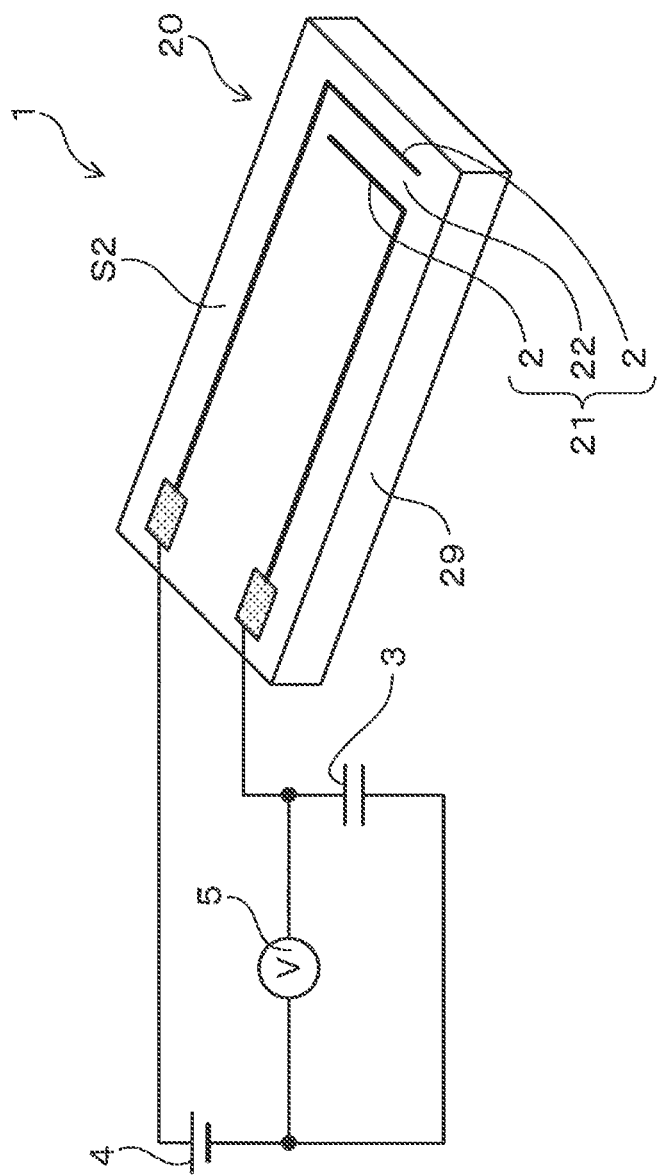
FIG. 6 is a conceptual diagram of the particulate matter detection system in which the configuration of the PM sensor is changed in the first embodiment.

In the embodiment, as shown in FIG. 1, the electrodes 2 are placed in the end surface S1 of the main portion 29 of the PM sensor 20. However, the present disclosure is not limited to this. That is, as shown in FIG. 6, the electrodes 2 may be formed in a main surface S2 of the main portion 29.

Among reference numerals used in the subsequent embodiments, the same reference numerals as those used in the first embodiment represent the same components as those in the first embodiment, unless otherwise indicated.

Reference Second Embodiment

Figure 7:
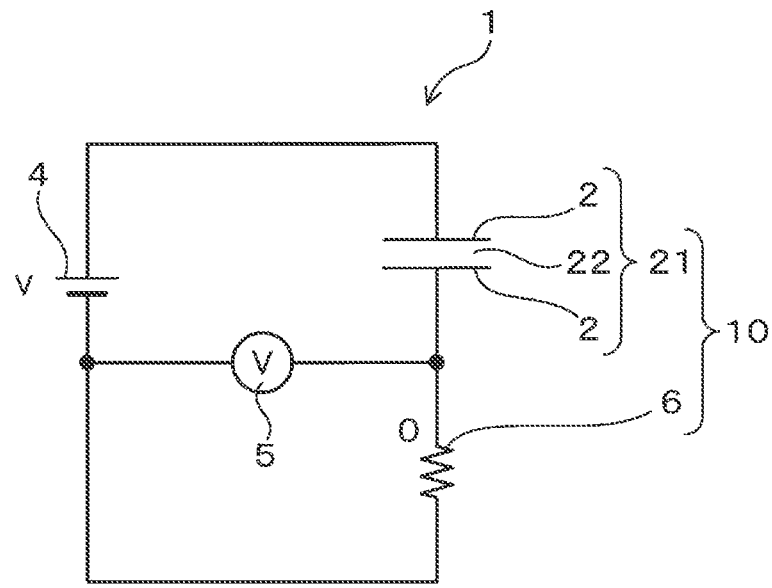
FIG. 7 is a conceptual diagram of the particulate matter detection system in the state where the detection portion is not conducted by the PM in a reference second embodiment.

The embodiment corresponds to an example in which the configuration of the series body 10 is changed. As shown in FIG. 7, in the embodiment, a resistor 6 is connected in series to the detection portion 21. A voltage drop of this resistor 6 is measured by the voltage measurement portion 5. A resistance value of the resistor 6 is set so that the voltage drop generated when the pair of electrodes 2 is conducted by the PM 8 is equal to or more than ¹⁄₁₀₀₀ of the direct voltage V of the power supply 4.

Figure 8:
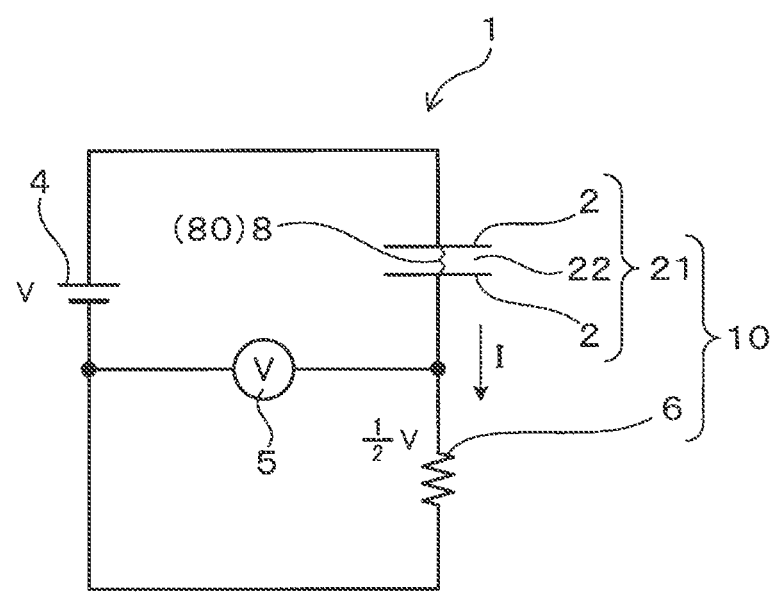
FIG. 8 is a conceptual diagram of the particulate matter detection system in the state where the detection portion is conducted by the PM in the reference second embodiment.

As shown in FIG. 7, when the current path 80 is not formed between the pair of electrodes 2, the current I does not flow. Therefore, the voltage drop of the resistor 6 becomes 0. As shown in FIG. 8, when one current path 80 is formed between the pair of electrodes 2, the current I flows and the voltage drop is generated in the resistor 6. The resistor 6 has the relatively large resistance value. Therefore, the large voltage drop is generated even when the current I is small. For example, when the resistance value of the resistor 6 is set to be substantially equal to the one current path 80, the voltage drop of the resistor 6 becomes V/2.

Figure 9:
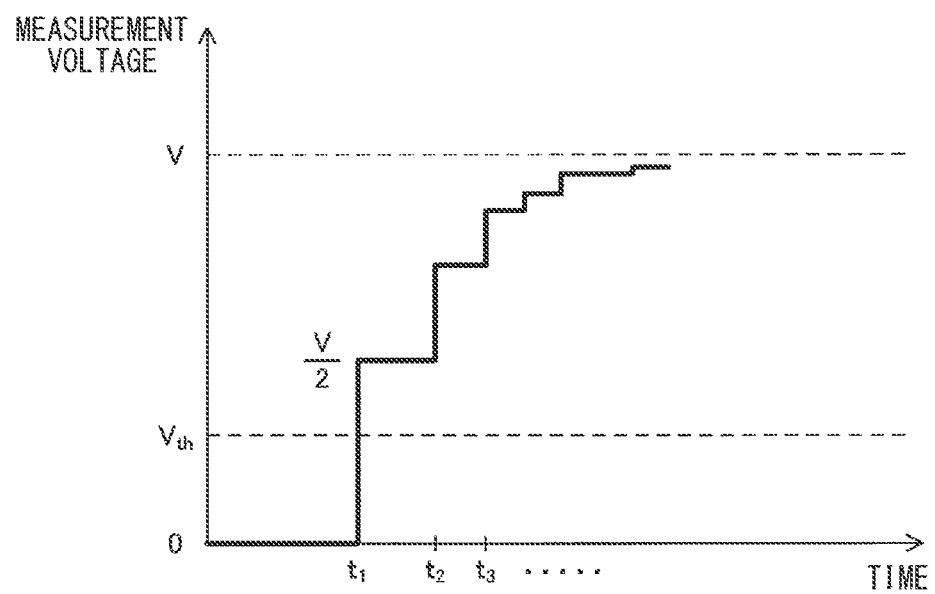
FIG. 9 is a graph showing the time change of the voltage drop of a resistor in the reference second embodiment.

As shown in FIG. 9, when the current path 80 is not formed between the pair of electrodes 2, the voltage drop of the resistor 6 is 0. However, when the one current path 80 is formed at a time $t_1$, the voltage drop of V/2 is generated. In the embodiment, when the voltage drop exceeds a threshold $V_{th}$ within the predetermined time after the measurement of the PM 8 starts, it is determined that the filter 14 (FIG. 5) is broken.

When the capacitor 3 is utilized as the first embodiment, the voltage of the capacitor 3 largely increases only once (see FIG. 4). This is because the charge is stored in the capacitor 3 and the voltage of the capacitor 3 is balanced with the power supply voltage V when the one current path 80 is formed in the detection portion 21. On the other hand, when the resistor 6 is utilized as the embodiment, the voltage changes stepwise in multiple times, as shown in FIG. 9. That is, after the first current path 80 is formed at the time $t_1$ and the voltage drop becomes V/2, the second current path 80 is formed at a time $t_2$. Then, the current I flowing in the detection portion 21 increases, and the voltage drop of the resistor 6 increases. When the third current path 80 is formed at a time $t_3$, the current I of the detection portion 21 further increases, and the voltage drop of the resistor 6 further increases. In such a manner, as the number of the current paths 80 formed in the detection portion 21 increases, the current I increases. The voltage drop of the resistor 6 increases stepwise so as to approach the voltage V of the power supply 4.

In the embodiment, the resistance value of the resistor 6 is set so that the voltage drop of the power supply 4 when the detection portion 21 is conducted by the PM 8 is equal to or more than 1/1000 of the voltage V. More specifically, in the embodiment, the resistance value of the resistor 6 is set so that the voltage drop of the power supply 4 when the detection portion 21 is conducted by the one current path 80 is equal to or more than 1/1000 of the voltage V. The voltage V of the power supply 4 is preferably set to be, for example, equal to or more than 40 (V). It may be possible to surely detect the voltage by the voltage measurement portion 5 when the voltage drop of the resistor 6 is equal to or more than 1/1000 of the power supply voltage V. A possibility that the voltage is not detectable by the voltage measurement portion 5 may be considered when the voltage drop is less than V/1000.

The operation effect of the embodiment will be described. In the configuration described above, it may be possible to detect the PM 8 in a short time and also improve the detection accuracy of the PM 8. That is, in the configuration described above, even when the one current path 80 of the PM 8 is formed between the pair of electrodes 2 and the slight current I flows, it may be possible to cause the large voltage drop (=RI) in the resistor 6 due to connection to the large resistor 6. Therefore, it may be possible to detect that the pair of electrodes 2 is conducted by the PM 8, in a short time. Even when the resistivity of the PM 8 varies, it may be possible to cause the large voltage drop in the resistor 6 as long as the current I flows between the pair of electrodes 2. Therefore, it may be possible to detect with high accuracy that the pair of electrodes 2 is conducted by the PM 8 without being affected by the resistivity of the PM 8. In addition, the second embodiment has the similar configurations and operation effects with in the first embodiment.

Third Embodiment

Figure 10:
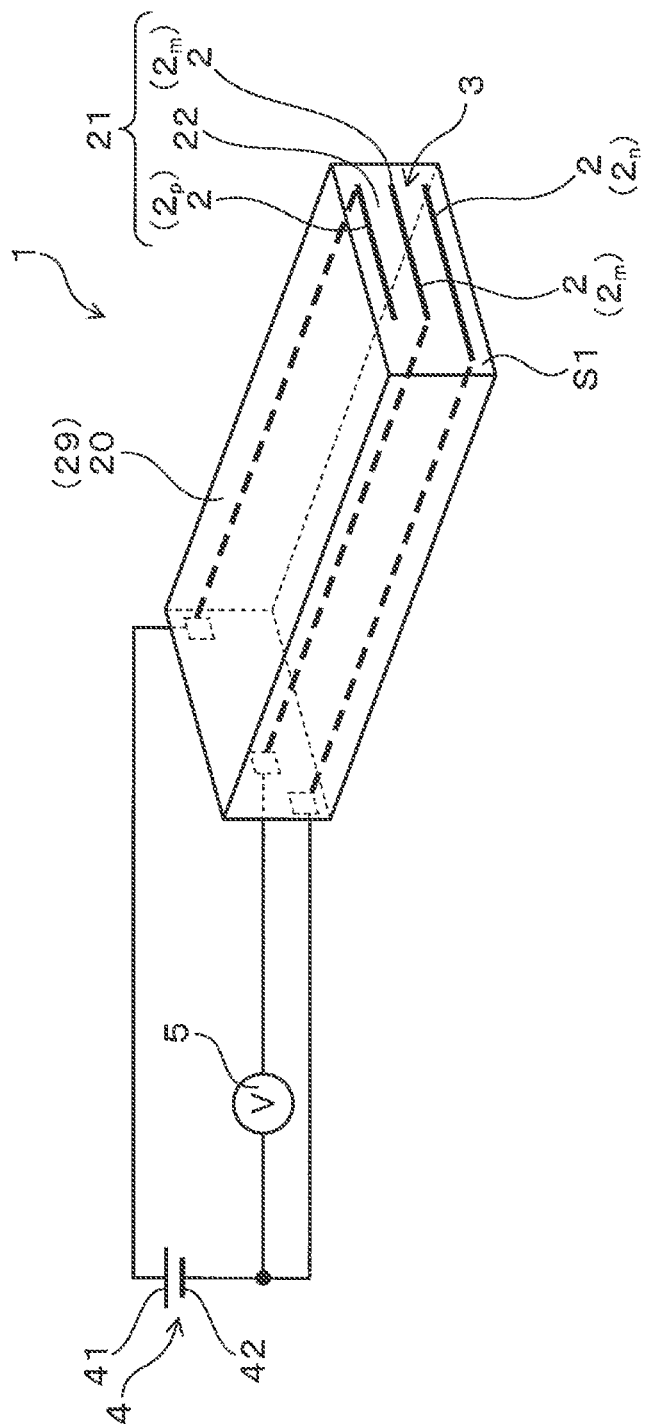
FIG. 10 is a conceptual diagram of the particulate matter detection system in a third embodiment.

The embodiment corresponds to an example in which the configuration of the PM sensor 20 is changed. As shown in FIG. 10, in the embodiment, the multiple electrodes 2 are formed so as to be arranged on the PM sensor 20 at a predetermined distance. Both of the detection portion 21 and the capacitor 3 are formed by these multiple electrodes 2.

As shown in FIG. 10, the electrodes 2 includes a positive electrode $2p$, a negative electrode $2n$, and a measurement electrode $2m$ These three electrodes 2 are exposed from the end surface S1 of the main portion 29 of the PM sensor 20. The positive electrode $2p$ is connected to a positive terminal 41 of the power supply 4. The negative electrode $2n$ is connected to a negative terminal 42 of the power supply 4. The detection portion 21 is formed by utilizing the positive electrode $2p$ and the measurement electrode $2m$. The capacitor 3 is formed by utilizing the measurement electrode $2m$ and the negative electrode $2n$. The voltage measurement portion 5 measures the voltage of this capacitor 3.

Figure 11:
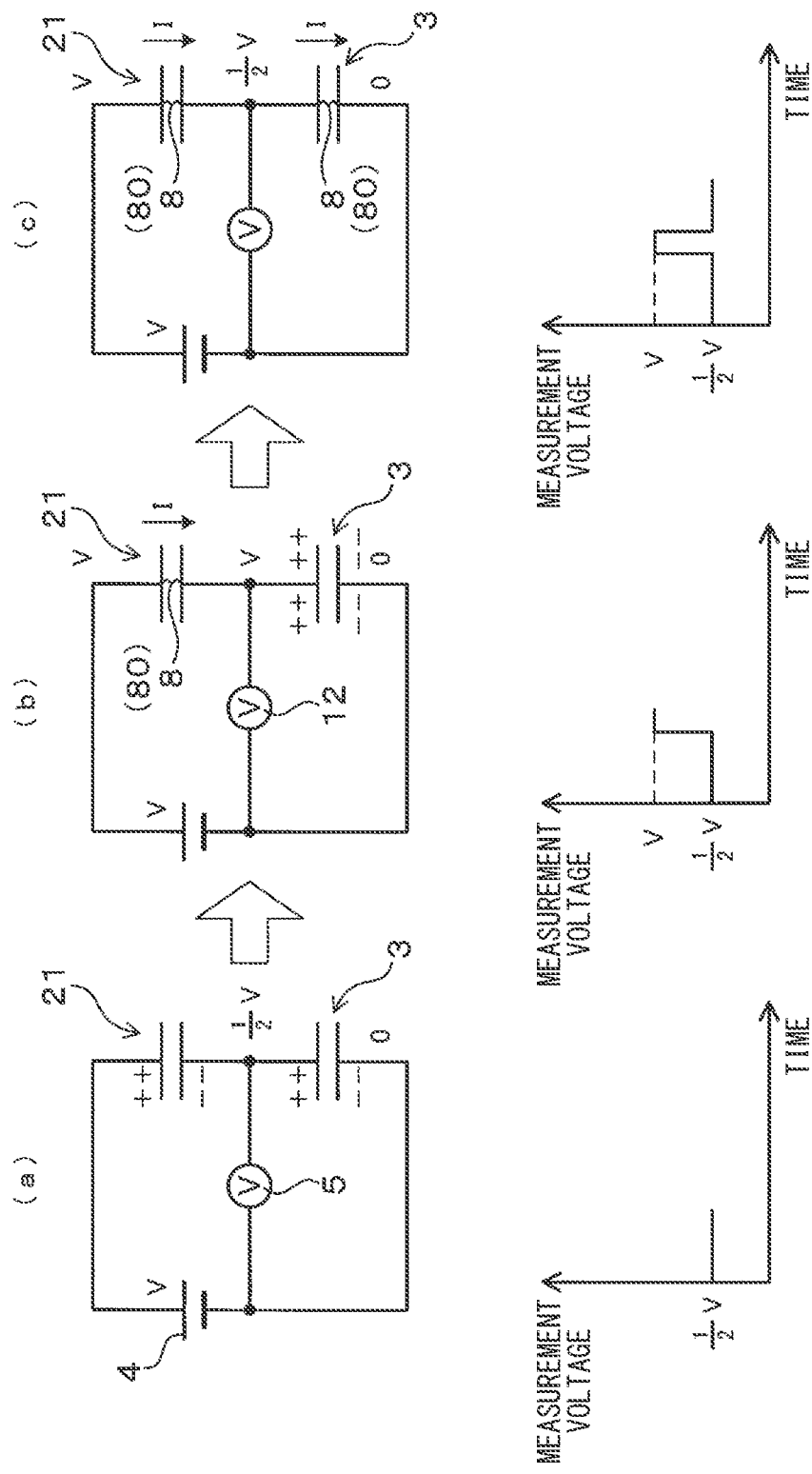
FIG. 11 is a conceptual diagram of the particulate matter detection system and a graph showing the time change of the measurement voltage in a case of (a) The PM is not deposited, a case of (b) The only one detection portion is conducted by the PM, and a case of (c) Both of the detection portions are conducted by the PM, in the third embodiment.

In the embodiment, the PM 8 is deposited between the pair of electrodes 2 ($2m$, $2n$) configuring the capacitor 3 and is deposited on the surface of the electrodes 2. The capacitance of the detection portion 21 and the capacitance of the capacitor 3 are set to be substantially equal. Therefore, as shown in FIG. 11 (a), in a state where the PM 8 is not deposited on the detection portion 21 and the capacitor 3, the voltages of the detection portion 21 and the capacitor 3 are substantially equal. Each of the voltages become ½ of the voltage V of the power supply 4. Accordingly, the voltage of the capacitor 3 becomes V/2 while the PM 8 is not deposited on the detection portion 21 and the capacitor 3.

As shown in FIG. 11(b), the pair of electrodes 2 ($2p$, $2m$) constituting the detection portion 21 are conducted by the PM 8, the potential difference of the detection portion 21 becomes 0. Therefore, the voltage of the capacitor 3 suddenly increases to become V. It may be possible to detect that the PM 8 is deposited in the detection portion 21 by detecting the change of this voltage.

Thereafter, in a little while, as shown in FIG. 11(c), the pair of electrodes 2 ($2m$, $2p$) configuring the capacitor 3 are conducted by the PM 8. Then, the resistance values of the current paths 80 of the PMs 8 are substantially equal, the current paths 80 being formed in each of the detection portion 21 and the capacitor 3. Therefore, these voltage drops of the current paths 80 are equal to each other. Accordingly, the voltage of the capacitor 3 decreases to V/2.

When the voltage of the capacitor 3 largely changes twice within the predetermined time, that is, for example, when the voltage of the capacitor 3 increases from V/2 to V as shown in FIG. 11(b) and thereafter, decreases to V/2 as shown in FIG. 11(c), the control portion 7 (see FIG. 5) in the embodiment determines that the exhaust gas g includes the many PMs 8 and the filter 14 is broken.

In a case of FIG. 11, the detection portion 21 is conducted on first, and thereafter the capacitor 3 is conducted. However, the reversed case may occur. In this case, the change of the voltage is reversed. That is, when the capacitor 3 is conducted on first, the voltage of the capacitor 3 decreases from V/2 to 0. Thereafter, when the detection portion 21 is conducted, the voltage of the capacitor 3 increases from 0 to V/2.

The operation effect of the embodiment will be described. As shown in FIG. 10 in the embodiment, both of the detection portion 21 and the capacitor 3 are formed by utilizing the electrodes 2 placed in the PM sensor 20. Therefore, it may be possible to reduce the number of the components and reduce a manufacturing cost of the PM detection system 1.

In the embodiment, the PM 8 is deposited between the pair of electrodes 2 ($2m$, $2n$) configuring the capacitor 3 and is deposited on the surface of the electrodes 2. That is, when the PM 8 deposits on the capacitor 3, the current flows between the pair of electrodes 2 by the PM 8. Therefore, it may be possible to largely change the voltage of the capacitor 3 in each of a case where the detection portion 21 is conducted by the PM 8 and a case where the capacitor 3 is conducted by the PM 8. Accordingly, it may be possible to cause the change of the voltage multiple times. It may be possible to further surely detect that the amount of the PM 8 in the exhaust gas g is high. In addition, the third embodiment has the similar configurations and operation effects with in the first embodiment.

Figure 12:
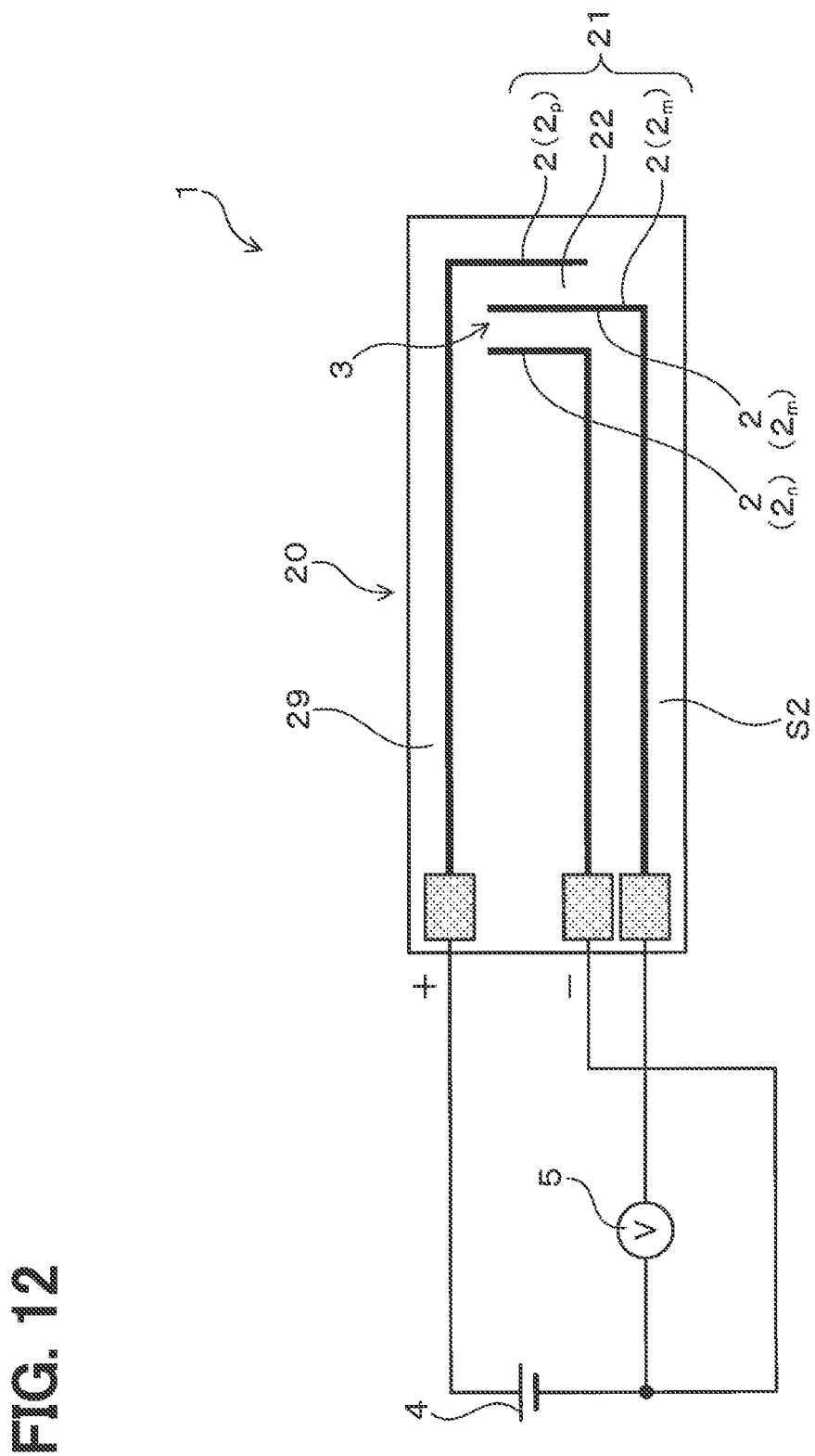
FIG. 12 is a conceptual diagram of the particulate matter detection system in which the configuration of the PM sensor is changed in the third embodiment.

In the embodiment, as shown in FIG. 10, the electrodes 2 are formed on the end surface S1 of the main portion 29 of the PM sensor 20. However, the present disclosure is not limited to this. That is, as shown in FIG. 12, the multiple electrodes 2 may be formed on the main surface S2 of the main portion 29, the detection portion 21 and the capacitor 3 may be configured by utilizing these multiple electrodes 2.

Fourth Embodiment

Figure 13:
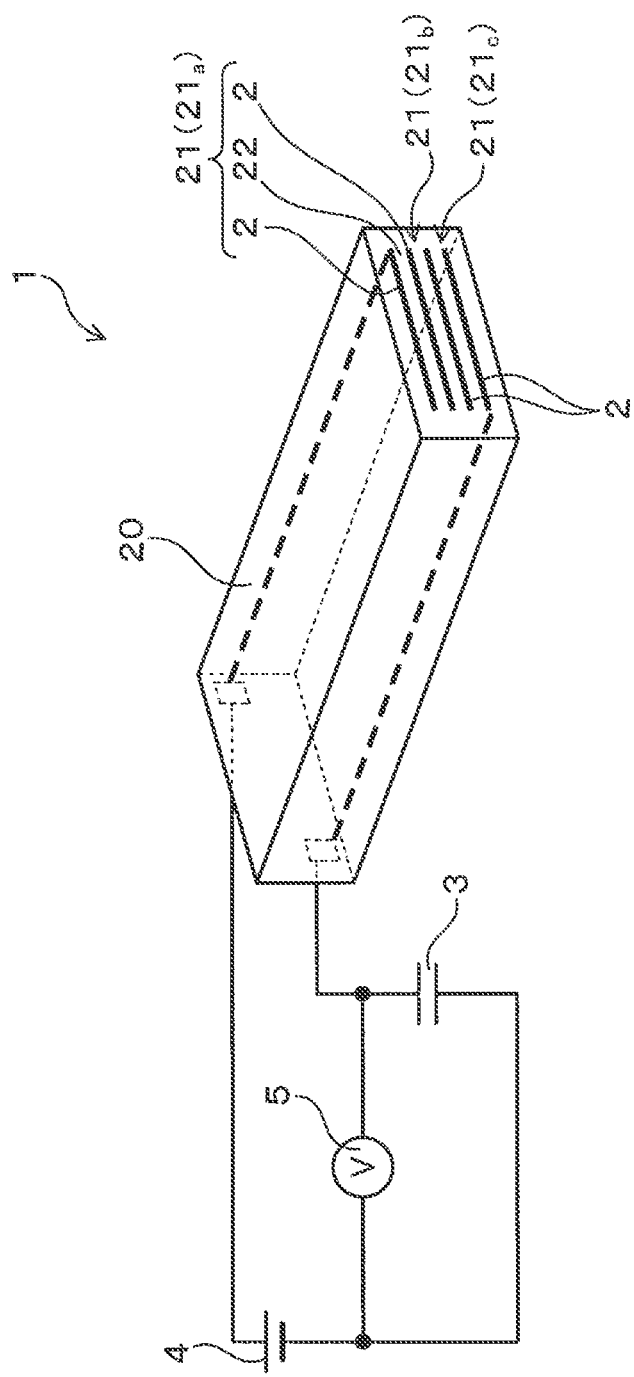
FIG. 13 is a conceptual diagram of the particulate matter detection system in a fourth embodiment.

The embodiment corresponds to an example in which the configuration of the PM sensor 20 is changed. As shown in FIG. 13, in the embodiment, the multiple electrodes 2 are formed on the PM sensor 20. By utilizing these electrodes 2, the three detection portions 21 of a first detection portion 21a, a second detection portion 21b, and a third detection portion 21c are formed. The multiple detection portions 21 described above are connected in series to the capacitor 3. The voltage of this capacitor 3 is measured by the voltage measurement portion 5.

Figure 14:
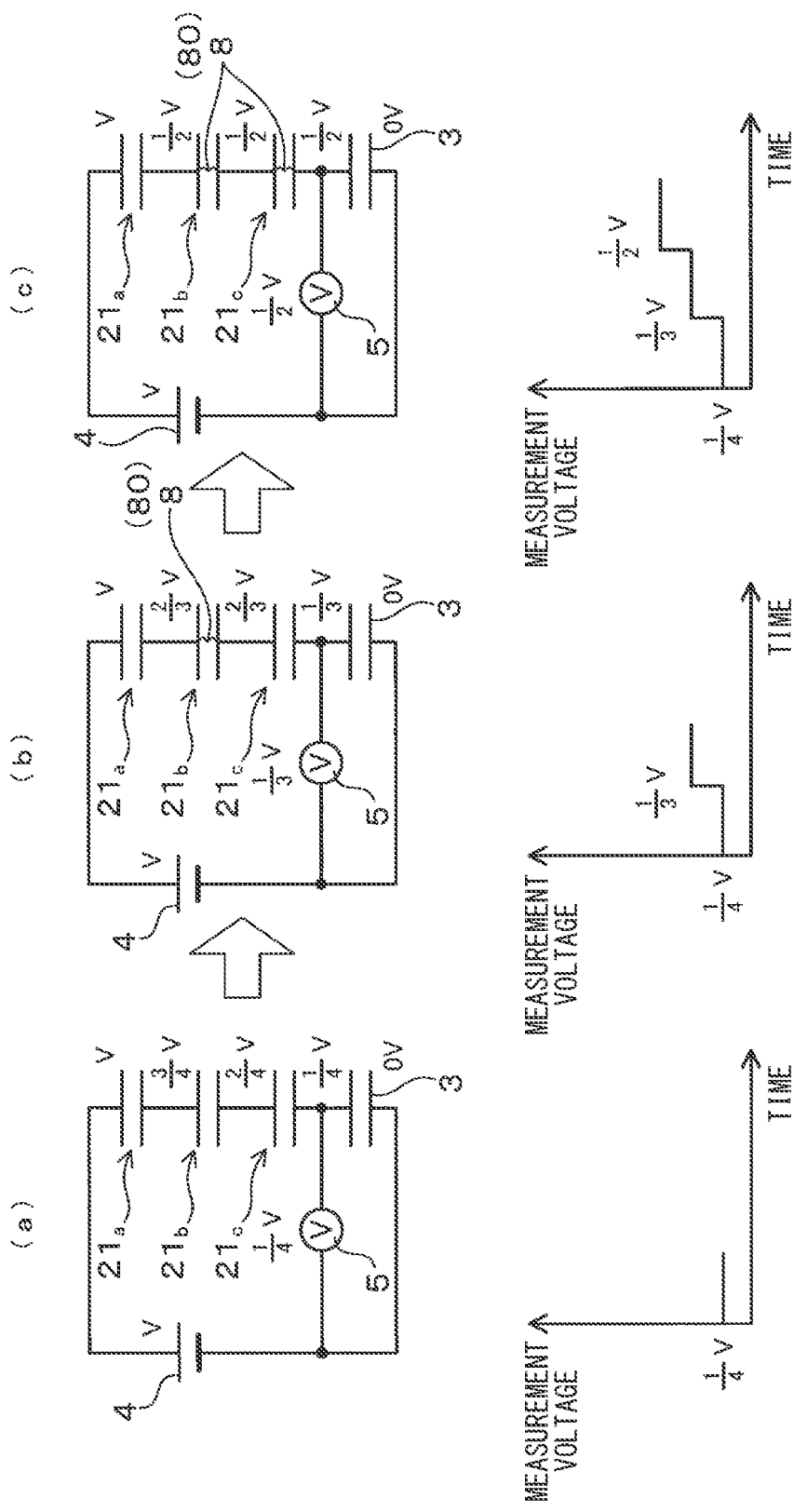
FIG. 14 is a conceptual diagram of the particulate matter detection system and a graph showing the time change of the measurement voltage in a case of (a) The PM is not deposited, a case of (b) The only one detection portion is conducted by the PM, and a case of (c) The two detection portions are conducted by the PM, in the fourth embodiment.

In the embodiment, each of the capacitances of the three detection portions 21 and the capacitor 3 is set to be equal. Accordingly, as shown in FIG. 14 (a), in the state where the PM 8 is not deposited on the detection portion 21 and the capacitor 3, the voltage of the capacitor 3 becomes ¼ of the voltage V of the power supply 4.

Thereafter, as shown in FIG. 14(b), when any one detection portion 21 of the three detection portions 21 is conducted by the PM 8, the voltage V of the power supply 4 is equally applied to the two detection portions 21 that are not conducted and the one capacitor 3. Therefore, the voltage of the capacitor 3 increases to become V/3.

Thereafter, as shown in FIG. 14(c), the two detection portions 21 of the three detection portions 21 are connected by the PM 8. Then, the voltage V of the power supply 4 is equally applied to the one detection portion 21 that is not conducted and the one capacitor 3. Therefore, the voltage of the capacitor 3 further increases to become V/2.

In the embodiment, when the voltage of the capacitor 3 increases multiple times within the predetermined time, the control portion 7 (see FIG. 5) determines that the filter 14 (see FIG. 5) is broken since the concentration of the PM 8 in the exhaust gas g is high.

The operation effect of the embodiment will be described. In the embodiment, the multiple detection portions 21 connected to each other in series are formed in the PM sensor 20. Therefore, it may be possible to detect multiple times that the detection portion 21 is conducted by the PM 8. Accordingly, it may be possible to further surely detect that the concentration of the PM 8 in the exhaust gas g is high. In addition, the fourth embodiment has the similar configurations and operation effects with in the first embodiment.

Fifth Embodiment

Figure 15:
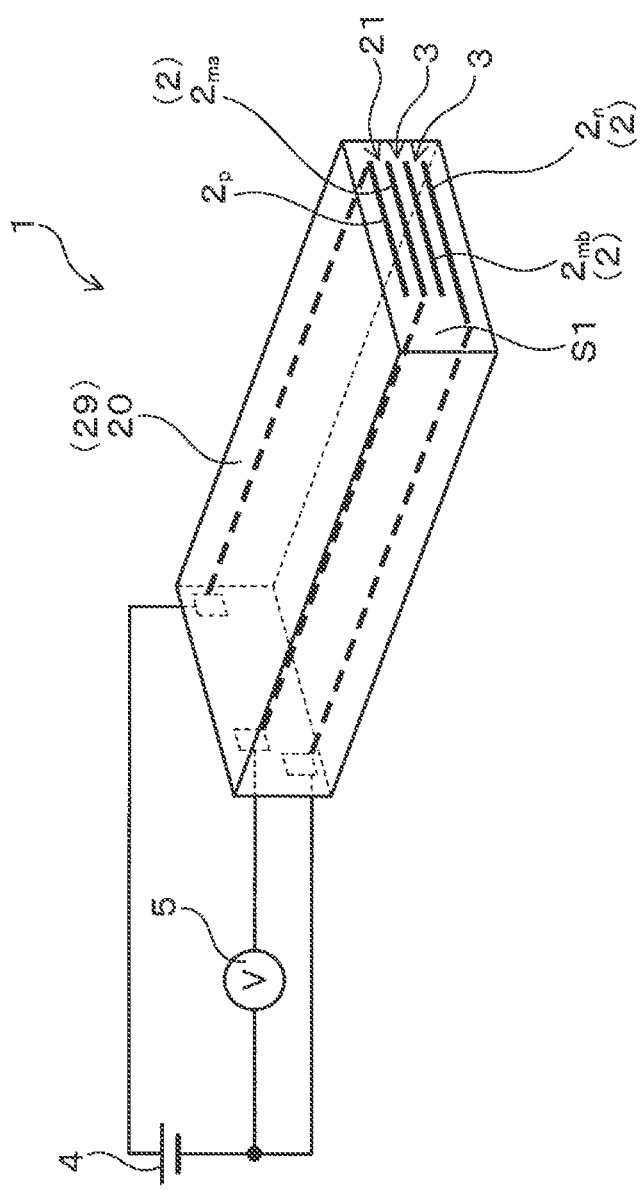
FIG. 15 is a conceptual diagram of the particulate matter detection system in a fifth embodiment.
Figure 16:
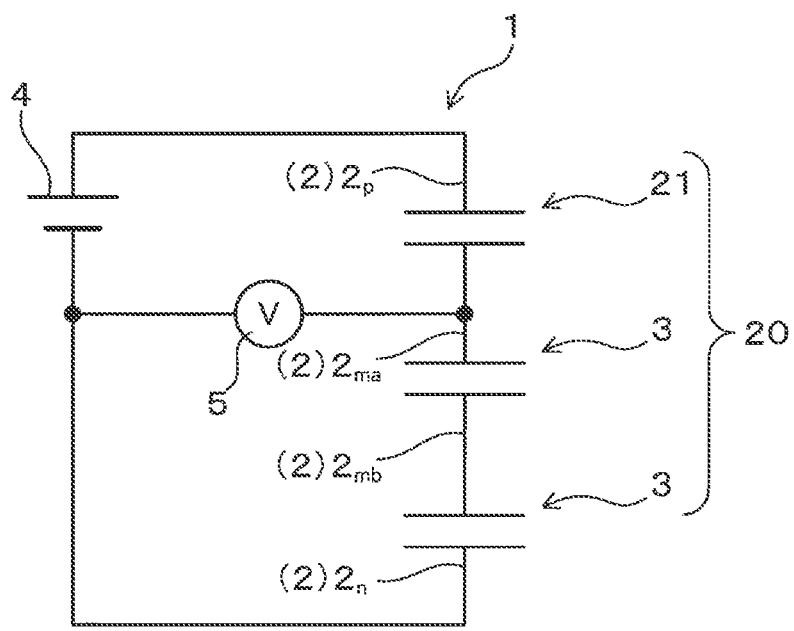
FIG. 16 is a conceptual diagram of the particulate matter detection system in the fifth embodiment.

The embodiment corresponds to an example in which the configuration of the PM sensor 20 is changed. As shown in FIG. 15 and FIG. 16, in the embodiment, the one detection portion 21 and the two capacitors 3 are formed in the PM sensor 20. This detection portion 21 and these two capacitors 3 are connected in series. In each of the capacitors 3, the pair of electrodes 2 is conducted by the PM 8 when the PM 8 is deposited. The voltage measurement portion 5 measures the voltages of the two capacitors 3.

As shown in FIG. 15, the multiple electrodes 2 (2p, 2ma, 2mb, 2n) are formed so as to be arranged in the PM sensor 20 at the predetermined distance. The one detection portion 21 and the two capacitors 3 are formed by utilizing these electrodes 2. The electrodes 2 are exposed from the end surface S1 of the main portion 29 of the PM sensor 20.

The operation effect of the embodiment will be described. In the embodiment, similarly to the third embodiment, both of the detection portion 21 and the capacitor 3 are formed in the PM sensor 20. Therefore, it may be possible to reduce the number of components. In the embodiment, the multiple capacitors 3 are formed. Therefore, it may be possible to measure multiple times that the capacitor 3 is conducted by the PM 8 and the voltage changes. Accordingly, it may be possible to surely detect that the concentration of the PM 8 in the exhaust gas g is high. In addition, the fifth embodiment has the similar configurations and operation effects with in the first embodiment.

Figure 17:
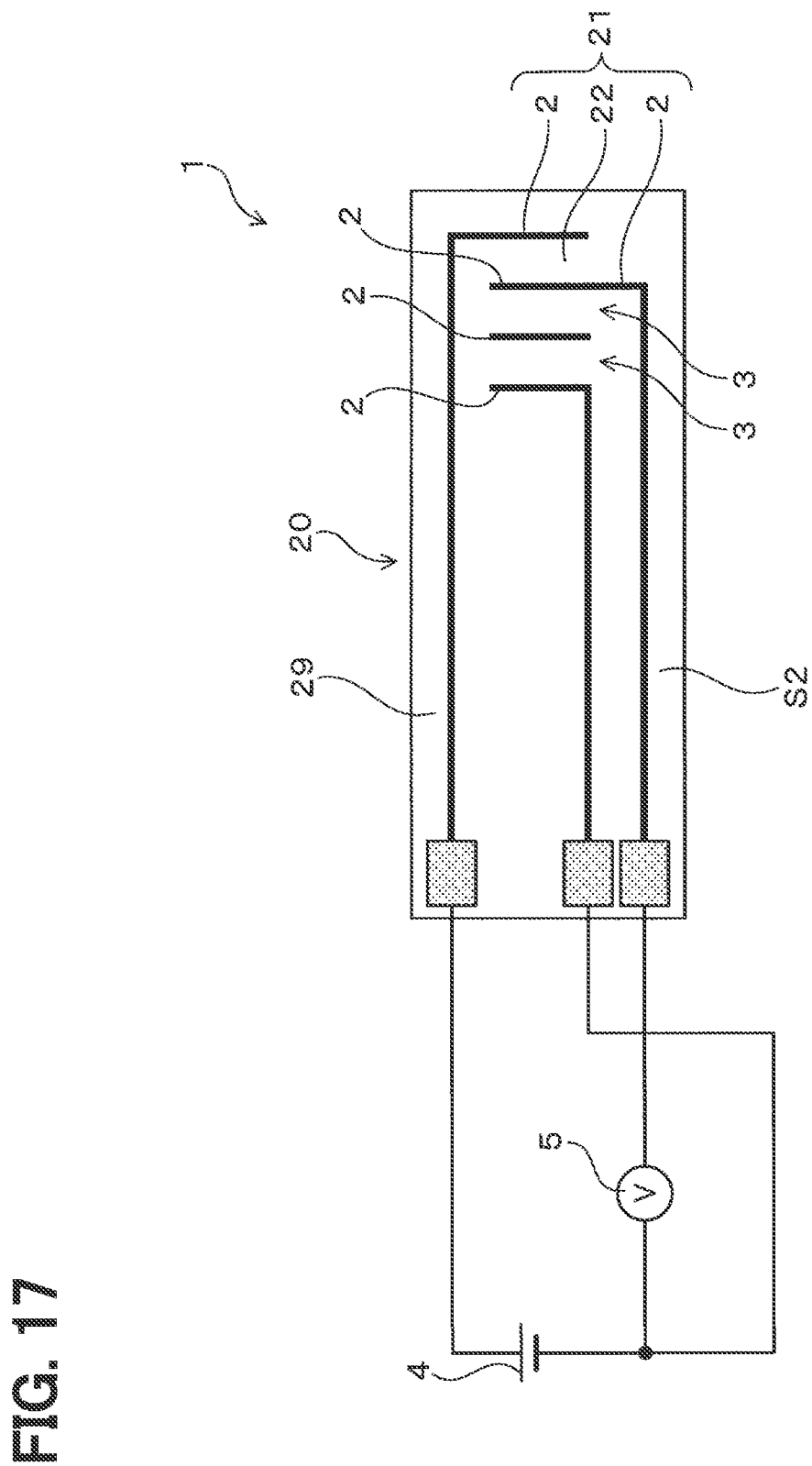
FIG. 17 is a conceptual diagram of the particulate matter detection system in which the configuration of the PM sensor is changed in the fifth embodiment.

In the embodiment, the electrodes 2 are placed on the end surface S1 of the main portion 29 of the PM sensor 20. However, the present disclosure is not limited to this. That is, as shown in FIG. 17, the electrodes 2 may be formed on a main surface S2 of the main portion 29.

Sixth Embodiment

Figure 18:
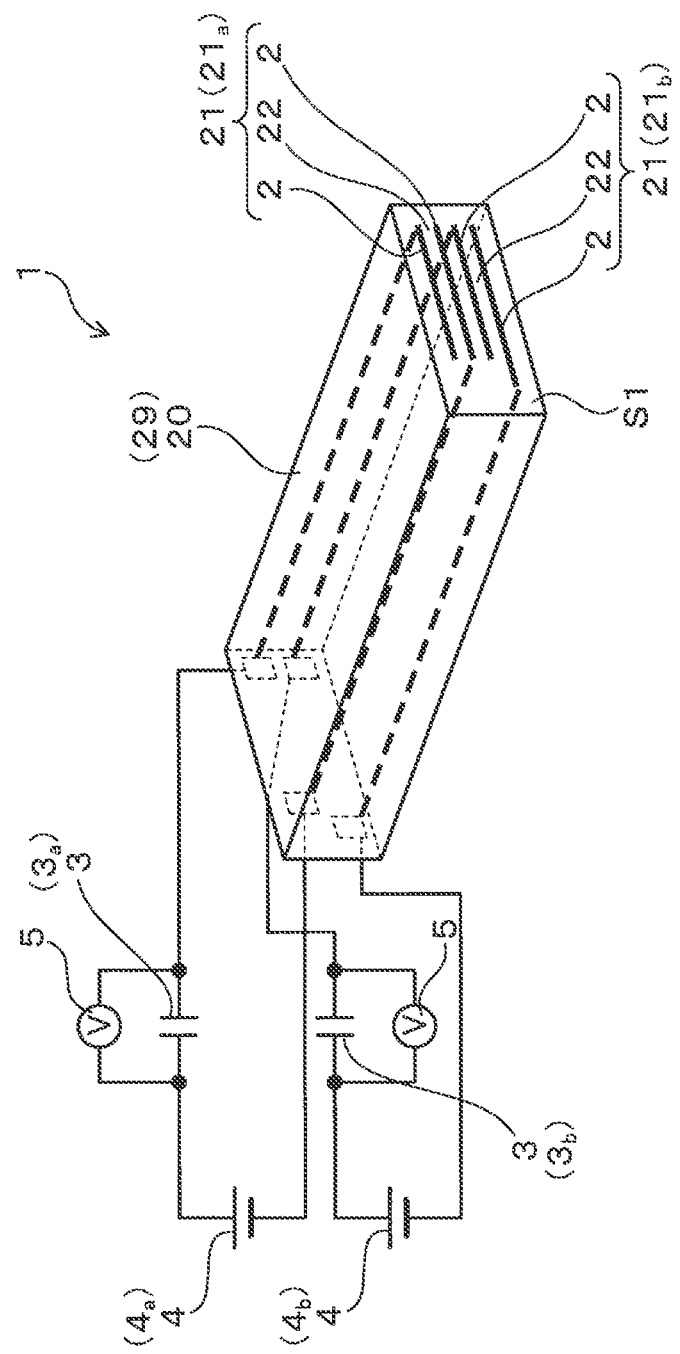
FIG. 18 is a conceptual diagram of the particulate matter detection system in a sixth embodiment.

The embodiment corresponds to an example in which the configuration of the PM sensor 20 or the like is changed. As shown in FIG. 18, in the embodiment, the two detection portions 21 of the first detection portion 21a and the second detection portion 21b are formed in the PM sensor 20. Each of the different capacitors 3 is connected to each of the detection portions 21. Each of the two detection portions 21a and 21b is connected to each of the different power supplies 4.

The multiple electrodes 2 are formed to be arranged in the PM sensor 20. These multiple electrodes 2 form the two detection portions 21a and 21b described above. The electrodes 2 are formed on the end surface S1 of the main portion 29 of the PM sensor 20.

The operation effect of the embodiment will be described. In the embodiment, the two detection portions 21a and 21b independent from each other are formed in the PM sensor 20. Therefore, it may be possible to further improve a reliability of the detection of the PM 8.

In addition, the sixth embodiment has the similar configurations and operation effects with in the first embodiment.

Figure 19:
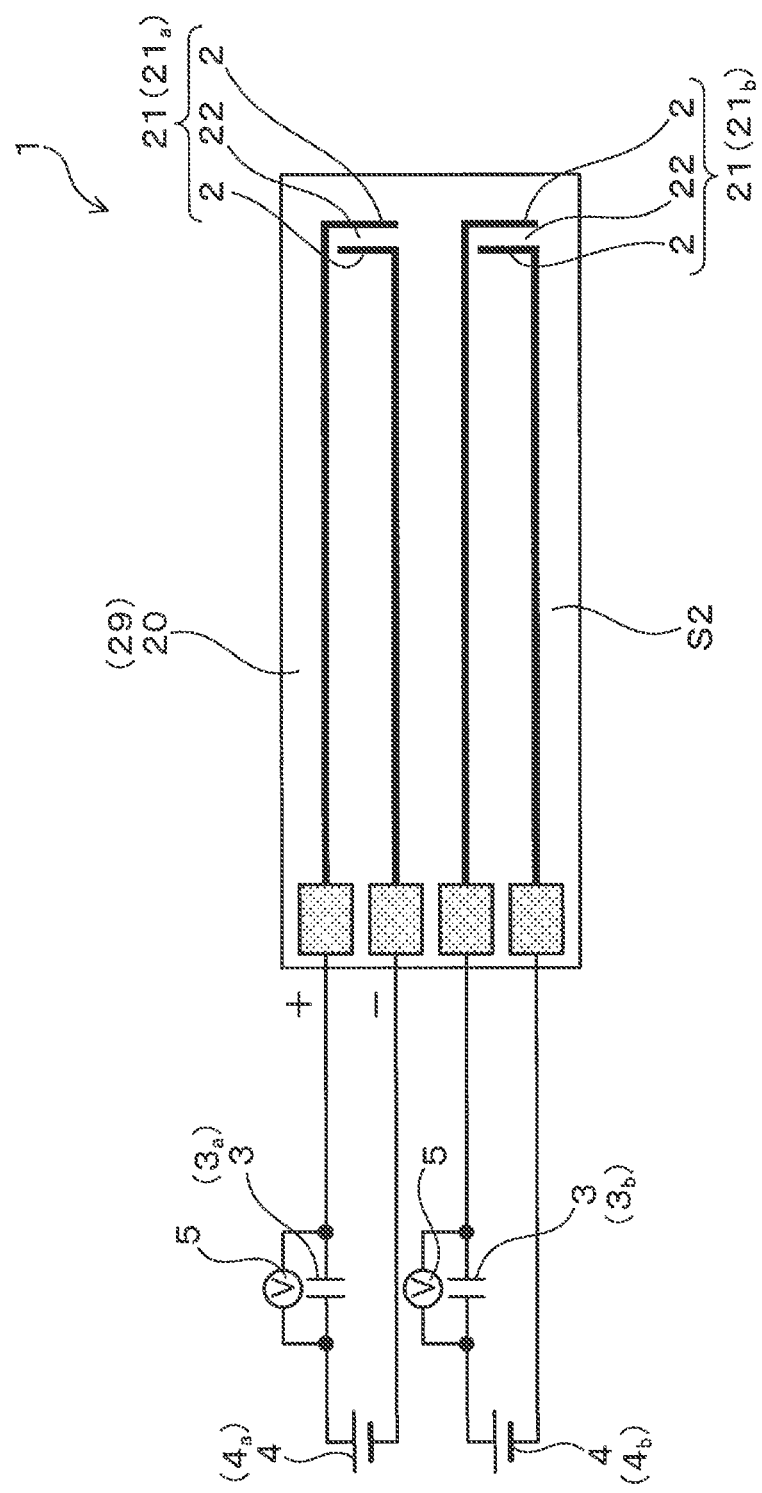
FIG. 19 is a conceptual diagram of the particulate matter detection system in which the configuration of the PM sensor is changed in the sixth embodiment.

In the embodiment, as shown in FIG. 18, the electrodes 2 are placed on the end surface S1 of the main portion 29 of the PM sensor 20. However, the present disclosure is not limited to this. That is, as shown in FIG. 19, the electrodes 2 may be formed on a main surface S2 of the main portion 29.

Seventh Embodiment

Figure 20:
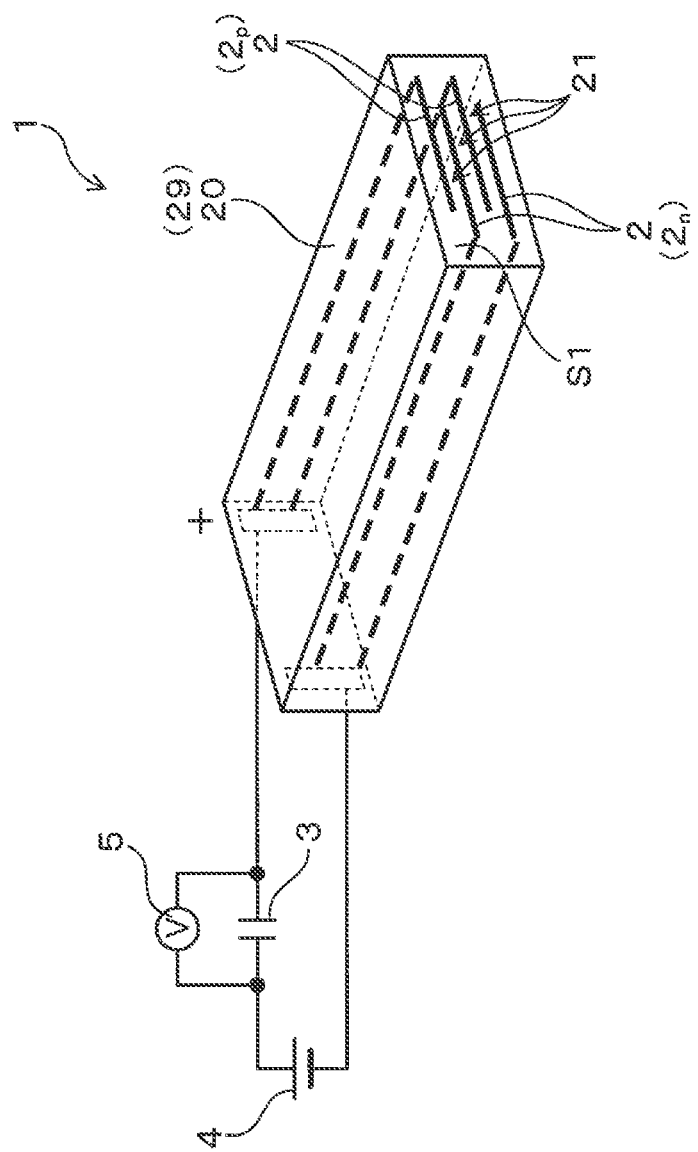
FIG. 20 is a conceptual diagram of the particulate matter detection system in a seventh embodiment.

The embodiment corresponds to an example in which the structure of the PM sensor 20 is changed. As shown in FIG. 20, the PM sensor 20 in the embodiment includes the multiple positive electrodes 2p and the multiple negative electrodes 2n. These positive electrodes 2p and these negative electrodes 2n are alternately placed. The positive electrode 2p and the negative electrode 2n that are adjacent to each other forms the detection portion 21.

The capacitor 3 is connected to the detection portion 21 in series. The voltage of this capacitor 3 is measured by the voltage measurement portion 5.

The operation effect of the embodiment will be described. In the configuration described above, it may be possible to form the multiple detection portions 21 in the PM sensor 20. Therefore, it may be possible to increase an area on which the PM 8 is deposited. It may be possible to improve a sensitivity of the PM sensor 20.

In addition, the seventh embodiment has the similar configurations and operation effects with in the first embodiment.

Figure 21:
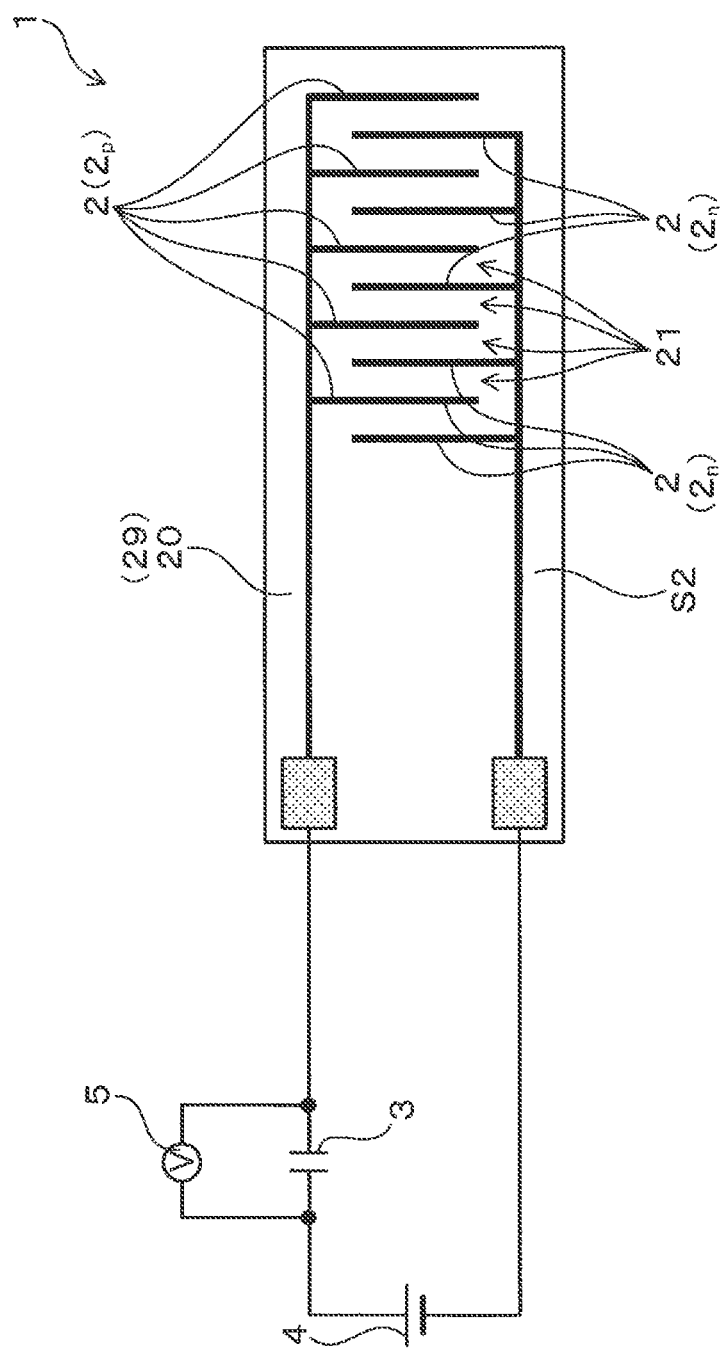
FIG. 21 is a conceptual diagram of the particulate matter detection system in which the configuration of the PM sensor is changed in the seventh embodiment.

In the embodiment, the electrodes 2 (2p, 2n) are formed on the end surface S1 of the main portion 29 of the PM sensor 20. However, the present disclosure is not limited to this. That is, as shown in FIG. 21, the electrodes 2 may be formed on the main surface S2 of the main portion 29.

Eighth Embodiment

Figure 22:
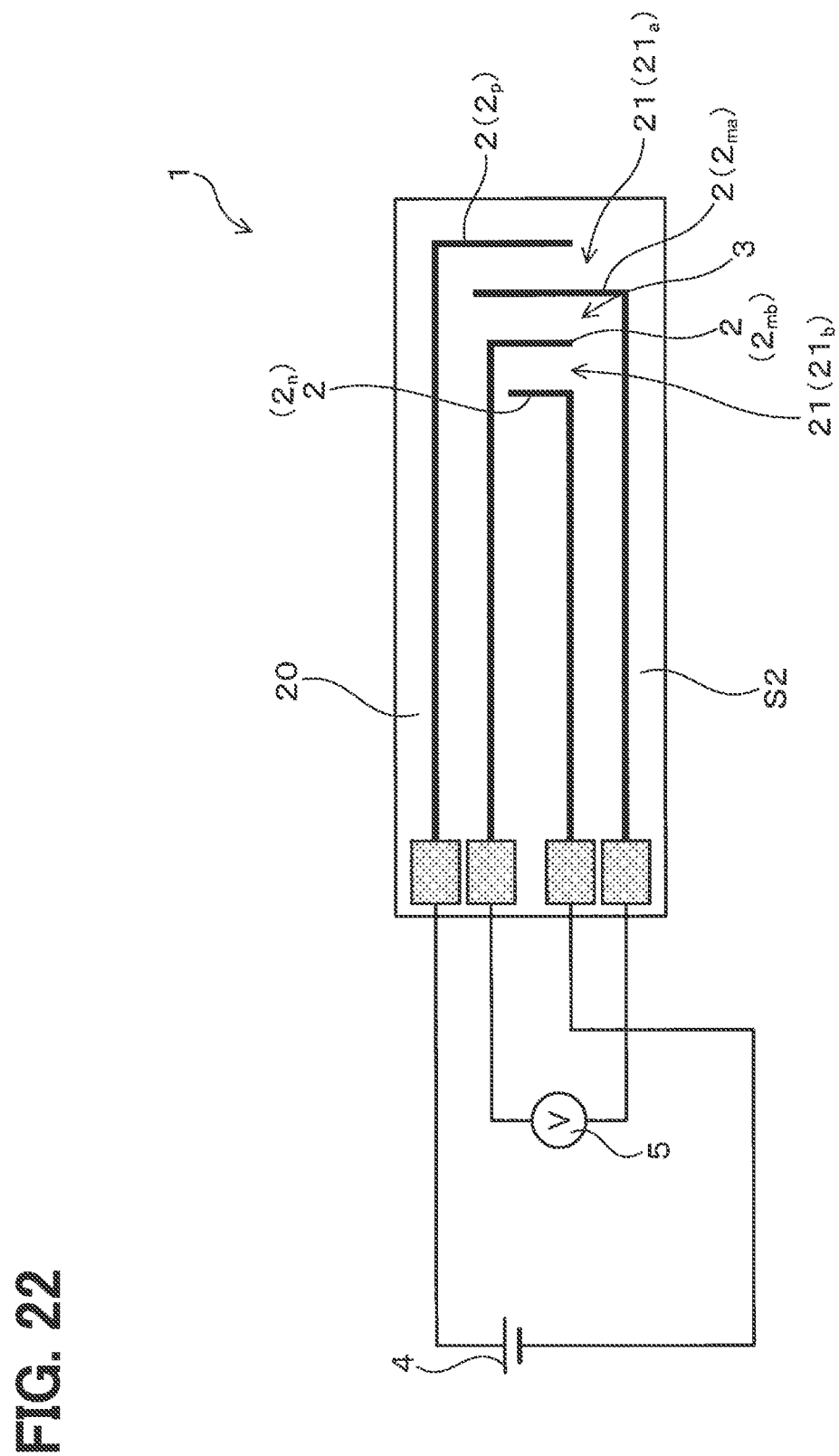
FIG. 22 is a conceptual diagram of the particulate matter detection system in an eighth embodiment.

The embodiment corresponds to an example in which the configuration of the PM sensor 20 is changed. As shown in FIG. 22, the PM sensor 20 in the embodiment includes the one positive electrode 2p, the one negative electrode 2n, and the two measurement electrodes 2ma and 2mb. The positive electrode 2p and the first measurement electrode 2ma form the first detection portion 21a. The two measurement electrodes 2ma and 2mb form the capacitor 3. The second measurement electrode 2mb and the negative electrode 2n form the second detection portion 21b. The first detection portion 21a, the capacitor 3, and the second detection portion 21b are connected in series. The voltage measurement portion 5 measures the voltage of the capacitor 3. In addition, the eighth embodiment has the similar configurations and operation effects with in the first embodiment.

Ninth Embodiment

Figure 23:
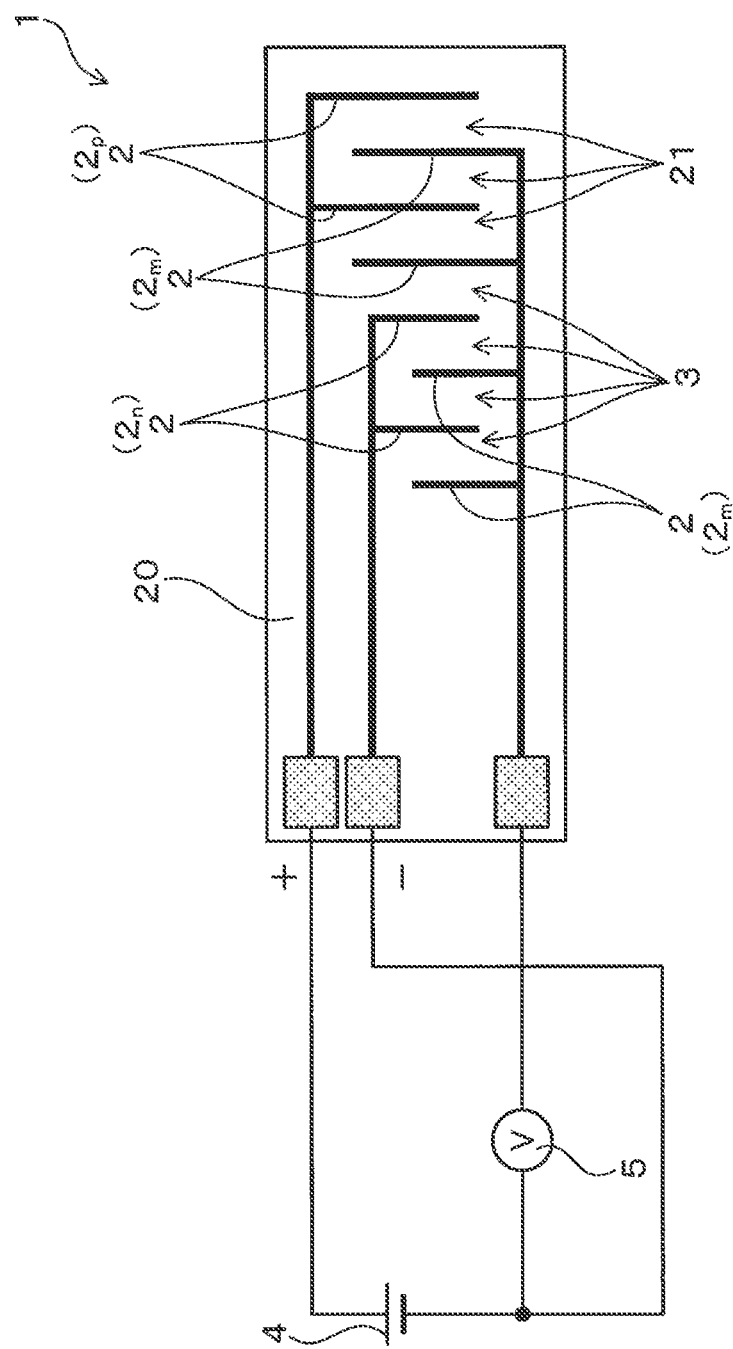
FIG. 23 is a conceptual diagram of the particulate matter detection system in a ninth embodiment.

The embodiment corresponds to an example in which the configuration of the PM sensor 20 is changed. As shown in FIG. 23, the PM sensor 20 in the embodiment includes the multiple positive electrodes 2p, the multiple negative electrodes 2n, and the multiple measurement electrodes 2m. The positive electrode 2p and the measurement electrode 2m form the detection portion 21. The negative electrode 2n and the measurement electrode 2m form the capacitor 3. In addition, the ninth embodiment has the similar configurations and operation effects with in the first embodiment.

Tenth Embodiment

Figure 24:
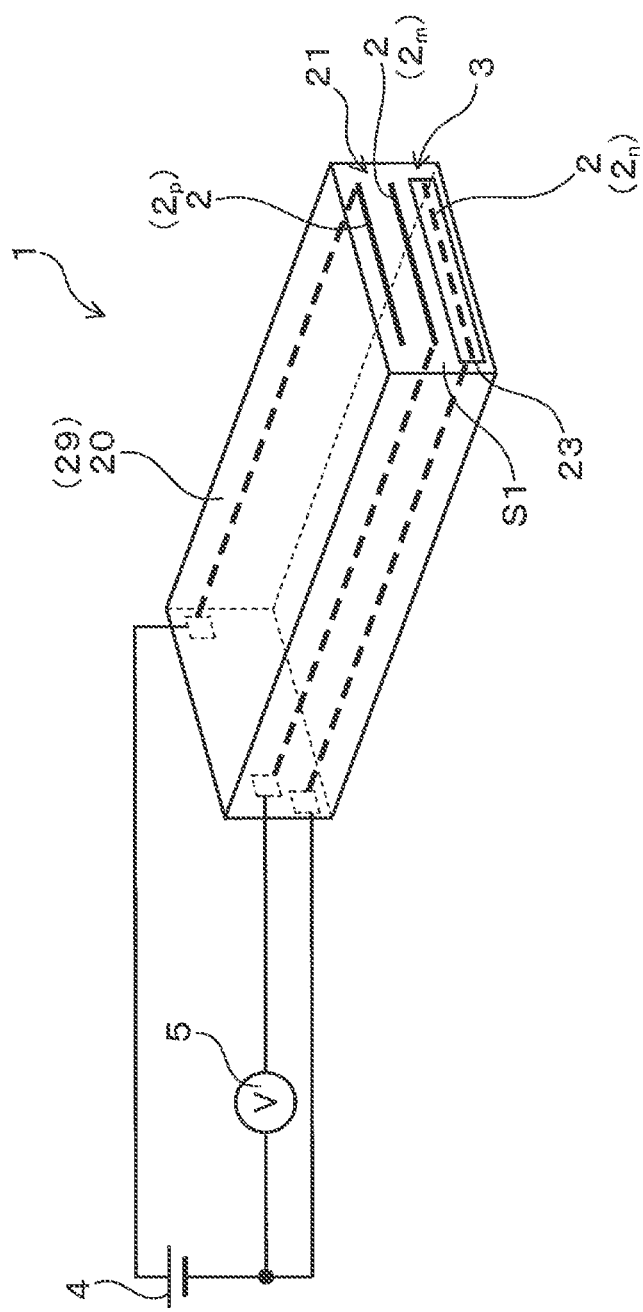
FIG. 24 is a conceptual diagram of the particulate matter detection system in a tenth embodiment.

The embodiment corresponds to an example in which the configuration of the PM sensor 20 is changed. As shown in FIG. 24, in the embodiment, the multiple electrodes 2 are formed so as to be arranged on the PM sensor 20 at the predetermined distance.

These multiple electrodes 2 form the detection portion 21 and the capacitor 3. Each of the electrodes 2 is formed on the end surface S1 of the main portion 29 of the PM sensor 20. In the embodiment, at least one of the electrodes 2 (the negative electrode 2n in the embodiment) of the pair of electrodes 2 (2m, 2n) configuring the capacitor 3 is covered with an insulation layer 23. Due to this insulation layer 23, the current does not flow between the pair of electrodes 2 (2m, 2n) constituting the capacitor 3 even when the PM 8 is deposited.

The operation effect of the embodiment will be described. In the configuration described above, it may be possible to prevent the capacitor 3 from being conducted by the PM 8. Therefore, it may be possible to further surely detect that the exhaust gas g includes the many PMs 8. That is, as in the third embodiment (see FIG. 11(c)), it can be configured that the capacitor 3 is conducted when the PM 8 is deposited. However, in this case, when the detection portion 21 and the capacitor 3 are simultaneously conducted by the PM 8, the change of the measurement voltage is not mostly generated. Therefore, a possibility that the conductions of the detection portion 21 and the capacitor 3 are not detectable may be considered. On the other hand, when the configuration in the embodiment is utilized, it may be possible to prevent the capacitor 3 from being conducted by the PM 8. It may be possible to conduct only the detection portion 21. Therefore, it may be possible to surely detect that the detection portion 21 is conducted by the PM 8 and the large change of the voltage is generated, that is, the exhaust gas g includes the many PMs 8.

In the embodiment, both of the detection portion 21 and the capacitor 3 are formed in the PM sensor 20. Therefore, it may be possible to reduce the number of the components compared with a case where a different component is utilized instead of the capacitor 3. Therefore, it may be possible to reduce the manufacturing cost of the PM detection system 1.

In addition, the tenth embodiment has the similar configurations and operation effects with in the first embodiment.

Figure 25:
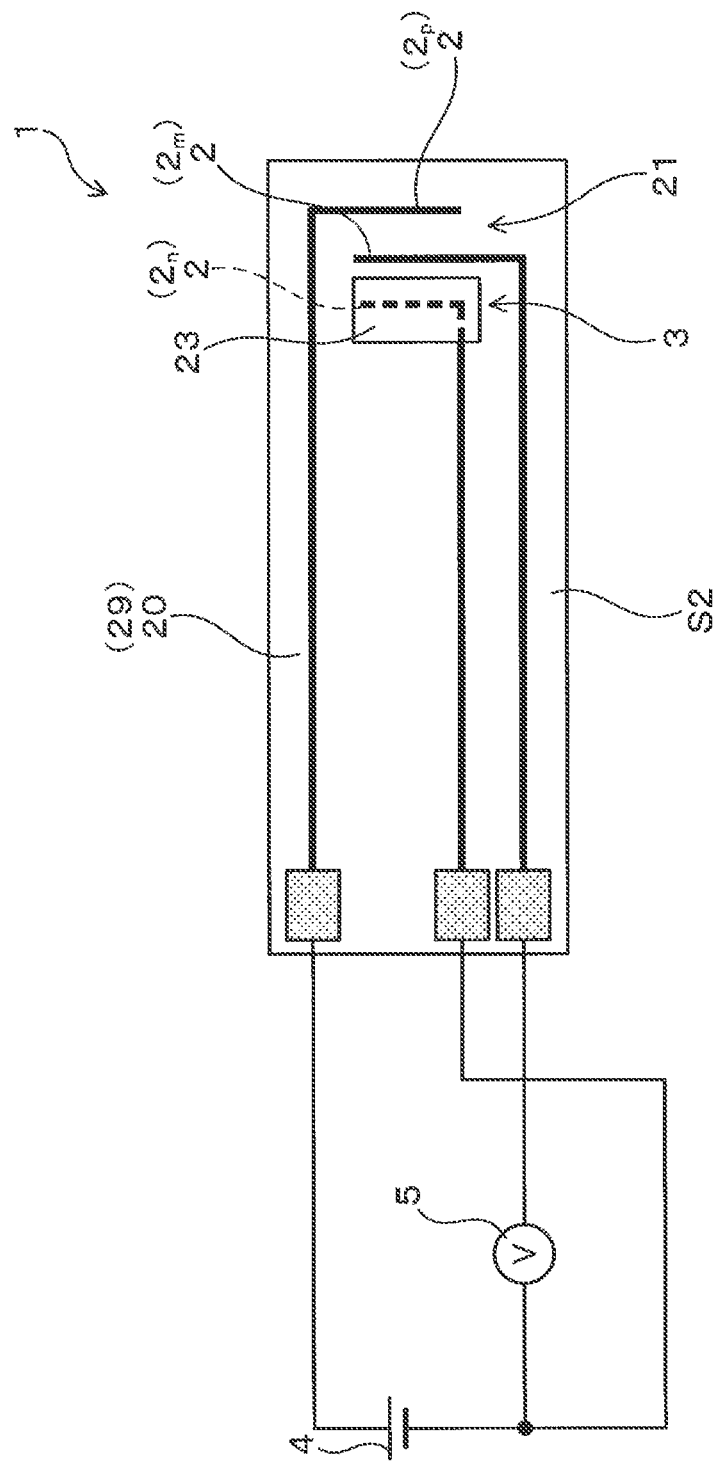
FIG. 25 is a conceptual diagram of the particulate matter detection system in which the configuration of the PM sensor is changed in the tenth embodiment.

In the embodiment, as shown in FIG. 24, the electrodes 2 are formed on the end surface S1 of the main portion 29 of the PM sensor 20. However, the present disclosure is not limited to this. As shown in FIG. 25, the electrodes 2 may be formed on the main surface S2 of the main portion 29.

Figure 26:
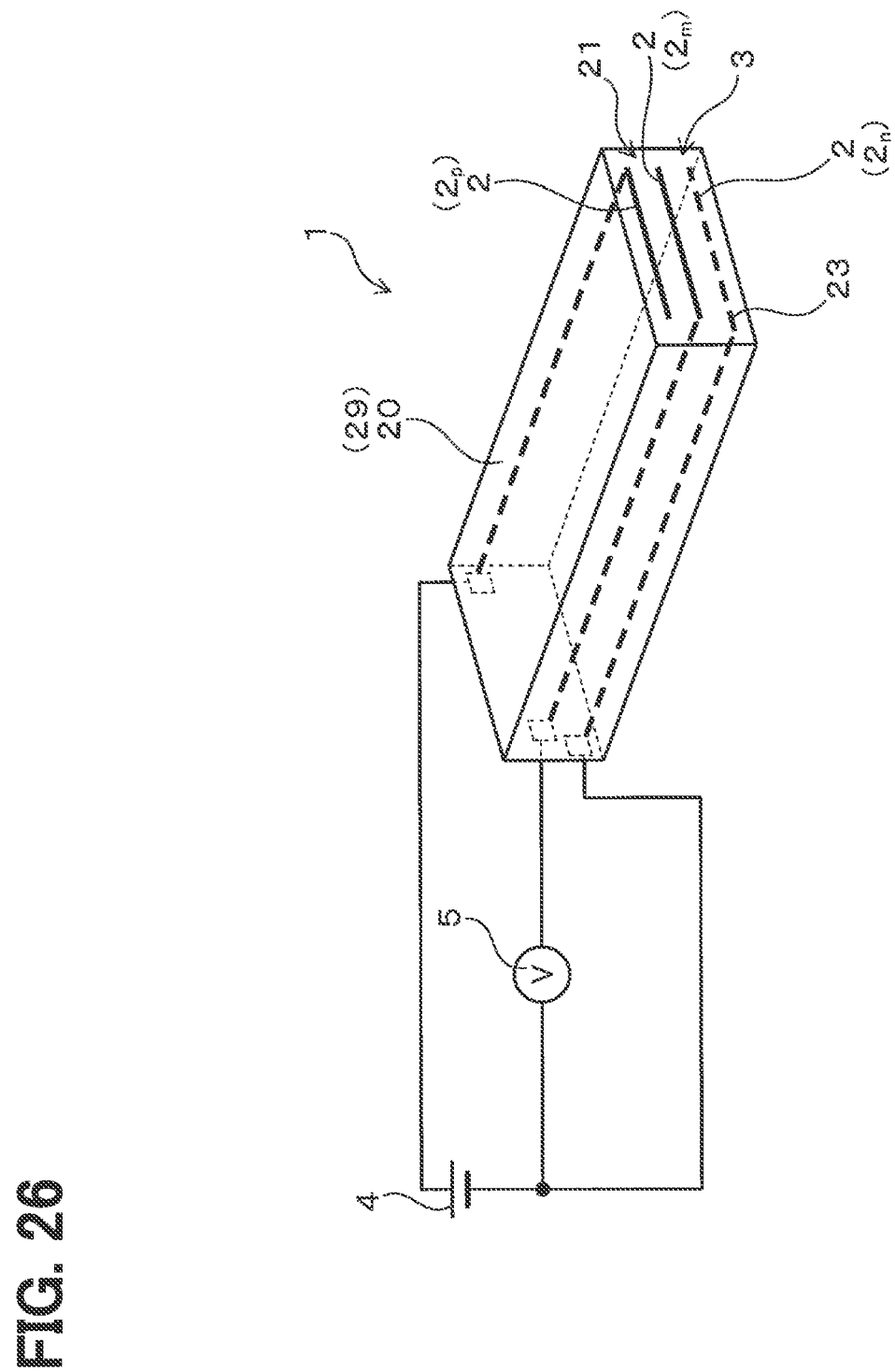
FIG. 26 is a conceptual diagram of the particulate matter detection system in which the configuration of the PM sensor is changed in the tenth embodiment.

As shown in FIG. 26, the electrode 2n that is a part of the configuration of the capacitor 3 may be embedded in the main portion 29 of the PM sensor 20. In this case, a part of the main portion 29 doubles as the insulation layer 23 described above.

Eleventh Embodiment

Figure 27:
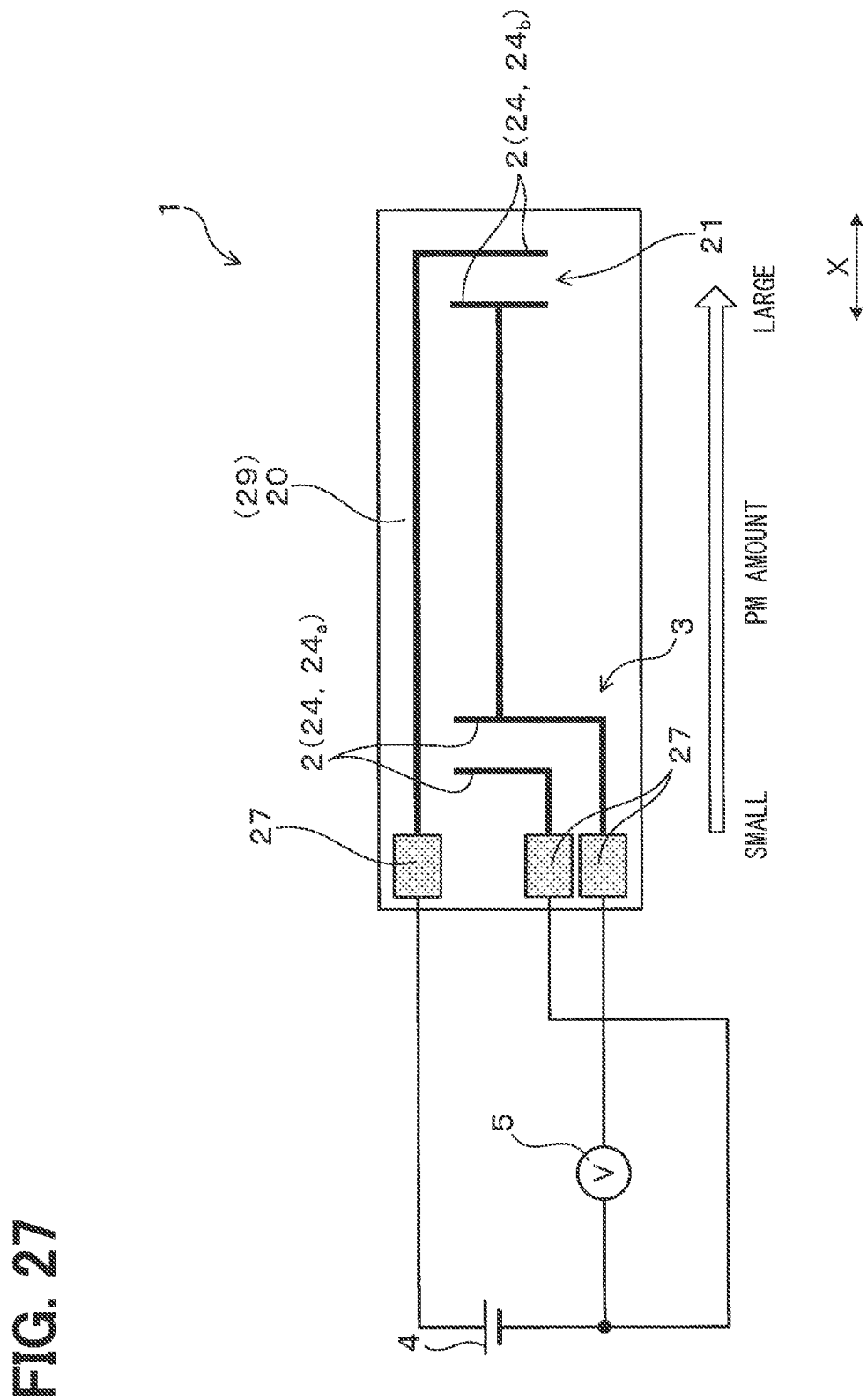
FIG. 27 is a conceptual diagram of the particulate matter detection system in an eleventh embodiment.

The embodiment corresponds to an example in which the configuration of the PM sensor 20 is changed. As shown in FIG. 27, in the embodiment, the multiple electrodes 2 are formed in the PM sensor 20. The pair of electrodes 2 adjacent to each other configure an electrode pair 24. In the embodiment, the two electrode pairs 24 of a first electrode pair 24a and a second electrode pair 24b are formed. The first electrode pair 24a configures the capacitor 3. The second electrode pair 24b configures the detection portion 21.

In the capacitor 3, the current flows between the pair of electrodes 2 when the PM 8 is deposited. The capacitor 3 (that is, the first electrode pair 24a) is placed in a side in which the connection terminal 27 is placed (hereinafter, may be also referred to as a base end side) in a longitudinal direction (hereinafter, may be also referred to as an X direction) of the main portion 29. The detection portion 21 (that is, the second electrode pair 24b) is placed in an opposite side (hereinafter, may be referred to as a tip end side) to the side in which the connection terminal 27 is placed in the X direction.

In the tip end side, the PM 8 is easier to be deposited than in the base end side. Therefore, a part of the electrode pairs 24 (the first electrode pair 24a in the embodiment) of the multiple electrode pairs 24 (24a, 24b) has the deposition amount of the PM 8 smaller than in the other electrode pair 24 (the second electrode pair 24b in the embodiment).

The operation effect of the embodiment will be described. In the embodiment, the first electrode pair 24a that is a part of the multiple electrode pairs 24 (24, 24b) has the deposition amount of the PM 8 smaller than in the second electrode pair 24b that is the other part of the multiple electrode pairs 24 (24, 24b). Therefore, it may be possible to prevent the multiple electrode pairs 24 configuring the detection portion 21 or the capacitor 3 from being simultaneously conducted by the PM 8. Accordingly, it may be possible to surely detect that the exhaust gas g includes the many PMs 8. That is, when the multiple electrode pairs 24 are simultaneously conducted by the PM 8, as described above, there is a possibility that the measurement voltage by the voltage measurement portion 5 hardly changes. However, as the embodiment, when the deposition amount of the PM 8 in the electrode pair 24a as a part of the electrode pair 24 is smaller than in the electrode pair 24b as the other part, it may be possible to reduce the possibility that the multiple electrode pairs 24 are simultaneously conducted by the PM 8. Therefore, it may be possible to largely change the measurement voltage and it may be possible to surely detect that the exhaust gas g includes the many PMs 8. In addition, the eleventh embodiment has the similar configurations and operation effects with in the first embodiment.

In the embodiment, the two electrode pairs 24 are formed in the PM sensor 20. However, the present disclosure is not limited to this. That is, the three or more electrode pairs 24 may be formed in the PM sensor 20. The multiple detection portions 21 and the multiple capacitors 3 may be formed by utilizing these electrode pairs 24. The deposition amount of the PM 8 in the electrode pair 24 configuring the detection portion 21 among the multiple electrode pairs 24 may be smaller than in the other electrode pair 24.

Twelfth Embodiment

Figure 28:
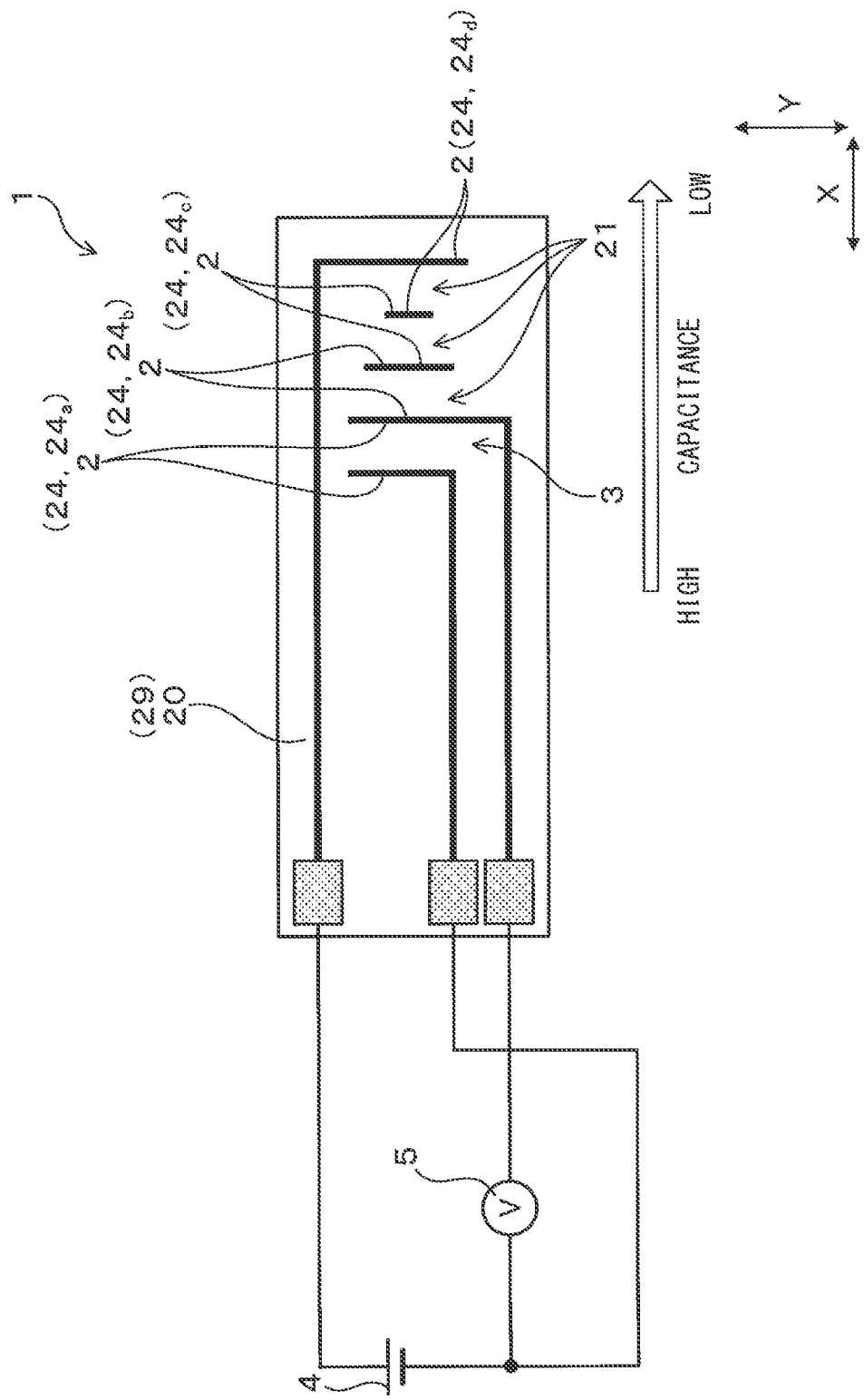
FIG. 28 is a conceptual diagram of the particulate matter detection system in a twelfth embodiment.

The embodiment corresponds to an example in which the configuration of the PM sensor 20 is changed. As shown in FIG. 28, in the embodiment, the multiple electrodes 2 are formed so as to be arranged on the PM sensor 20. Thereby, the multiple electrode pair 24 (24a to 24d) are formed. A length of a part of the electrodes 2 is short. Thereby, the electrode pairs 24 respectively have the capacitances different from each other.

The operation effect of the embodiment will be described. In the embodiment, the electrode pairs 24 formed in the PM sensor 20 respectively have the different capacitances between the pair of electrodes 2. In such a manner, it may be possible to make the voltages applied to each of the electrode pairs 24 different from each other. Accordingly, it may be possible to make the amounts of the PMs 8 collected by each of the electrode pairs 24 different, and prevent the multiple electrode pairs 24 from being simultaneously conducted by the PMs 8. Therefore, it may be possible to conduct only a part of the electrode pairs 24 by the PM 8. It may be possible to largely change the measurement voltage. Accordingly, it may be possible to surely detect that the exhaust gas g includes the many PMs 8.
In addition, the twelfth embodiment has the similar configurations and operation effects with in the first embodiment.

Figure 29:
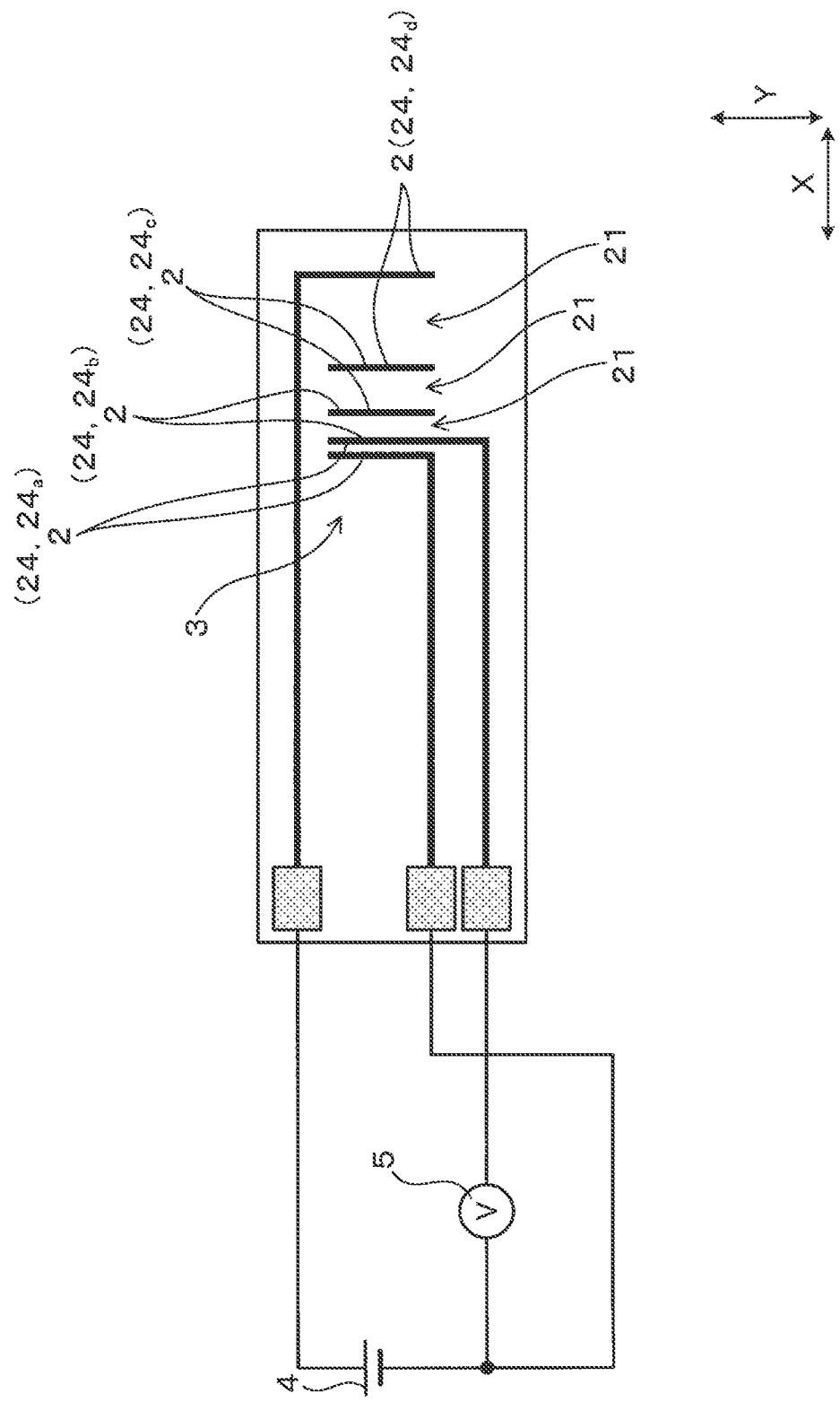
FIG. 29 is a conceptual diagram of the particulate matter detection system in which the configuration of the PM sensor is changed in the twelfth embodiment.

In the embodiment, as shown in FIG. 28, the capacitances of each of the electrode pairs 24 are set to be different from each other by adjusting the length of the electrodes 2. However, the present disclosure is not limited to this. That is, as shown in FIG. 29, the capacitance of each of the electrode pairs 24 may be set to be different from each other by adjusting the distance between the pair of electrodes 2 in the X direction.

Thirteenth Embodiment

The embodiment corresponds to an example in which the configurations of the control portion 7 (see FIG. 5) and the power supply 4 are changed. In the embodiment, even when any one of the multiple detection portions 21 is conducted by the PM 8, the control portion 7 controls so that the voltage applied to the remaining detection portion 21 is constant.

Figure 30:
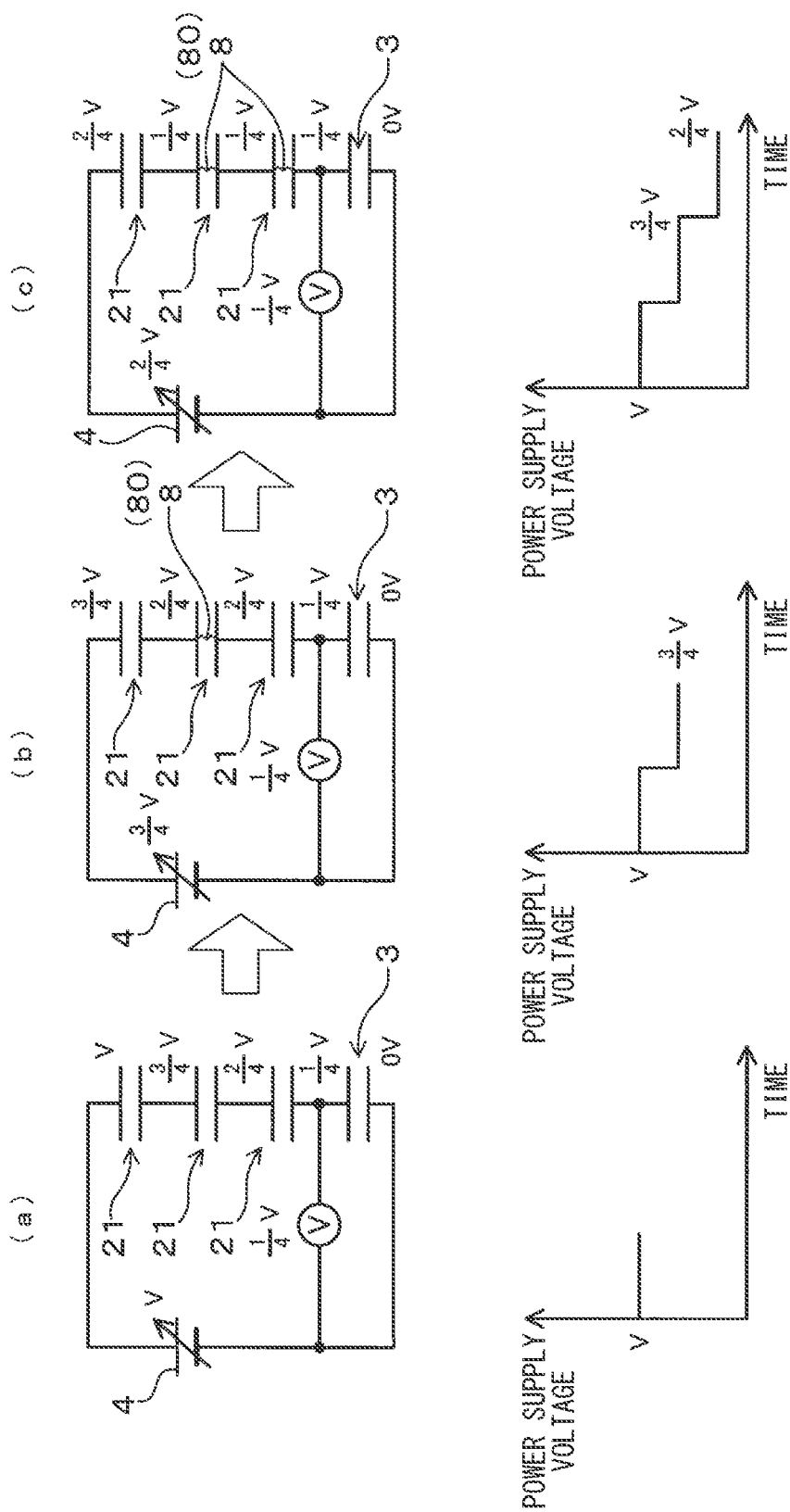
FIG. 30 is a conceptual diagram of the particulate matter detection system and a graph showing a time change of a power voltage in a case of (a) The PM is not deposited, a case of (b) The only one detection portion is conducted by the PM, and a case of (c) The two detection portions are conducted by the PM, in a thirteenth embodiment.

As shown in FIG. 30, in the embodiment, a variable voltage supply is utilized as the power supply 4. This power supply 4 may be configured by, for example, a DC-DC converter or the like. In the embodiment, the three detection portions 21 are connected in series from each other. The capacitor 3 is connected to these three detection portions 21 in series. Each of the detection portions 21 and the capacitor 3 have the similar capacitances.

As shown in FIG. 30(a), immediately after the detection of the PM 8 starts, none of three detection portions 21 are conducted by the PM 8. Then, the control portion 7 (see FIG. 5) controls the voltage of the power supply 4 to V. The voltage of the capacitor 3 becomes V/4.

When any one of the three detection portions 21 is conducted by the PM 8, the voltage V of the power supply 4 is applied to the remaining two detection portions 21 and the capacitor 3. Therefore, the voltage of the capacitor 3 increases to V/3. Thereafter, the control portion 7 reduces the voltage of the power supply 4 to ¾V, as shown in FIG. 30(b). In such a manner, each of the voltages applied to each of the detection portions 21 and the capacitor 3 is maintained at ¼V.

When another detection portion 21 is furthermore conducted by the PM 8, the voltage of the power supply 4 is applied to the remaining one detection portion 21 and the capacitor 3. Therefore, the voltage of the capacitor 3 suddenly increases. Thereafter, the control portion 7 further reduces the voltage of the power supply 4 to ²⁄₄V, as shown in FIG. 30(c). In such a manner, each of the voltages applied to the remaining one detection portion 21 and the capacitor 3 is maintained at ¼V.

The operation effect of the embodiment will be described. In the embodiment, even when any one of the multiple detection portions 21 are conducted by the PM 8, the control portion 7 controls the voltage of the power supply 4 so that the voltage applied to the remaining detection portion 21 is constant. In such a manner, it may be possible to make the voltage applied to the detection portion 21 that is not conducted constant. Therefore, it may be possible to make the speed of each detection portion 21 at the collection of the PM 8 constant. In addition, the thirteenth embodiment has the similar configurations and operation effects with in the first embodiment.

Fourteenth Embodiment

Figure 31:
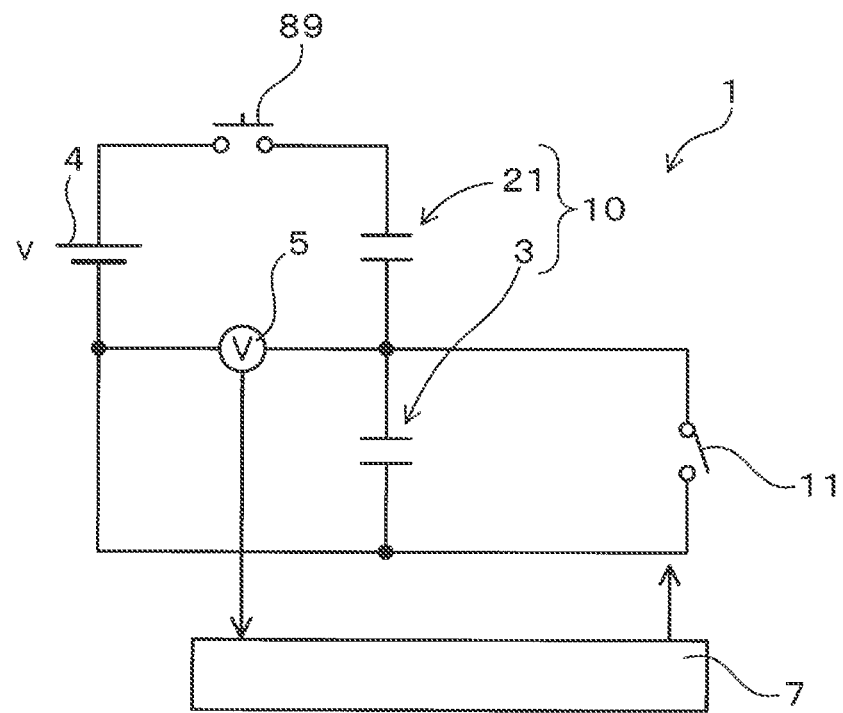
FIG. 31 is a conceptual diagram of the particulate matter detection system in a fourteenth embodiment.

The embodiment corresponds to an example in which the control method of the control portion 7 (see FIG. 5) is changed. As shown in FIG. 31, the PM detection system 1 in the embodiment includes a switch 11 connected to the capacitor 3 in parallel. A power supply activation portion 89 is connected to the power supply 4. The control portion 7 controls an on-off operation of the switch 11 and the power supply activation portion 89.

The control portion 7 performs an application process, a discharge process, and a measurement process. In the application process, the control portion 7 causes the power supply activation portion 89 to turn on in a state where the switch 11 turns off. Thereby, the voltage V of the power supply 4 is applied to the series body 10 of the detection portion 21 and the capacitor 3. In the embodiment, the capacitances of three detection portions 21 and the capacitor 3 are set to be equal to each other. Therefore, when the power supply activation portion 89 turns on, the voltage of V/2 is applied to each of the detection portion 21 and the capacitor 3.

Figure 32:
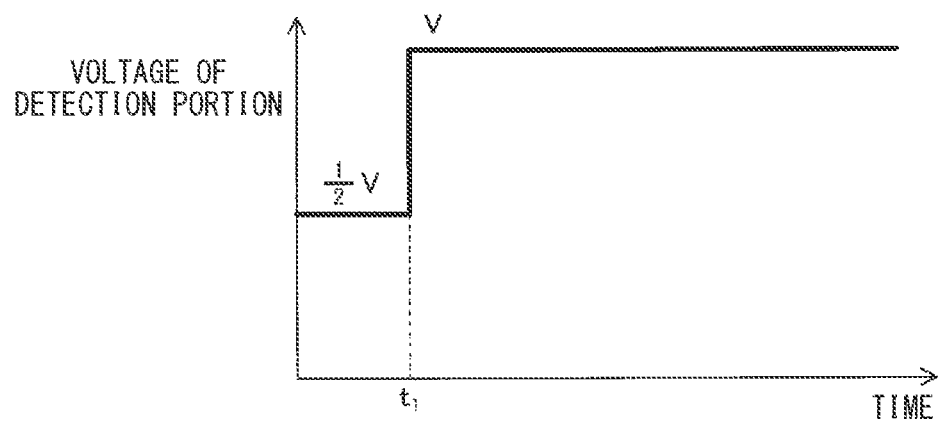
FIG. 32 is a graph showing a time change of a voltage of the detection portion in the fourteenth embodiment.

Thereafter, the control portion 7 performs the discharge process described above. In the discharge process, the control portion 7 causes the switch 11 to turn on. Thereby, the charge stored in the capacitor 3 is discharged. When the switch 11 turns on, all the voltage V of the power supply 4 is applied to the detection portions 21. Therefore, as shown in FIG. 32, at a moment when the switch 11 turns on (time $t_1$), the voltage of the detection portion 21 increases from V/2 to V. The detection portion 21 has a similar structure to the capacitor. Therefore, when the voltage V is applied, a charge Q is stored in the detection portion 21.

After the discharge process, the control portion 7 performs the measurement process described above. In the measurement process, the control portion 7 causes the switch 11 to turn off again. As described above, the charge is stored in the detection portion 21. Therefore, the voltage V (=Q/C) continues to be generated at the detection portion 21. Thereby, a high electric field is generated at the detection portion 21, and the PM 8 is easily collected. In the measurement process, in a state where the switch 11 turns off, that is, in a state where the voltage V is generated at the detection portion 21, the voltage of the capacitor 3 is measured by utilizing the voltage measurement portion 5. When the detection portion 21 is conducted by the PM 8, the voltage of the capacitor 3 increases from 0 to V. When the voltage of the capacitor 3 increases from 0 to V within the predetermined time, the control portion 7 determines that the filter 14 (see FIG. 5) is broken since the concentration of the PM 8 in the exhaust gas g is high.

Figure 33:
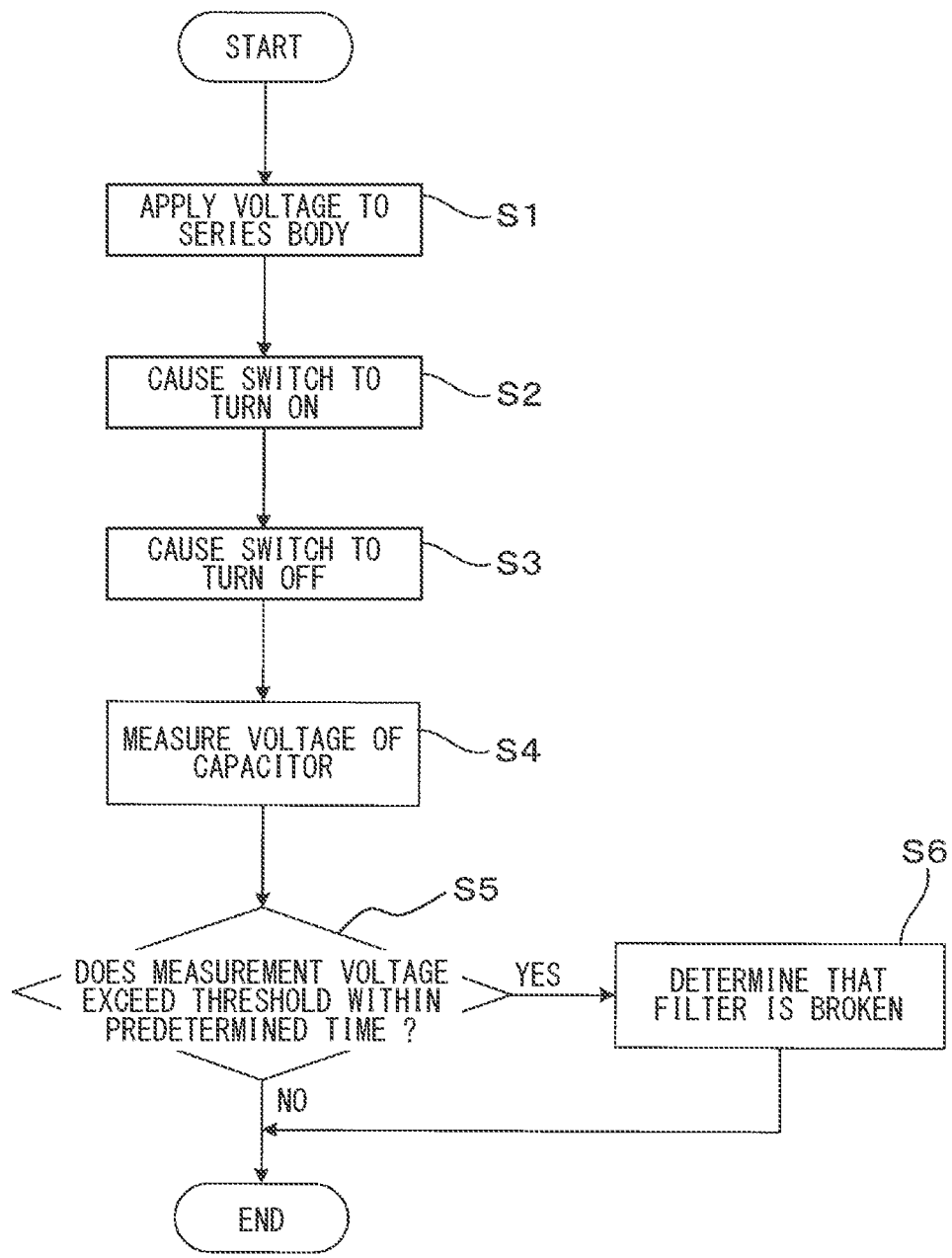
FIG. 33 is a flowchart of a control portion in the fourteenth embodiment.

A flowchart of the control portion 7 will be described with reference to FIG. 33. As shown in FIG. 33, the control portion 7 first performs a step S1. Here, the control portion 7 causes the power supply activation portion 89 to turn on, and causes the voltage V of the power supply 4 to be applied to the series body 10 (that is, performs the application process).

Thereafter, the process shifts to a step S2. Here, the control portion 7 causes the switch 11 to turn on, and discharges the charge stored in the capacitor 3 (that is, performs the discharge process). Thereby, the control portion 7 causes the voltage of the detection portion 21 to increase from V/2 to V.

The process shifts to a step S3. The control portion 7 causes the switch 11 to turn off. Thereafter, the control portion 7 performs a step S4. Here, the control portion 7 measures the voltage of the capacitor in the state where the switch 11 turns off (that is, performs the measurement process).

The control portion 7 performs a step S5. In the step S5, the control portion 7 determines whether the measurement voltage exceeds the threshold value within the predetermined time. When the control portion 7 determines as Yes here, the process shifts to a step S6. The control portion 7 determines that the filter 14 is broken. When the control portion 7 determines as No in the step S5, the process ends.

The operation effect of the embodiment will be described. In the embodiment, the application process described above, the discharge process described above, and the measurement process described above are performed. In such a manner, it may be possible to generate the high voltage at the detection portion 21. Therefore, it may be possible to improve the collection efficiency of the PM 8. In addition, the fourteenth embodiment has the similar configurations and operation effects with in the first embodiment.

Fifteenth Embodiment

Figure 34:
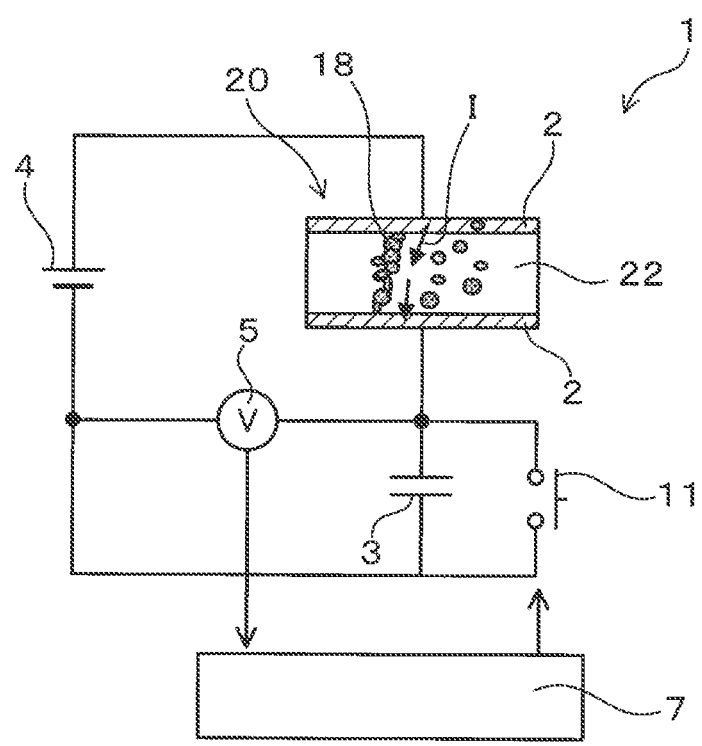
FIG. 34 is a conceptual diagram of the particulate matter detection system in a fifteenth embodiment.

The embodiment corresponds to an example in which the control method of the control portion 7 is changed. As shown in FIG. 34, the PM detection system 1 in the embodiment includes the switch 11 connected to the capacitor 3 in parallel, and the control portion 7 that controls the on-off operation of the corresponding switch 11. The PM sensor 20 includes a heater (not shown) that burns the PM 8 deposited on the deposition surface 22 to remove the PM 8.

Figure 35:
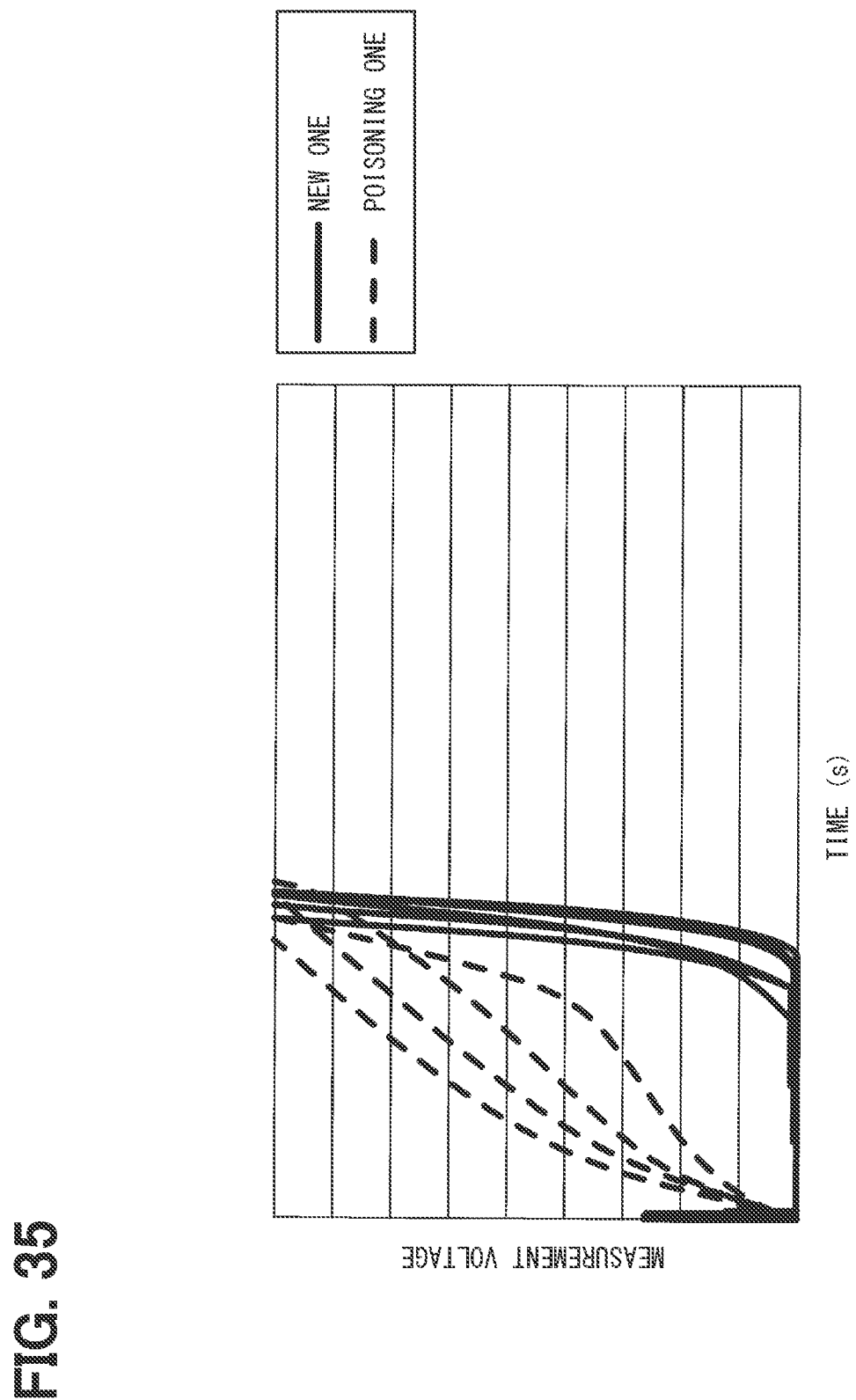
FIG. 35 is an examination graph showing the time change of a capacitor voltage for a new particulate matter detection sensor and a poisoning particulate matter detection sensor in the fifteenth embodiment.

A poisoning matter 18 having a conductivity may be deposited on the deposition surface 22. For example, iron powder may be generated from the exhaust pipe 13 (see FIG. 5), and the iron powder may be deposited on the deposition surface 22. Sulfur in the oil of the engine 12 may be deposited. These poisoning matters 18 may be difficult to be removed even when the heater described above heats the poisoning matter 18 to a normal PM removal temperature. When the poisoning matter 18 is deposited, the slight current flows between the pair of electrodes 2. Therefore, as shown in FIG. 35, after the measurement of the PM 8 starts, the voltage of the capacitor 3 increase due to the current flowing through the poisoning matter 18. Accordingly, the control portion 7 may erroneously determine that the PM 8 is deposited. In the embodiment, this erroneous determination is solved by utilizing the switch 11 described above, or the like.

Figure 36:
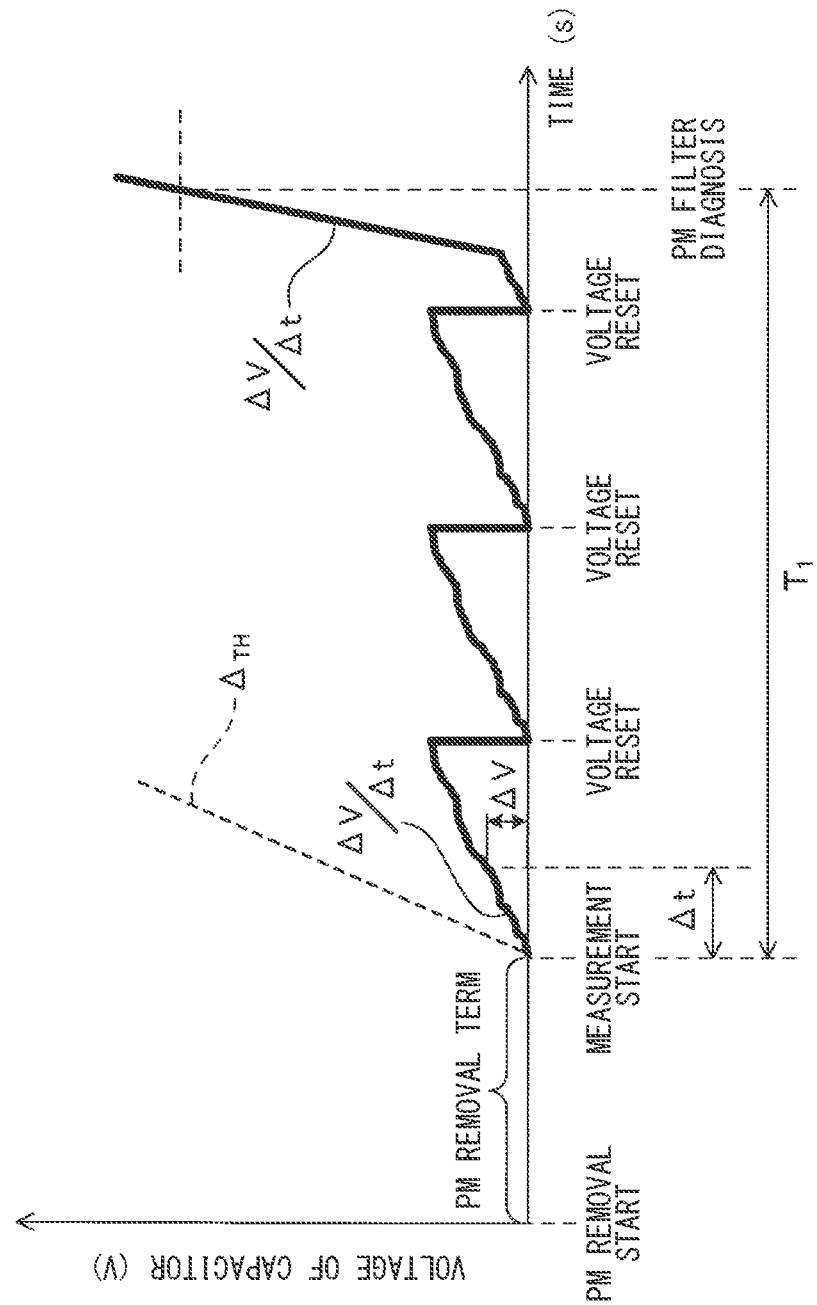
FIG. 36 is a graph showing the time change of the capacitor voltage when the particulate matter detection sensor is normal in the fifteenth embodiment.

As shown in FIG. 36, after removing the PM 8 by utilizing the heater, the control portion 7 in the embodiment measures a time increase rate $\Delta V/\Delta t$ of the voltage V of the capacitor 3. More specifically, after removing the PM 8, the control portion 7 waits for a predetermined time $\Delta t$ and measures an increase amount $\Delta V$ of the voltage V. The control portion 7 divides this increase amount $\Delta V$ by $\Delta t$ to calculate the time increase rate $\Delta V/\Delta t$. The control portion 7 determines whether the time increase rate $\Delta V/\Delta t$ is lower than a predetermined threshold $\Delta_{TH}$. The threshold $\Delta_{TH}$ may be set to, for example, a time increase rate of the capacitor voltage when the one current path 80 of the PM 8 is formed between the pair of electrodes 2 (that is, a minimum value of the time increase rate).

Figure 38:
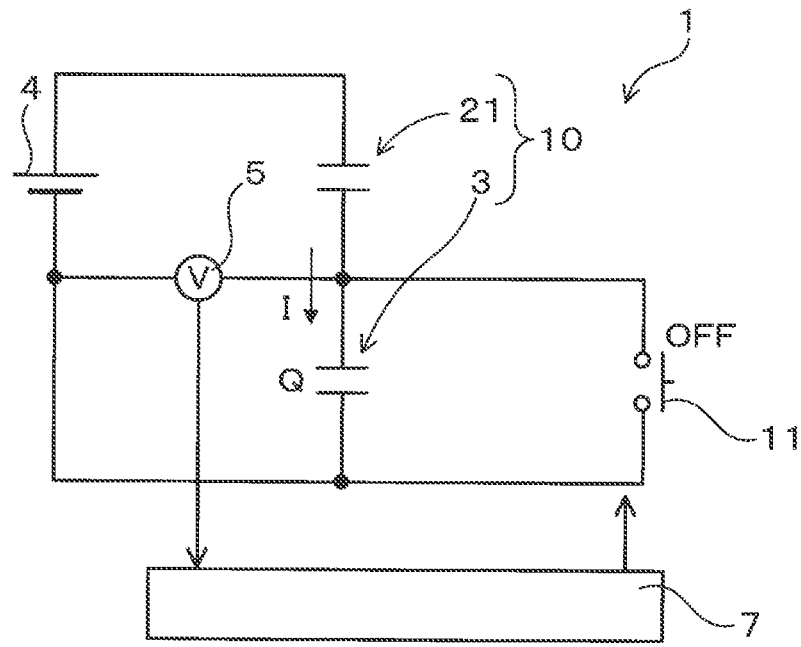
FIG. 38 is a conceptual diagram of the particulate matter detection system when a switch is turned off in the fifteenth embodiment.
Figure 39:
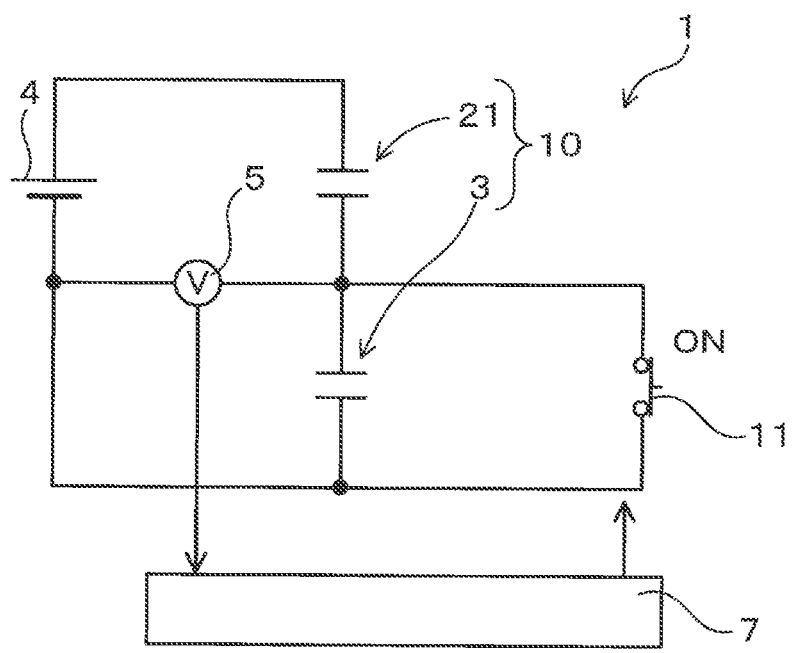
FIG. 39 is a conceptual diagram of the particulate matter detection system when the switch is turned on in the fifteenth embodiment.

When the time increase rate $\Delta V/\Delta t$ is lower than the threshold $\Delta_{TH}$, the control portion 7 determines whether the PM sensor 20 is normal, and starts the measurement of the PM 8. However, even in this case, the poisoning matter 18 may be slightly attached, and the slight current I may flow between the pair of electrodes 2. In this case, the voltage of the capacitor 3 gradually increases. Therefore, the control portion 7 causes the switch 11 to turn on at predetermined time intervals (see FIG. 38 and FIG. 39), and periodically discharges the charge Q stored in the capacitor 3. Thereby, the voltage of the capacitor 3 increases due to the current I flowing through the poisoning matter 18, and the control portion 7 is prevented from erroneously determining that the current path 80 of the PM 8 is formed.

As shown in FIG. 36, when the current path 80 of the PM 8 is formed, the voltage of the capacitor 3 suddenly increases. When the time increase rate $\Delta V/\Delta t$ of the voltage of the capacitor 3 exceeds the threshold $\Delta_{TH}$ within a predetermined term $T_1$ after the measurement of the PM 8 starts, the control portion 7 determines that the filter 14 is broken.

Figure 37:
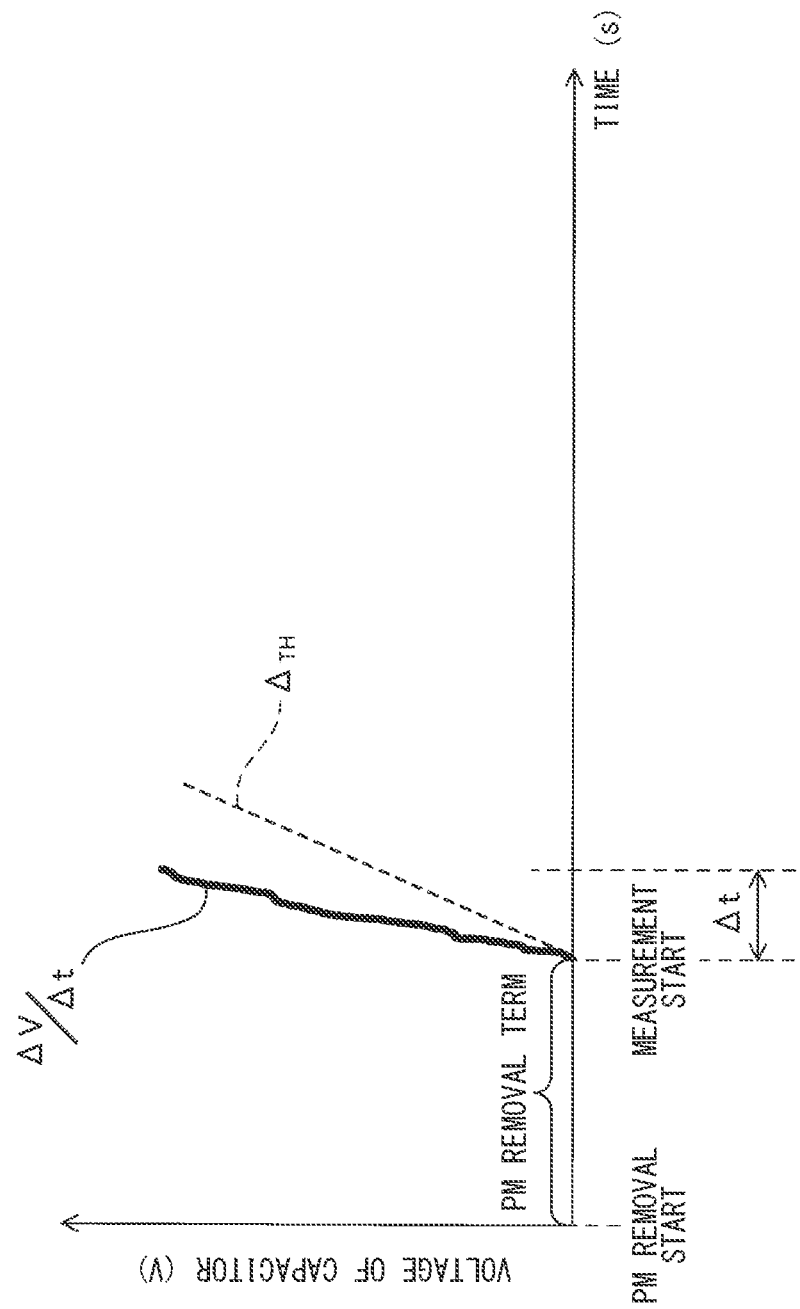
FIG. 37 is a graph showing the time change of the capacitor voltage when the particulate matter detection sensor is broken in the fifteenth embodiment.

In the embodiment, as shown in FIG. 37, after removing the PM 8 by utilizing the heater, the control portion 7 measures the time increase rate $\Delta V/\Delta t$ of the voltage described above. When the measurement value exceeds the threshold $\Delta_{TH}$ described above, the control portion 7 7 determines that the PM sensor 20 is broken (that is, the PM sensor 20 is poisoned).

Figure 40:
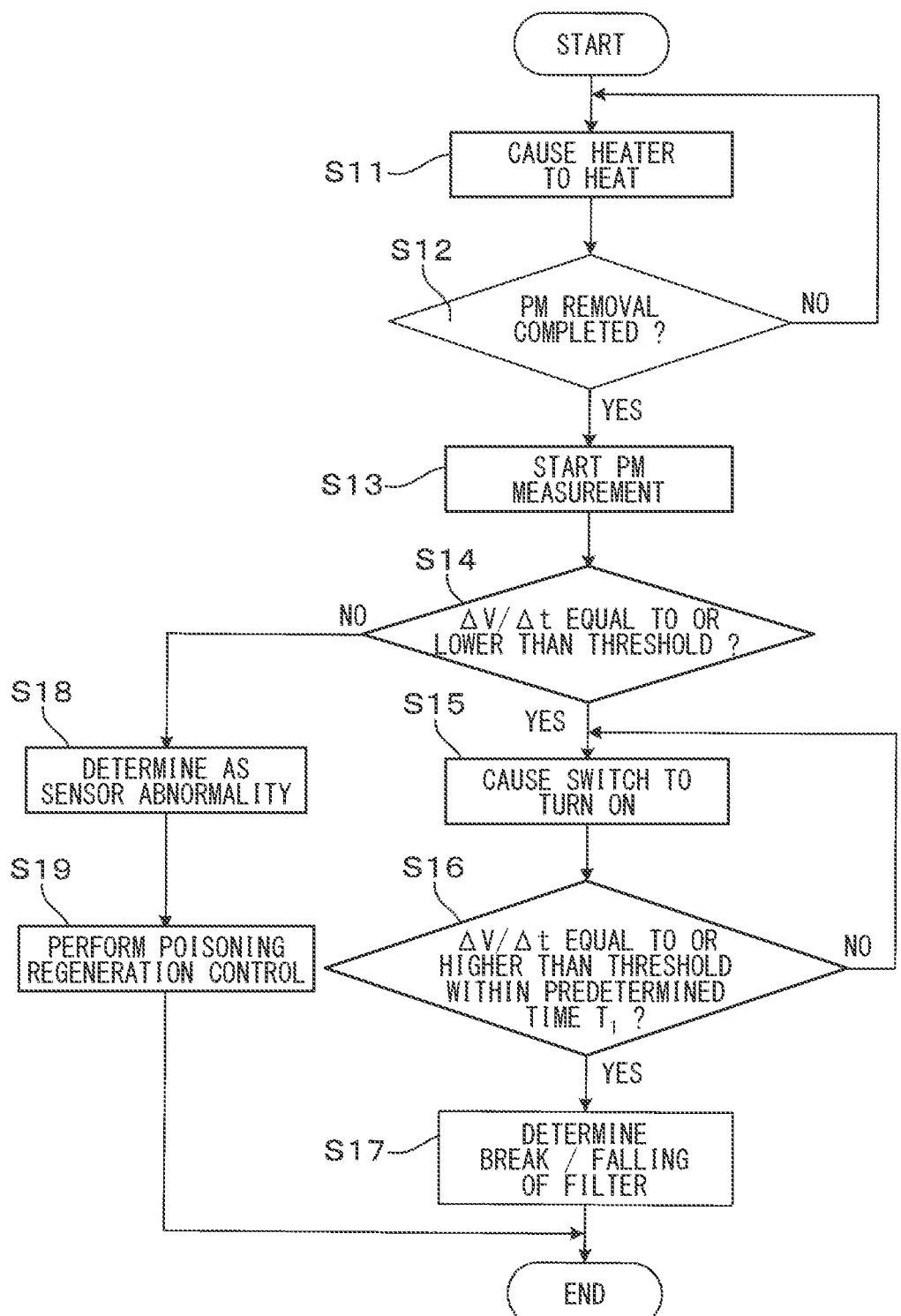
FIG. 40 is a flowchart of the control portion in the fifteenth embodiment.

A flowchart of the control portion 7 will be described with reference to FIG. 40. As shown in FIG. 40, the control portion 7 first performs a step S11. Here, the control portion 7 causes the heater to generate the heat to remove the PM 8. Thereafter, the process shifts to a step S12. Here, the control portion 7 determines whether the removal of the PM 8 is completed. For example, the control portion 7 determines whether the heat of the heater continues for a predetermined time. When the control portion 7 determines as Yes, the process shifts to a step S13. The control portion 7 starts the measurement of the PM 8.

Thereafter, the process shifts to a step S14. Here, the control portion 7 determines whether the time increase rate $\Delta V/\Delta t$ of the voltage of the capacitor 3 is equal to or lower than the threshold $\Delta_{TH}$, the time increase rate $\Delta V/\Delta t$ being measured immediately after the removal of the PM 8. Here, when the control portion 7 determines as No (that is, the time increase rate $\Delta V/\Delta t$ has exceeded the threshold $\Delta_{TH}$: see FIG. 37), the process shifts to a step S18. The control portion 7 determines that the PM sensor 20 is broken. The process shifts to a step S19. The control portion 7 performs a poisoning regeneration control. For example, the control portion 7 heats the heater to a higher temperature than the normal PM removal temperature to remove the poisoning matter 18.

In the step S14, when the control portion 7 determines as Yes (that is, the time increase rate $\Delta V/\Delta t$ is equal to or lower than the threshold $\Delta_{TH}$: see FIG. 36), the process shifts to a step S15. Here, the control portion 7 causes the switch 11 to turn on, and discharges the charge Q stored in the capacitor 3. Thereafter, the process shifts to a step S16. Here, the control portion 7 determines whether the time increase rate $\Delta V/\Delta t$ of the voltage of the capacitor 3 is equal to or higher than the threshold $\Delta_{TH}$ within the predetermined term Ti after the measurement of the PM 8 starts. When the control portion 7 determines as Yes here, the process shifts to a step S17. The control portion 7 determines that the filter 14 is broken. When the control portion 7 determines as No, the process returns to the step S15.

The operation effect of the embodiment will be described. In the embodiment, as shown in FIG. 36 and FIG. 40, after removing the PM 8, the control portion 7 measures the time increase rate $\Delta V/\Delta t$ of the voltage. When the measured value is lower than the threshold $\Delta_{TH}$, the control portion 7 causes the switch 11 to turn on at fixed time intervals. Thereby, the charge stored in the capacitor 3 is periodically discharged. In such a manner, even when the poisoning matter 18 is slightly attached to the PM sensor 20 and the current I slightly flows, the voltage of the capacitor 3 is periodically reset. Therefore, the control portion 7 is prevented from erroneously determining that the PM 8 is attached.

In the embodiment, as shown in FIG. 37 and FIG. 40, when the time increase rate $\Delta V/\Delta t$ described above is higher than the threshold $\Delta_{TH}$, the control portion 7 determines that the PM sensor 20 is broken. Therefore, it may be possible to detect that the PM sensor 20 is poisoned and broken. In addition, the fifteenth embodiment has the similar configurations and operation effects with in the first embodiment.

Sixteenth Embodiment

Figure 41:
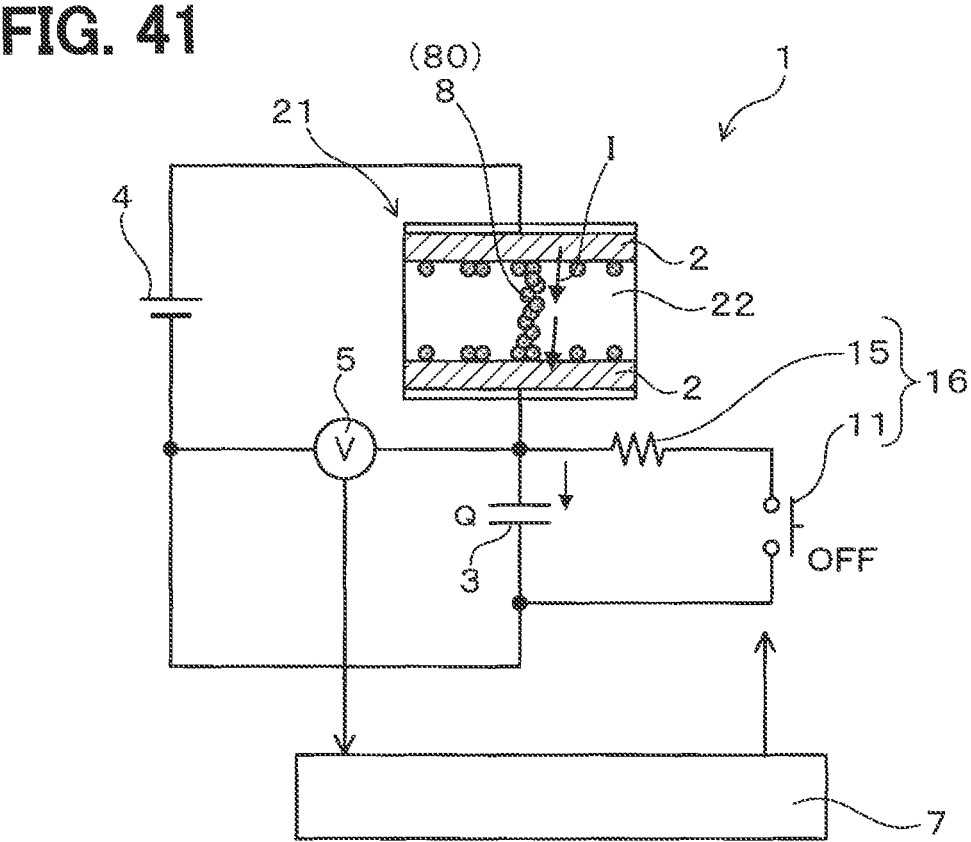
FIG. 41 is a conceptual diagram of the particulate matter detection system when the switch is turned off in a case of a normal measurement in a sixteenth embodiment.

The embodiment corresponds to an example in which the control method by the control portion 7 is changed. As shown in FIG. 41, the PM detection system 1 in the embodiment includes the switch 11 similarly to the fifteenth embodiment. A resistor 15 is connected to this switch 11 in series, which configures a series connector 16. The series connector 16 is connected to the capacitor 3 in parallel.

Figure 42:
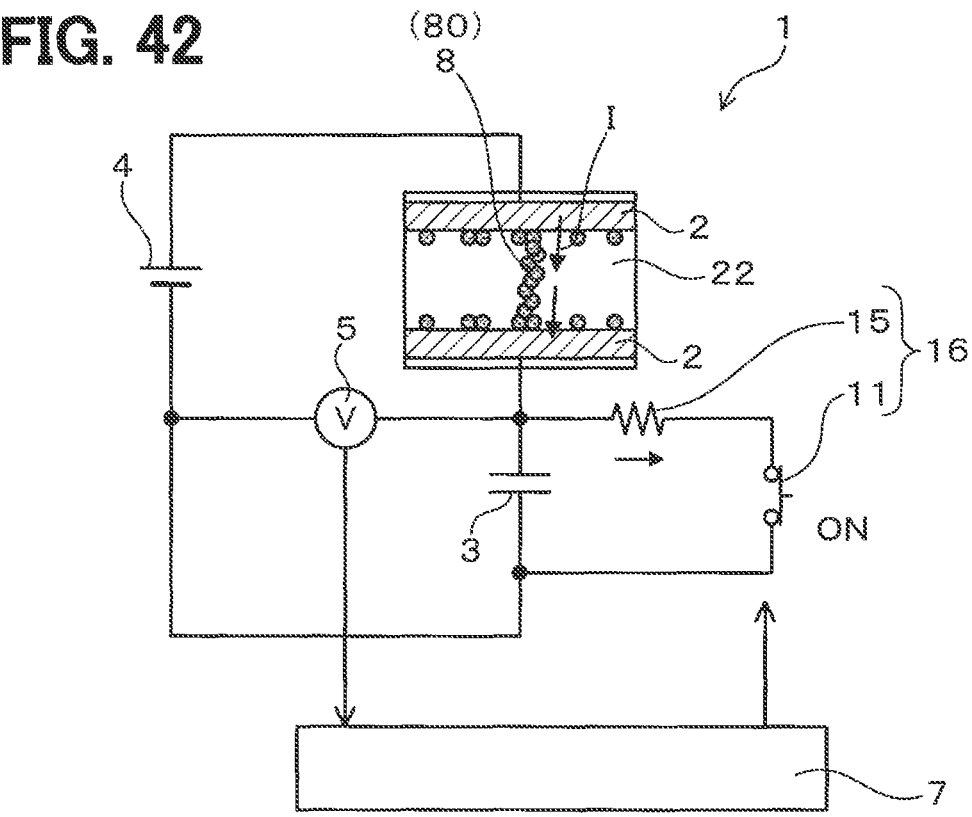
FIG. 42 is a conceptual diagram of the particulate matter detection system when the switch is turned on in the case of the normal measurement in the sixteenth embodiment.

As shown in FIG. 41 and FIG. 42, the control portion 7 cyclically switches the on-off states of the switch 11. When the normal PM 8 (for example, about 0.1 μm in particle diameter) is deposited on the deposition surface 22, the current I flows between the pair of electrodes 2. Therefore, when the voltage of the capacitor 3 increases while the switch 11 turns off, the control portion 7 is able to determine that the normal PM 8 is deposited on the deposition surface 22.

Figure 43:
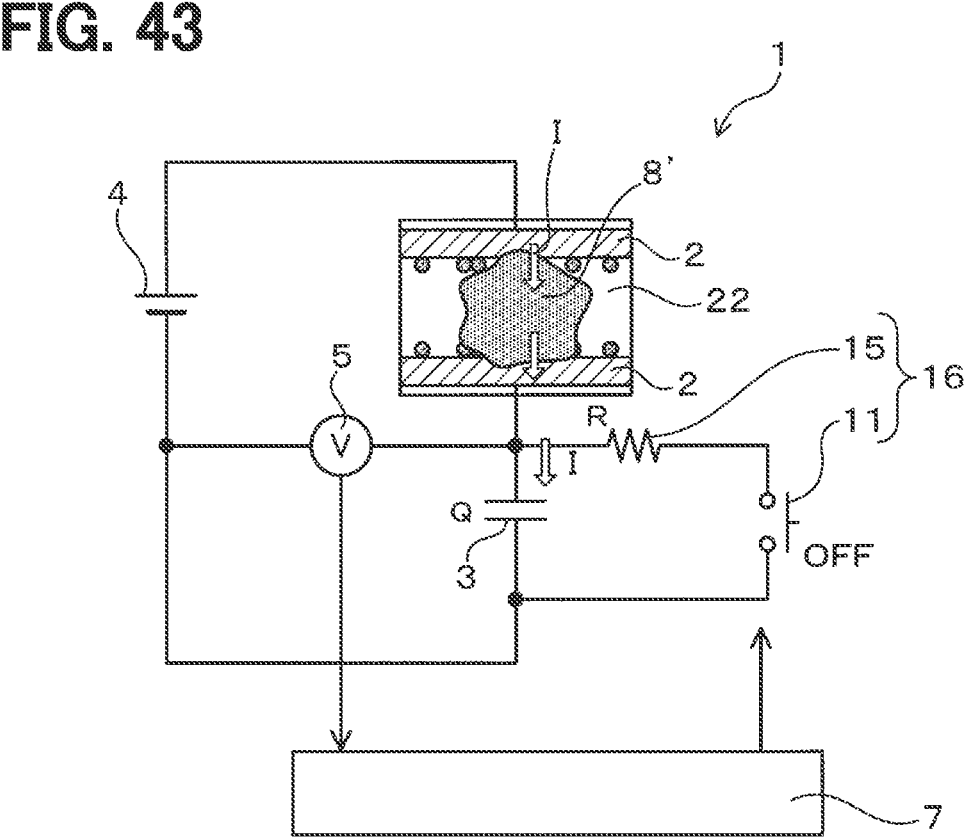
FIG. 43 is a conceptual diagram of the particulate matter detection system when the switch is turned off in a case where a large PM is attached in a sixteenth embodiment.
Figure 44:
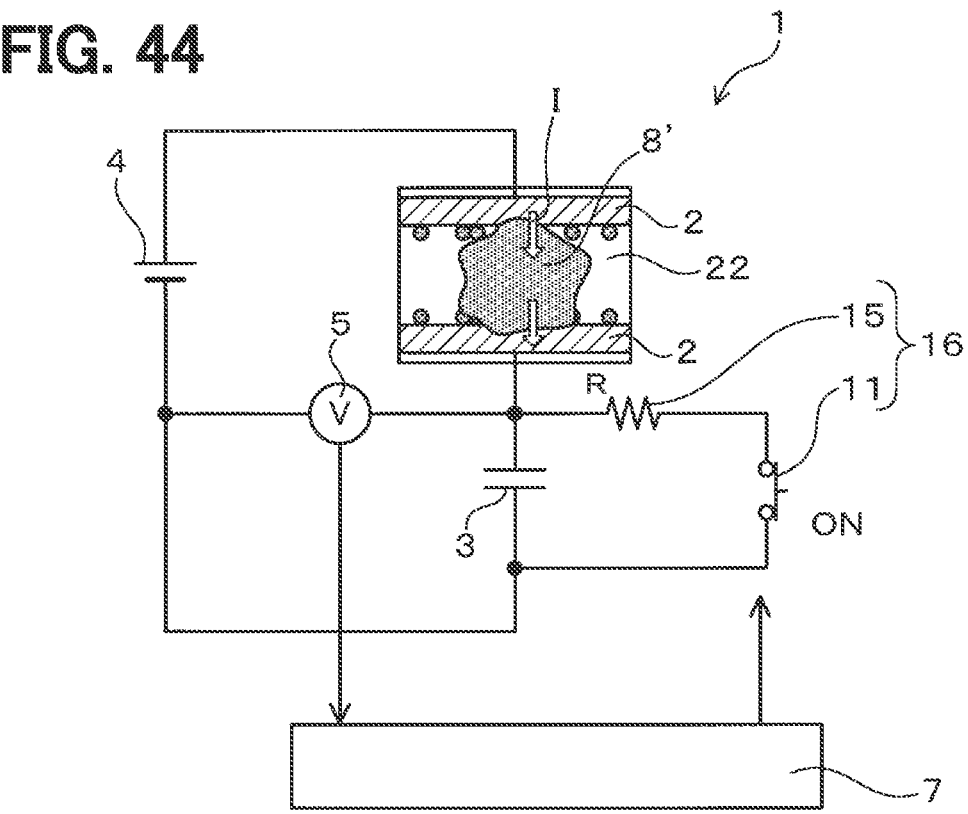
FIG. 44 is a conceptual diagram of the particulate matter detection system when the switch is turned on in the case where the large PM is attached in the sixteenth embodiment.

As shown in FIG. 43 and FIG. 44, a large PM 8' having the larger particle diameter than the normal PM 8 is deposited on the deposition surface 22. The large PM 8' is generated, for example, when the PM 8 deposits on the inner surface of the exhaust pipe 13 (see FIG. 15) and this is separated for some reason. The large PM 8' is larger than the distance between the pair of electrodes 2. The large PM 8' may be defined as the PM 8 having the particle diameter larger than 2.5 μm.

The particle diameter of the large PM 8' is large. Therefore, when the large PM 8' is attached, the large current flows between the electrodes 2. Accordingly, the voltage of the capacitor 3 suddenly increases, and the control portion 7 may erroneously determine that the PM 8 is deposited on the deposition surface 22. In order to avoid this erroneous determination, in the embodiment, the attachment of the large PM 8' is detected by utilizing the switch 11 described above, the resistor 15, or the like.

That is, as described above, the control portion 7 cyclically switches the on-off states of the switch 11. As shown in FIG. 44, the large current I flows when the large PM 8' is deposited on the deposition surface 22. Then, when the switch 11 turns on, the current I flows to the resistor 15, and the voltage drop (=IR) is generated. This voltage drop is measured by the voltage measurement portion 5. When a time change rate $\Delta IR/\Delta t$ of the voltage drop is higher than a predetermined value $\Delta_{IRTH}$, the control portion 7 determines that the large PM 8' is deposited on the deposition surface 22.

Figure 45:
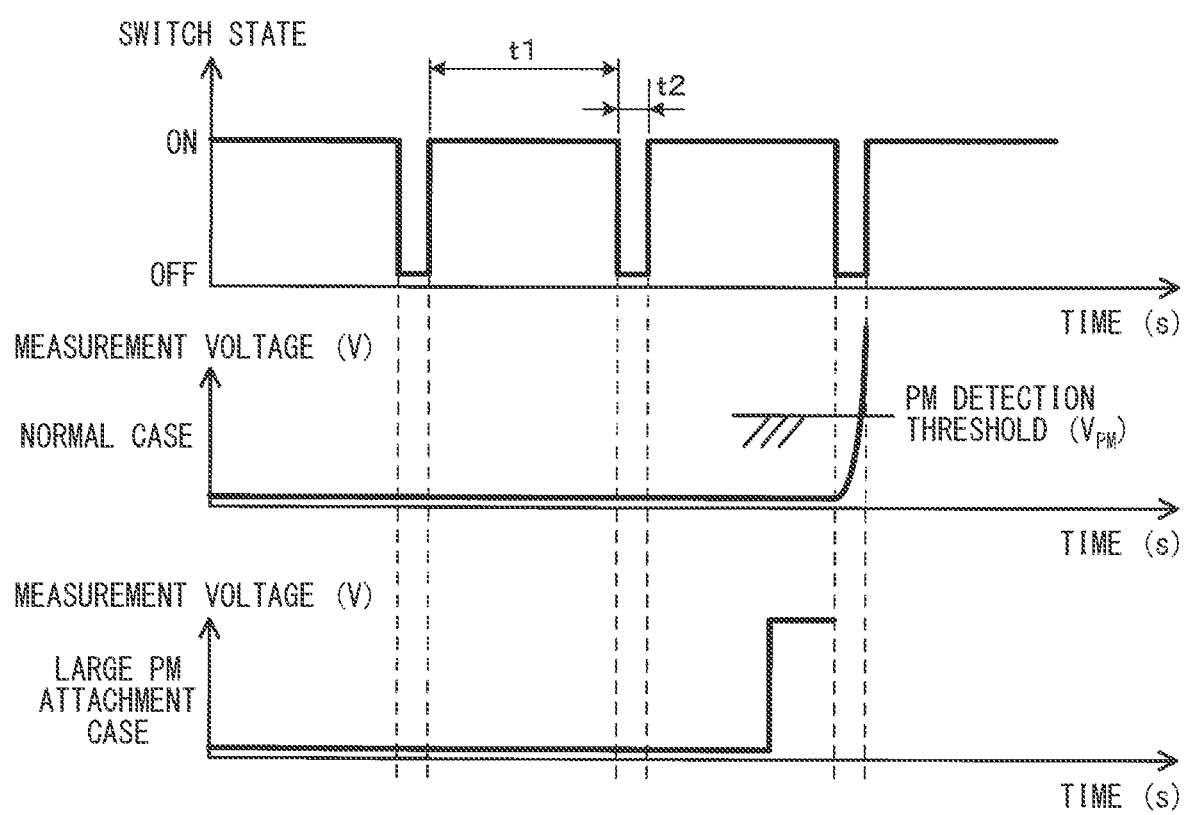
FIG. 45 is a graph showing the time changes of the capacitor voltage in the case of the normal measurement and in the case where the large PM is attached in the sixteenth embodiment.

As shown in FIG. 45, in the embodiment, the control portion 7 causes the switch 11 to turn on for the predetermined time $t_1$, and thereafter causes the switch 11 to turn off for the predetermined time $t_2$. This on-off operation is repeated. When the normal PM 8 is deposited, the current I is slight. Therefore, the voltage drop generated at the resistor 15 when the switch 11 turns on is small. Therefore, it is not detectable whether the normal PM 8 is deposited when the switch 11 turns on. However, when the switch 11 turns off, the capacitor 3 is charged due to the slight current I flowing through the PM 8 and the voltage V of the capacitor 3 suddenly increases. Therefore, it may be possible to detect that the normal PM 8 is deposited. In the embodiment, when the voltage V of the capacitor 3 exceeds a PM detection threshold $V_{PM}$ in while the switch 11 turns off, the control portion 7 determines that the normal PM 8 is deposited.

As described above, when the large PM 8' is deposited, the large current I flows. When the switch 11 turns on, this current I flows to the resistor 15, and the voltage drop is generated. The control portion 7 determines that the large PM 8' is deposited when the time change rate ΔIR/Δt of this voltage drop is higher than the predetermined value $\Delta_{IRTH}$.

Figure 46:
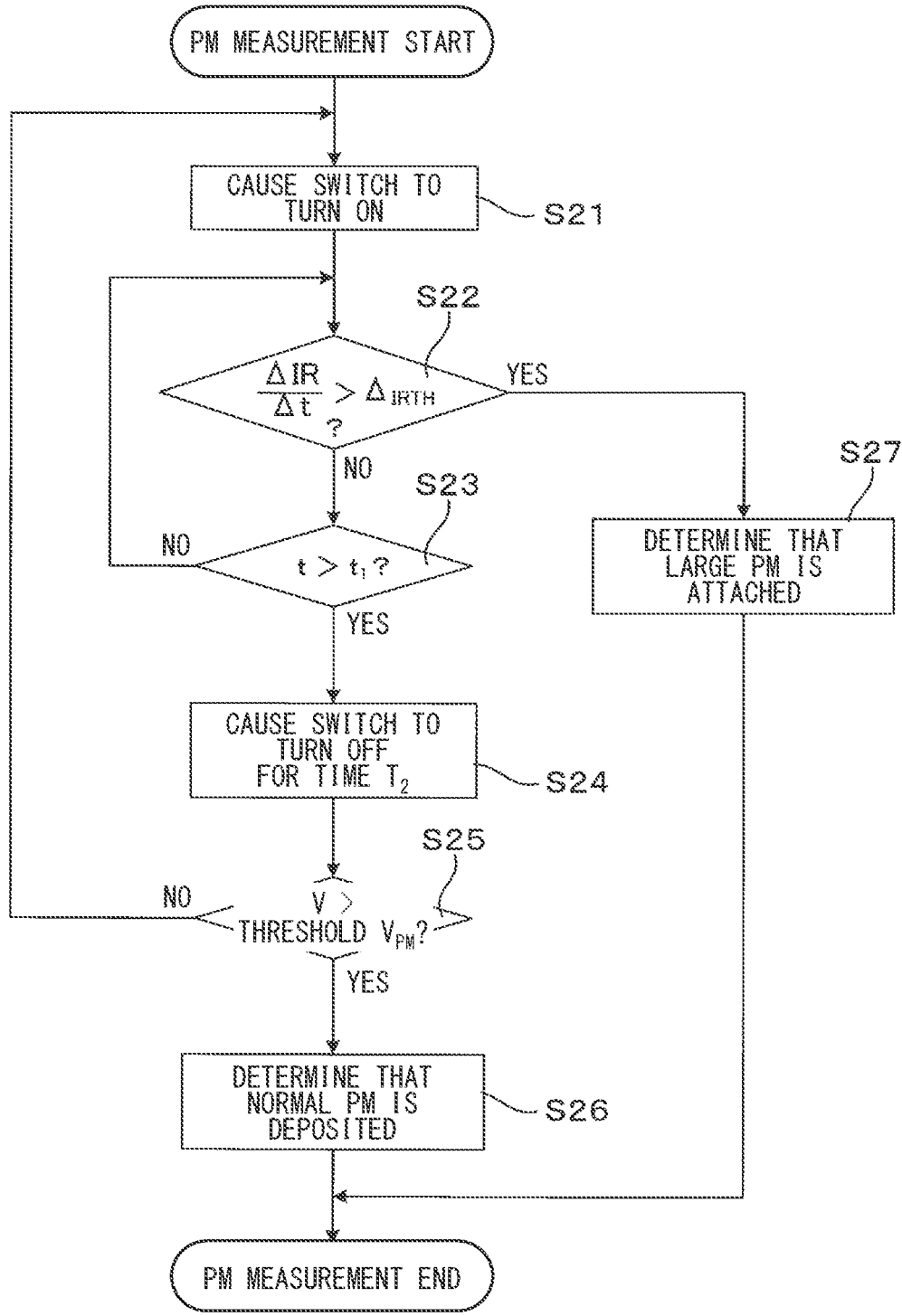
FIG. 46 is a flowchart of the control portion in the sixteenth embodiment.

A flowchart of the control portion 7 will be described with reference to FIG. 46. As shown in FIG. 46, the control portion 7 first performs a step S21. Here, the control portion 7 causes the switch 11 to turn on. Thereafter, the process shifts to a step S22. The control portion 7 determines whether the time change rate ΔIR/Δt of the voltage drop generated at the resistor 15 is higher than the predetermined threshold $\Delta_{IRTH}$. When the control portion 7 determines as Yes here, the process shifts to a step S27. The control portion 7 determines that the large PM 8' is attached. Thereafter, for example, the control portion 7 performs a process of heating the heater and removing the large PM 8'. When the control portion 7 determines as No in the step S22, the process shifts to a step S23. The control portion 7 determines whether a time t at which the switch 11 turns on is higher than the on-state time $t_1$ described above. When the control portion 7 determines as No here, the process returns to the step S22. When the control portion 7 determines as Yes, the process shifts to a step S24.

In the step S24, the control portion 7 causes the switch 11 to turn off only for the on-state time $t_2$ described above. Thereafter, the process shifts to a step S25. The control portion 7 determines whether the measured voltage V exceeds the threshold $V_{PM}$. When the control portion 7 determines as No here, the process returns to the step S21. When the control portion 7 determines as Yes, the process shifts to a step S26. In the step S26, the control portion 7 determines that the normal PM 8 is deposited on the deposition surface 22 (that is, the current path 80 due to the PM 8 is formed). The control portion 7 determines that the filter 14 is broken when the current path 80 of the PM 8 is formed within the predetermined time after the measurement of the PM 8 starts.

The operation effect of the embodiment will be described. As shown in FIG. 45, the control portion 7 in the embodiment periodically switches the on-off states of the switch 11. When causing the switch 11 to turn on, the control portion 7 measures the voltage drop of the resistor 15 by utilizing the voltage measurement portion 5. When the time change rate ΔIR/Δt of the voltage drop is higher than the predetermined value $\Delta_{IRTH}$, the control portion 7 determines that the large PM 8' is deposited on the deposition surface 22.

In such a manner, it may be possible to prevent the erroneous determination that the normal PM 8 is deposited when the large PM 8' is attached. In addition, the sixteenth embodiment has the similar configurations and operation effects with in the first embodiment.

Seventeenth Embodiment

Figure 47:
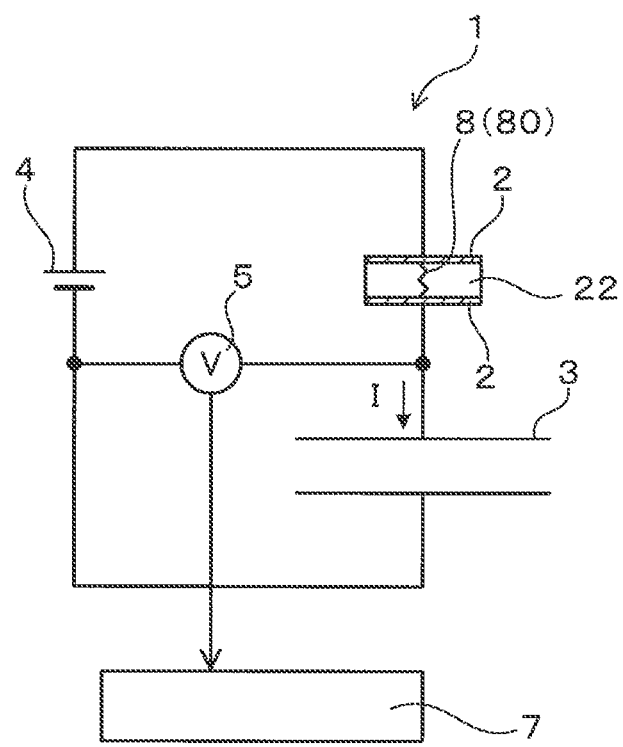
FIG. 47 is a conceptual diagram of the particulate matter detection system in a seventeenth embodiment.

The embodiment corresponds to an example in which the control method of the control portion 7 is changed. As shown in FIG. 47, in the embodiment, the capacitor 3 having a relatively large capacitance is utilized. In a case where such a capacitor 3 having the large capacitance is utilized, even when the current path 80 of the PM 8 is formed between the pair of electrodes 2, the capacitor 3 is not charged immediately and the voltage V gradually increases. When the number of the current paths 80 is small, the flowing current I is small. Therefore, the time increase rate ΔV/Δt of the voltage V of the capacitor 3 is small. As the number of the current paths 80 increases, the current I increases. Therefore, the time increase rate ΔV/Δt of the voltage increases. The control portion 7 in the embodiment measures the time increase rate ΔV/Δt of the voltage V of the capacitor 3. The control portion 7 calculates a resistance R between the pair of electrodes 2 (that is, the resistance of the PM 8) based on the measurement value.

For example, it is assumed that the charge stored in the capacitor 3 is defined as Q, the capacitance is defined as C, the voltage V of the power supply 4 is defined as $V_B$, the voltage of the capacitor 3 is define as V, the current flowing through the capacitor 3 is defined as I, the resistance of the PM 8 is defined as R, a fine charge amount of the voltage V of the capacitor 3 is defined as ΔV, and a fine time is defined as Δt.

$$I = dQ/dt \fallingdotseq \Delta Q/\Delta t = C\Delta V/\Delta t$$
$$= (V_B - V)/R$$
$$R = (V_B - V)\Delta t/(C\Delta V)$$

The resistance R is able to be calculated based on the equation described above.

The control portion 7 determines that the PM 8 having the predetermined amount is deposited on the deposition surface 22 when a calculation value of the resistance R is lower than a predetermined threshold $R_{TH}$. The control portion 7 determines that the filter 14 is broken when the resistance R is lower than the threshold $R_{TH}$ within the predetermined time after the measurement of the PM 8 starts (that is, determines that the PM 8 having the predetermined amount is deposited on the deposition surface 22).

The operation effect of the embodiment will be described. In the configuration described above, it may be possible to calculate the resistance R of the PM 8 deposited between the pair of electrodes 2. Therefore, it may be possible to accurately detect that the PM 8 is deposited on the deposition surface 22. In addition, the seventeenth embodiment has the similar configurations and operation effects with in the first embodiment.

Eighteenth Embodiment

Figure 48:
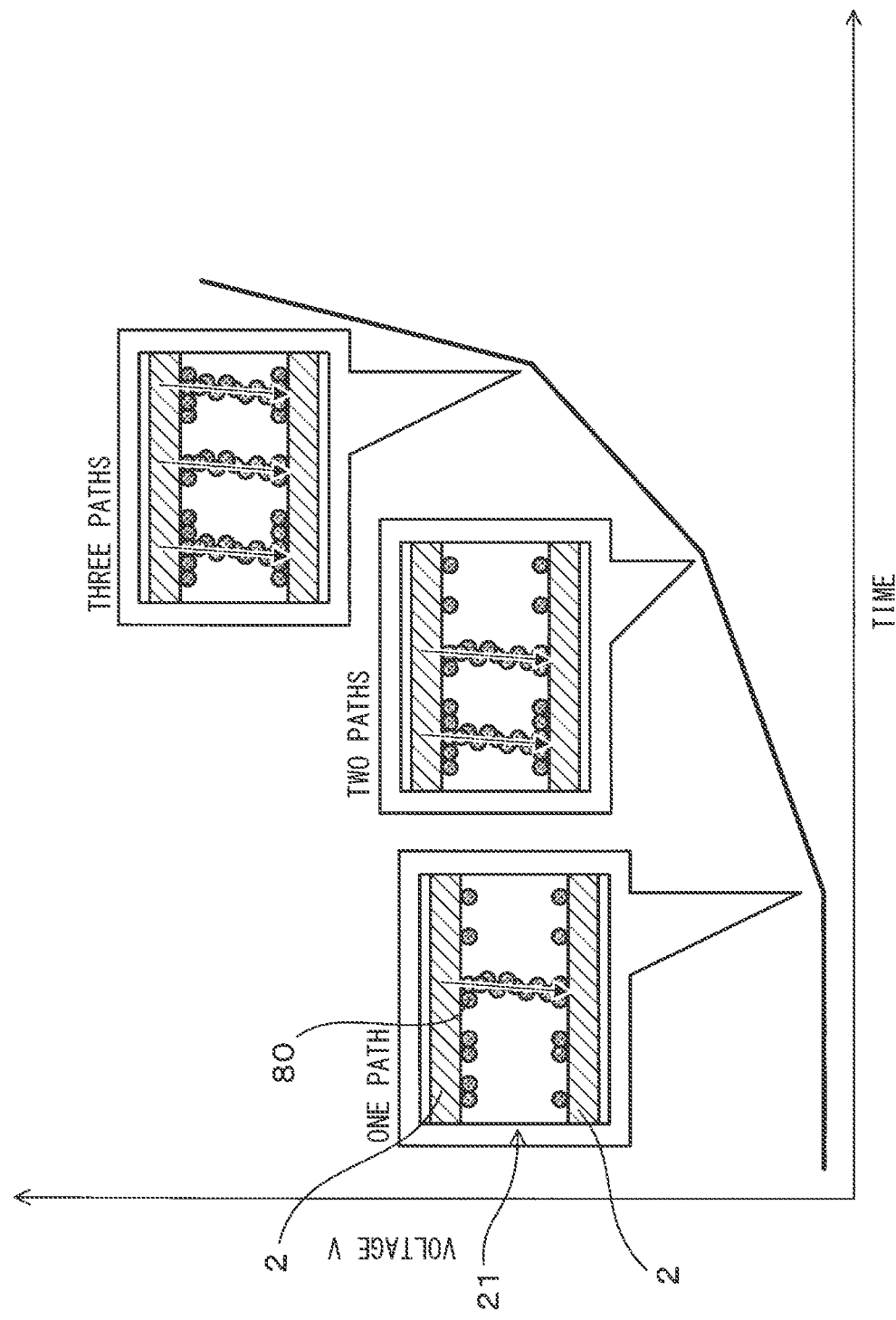
FIG. 48 is a graph showing the time change of the capacitor voltage in an eighteenth embodiment.

The embodiment corresponds to an example in which the control method of the control portion 7 is changed. In the embodiment, the capacitor 3 (see FIG. 47) having a sufficiently large capacitance is utilized similarly to the seventeenth embodiment. FIG. 48 shows the voltage change of the capacitor 3 when the capacitor 3 has the large capacitance. As shown in FIG. 48, when the one current path 80 of the PM 8 is formed between the pair of electrodes 2, the current I slightly flows. In the embodiment, the capacitance of the capacitor 3 is set to be large. Therefore, the time increase rate ΔV/Δt of the voltage V is small. Thereafter, when the second current path 80 is formed, the current I increases, and the time increase rate ΔV/Δt of the voltage V slightly increases. Furthermore, when the third current path 80 is formed, the current I further increases, and the time increase rate ΔV/Δt of the voltage V further increases.

The control portion 7 in the embodiment calculates the resistance R between the pair of electrodes 2 (that is, the resistance of the PM 8) based on the time increase rate ΔV/Δt of the voltage V similarly to the seventeenth embodiment. When the calculation value of this resistance R changes a predetermined time $N_{th}$ (three times in the embodiment) or more, the control portion 7 determines that the PM 8 having the predetermined amount is deposited on the deposition surface 22. The control portion 7 determines that the filter 14 is broken when the calculation value of the resistance R changes the $N_{TH}$ or more within the predetermined time after the measurement of the PM 8 starts (that is, determines that the PM 8 having the predetermined amount is deposited on the deposition surface 22).

The operation effect of the embodiment will be described. In such a manner, it may be possible to determine that the PM 8 is deposited when the multiple current paths 80 are formed. Therefore, it may be possible to prevent the erroneous detection of the PM 8. A timing at which the first current path 80 is formed varies depending on the attachment manner of the PM 8. However, it may be possible to prevent the variation by averaging formation times of the multiple current paths 80. Therefore, it may be possible to accurately detect the time at which the current path 80 is formed. In addition, the eighteenth embodiment has the similar configurations and operation effects with in the first embodiment.

Experimental Example 1

Figure 49:
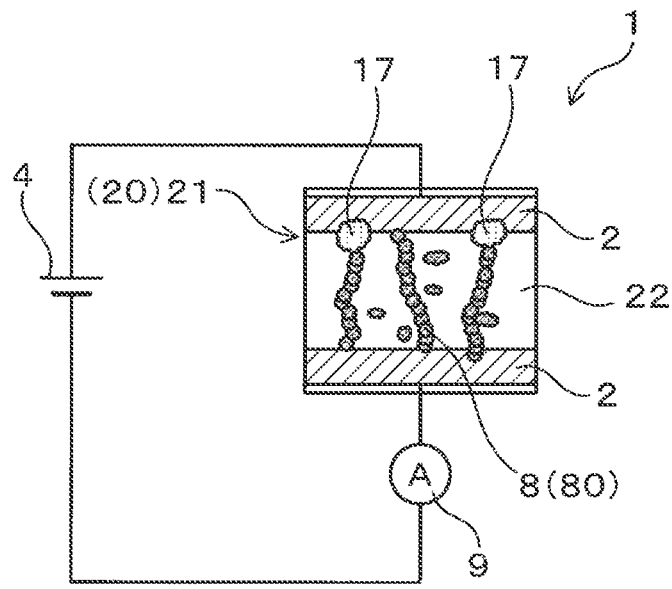
FIG. 49 is a circuit diagram of the particulate matter detection system as a comparative example in a first experimental example.

An experiment was performed for confirming the effect of the present disclosure. As shown in FIG. 49, the PM detection system 1 as a comparative example was configured. In this PM detection system 1, the current sensor 9 measures the current I of the detection portion 21. As the PM sensor 20 utilized for this PM detection system 1, a new PM sensor 20 and a PM sensor 20 to which the ash 17 is attached were prepared. As shown in FIG. 49, in the PM sensor 20 to which the ash 17 is attached, the current path 80 is hard to be formed. Therefore, the current is hard to flow.

In the PM sensor 20 described above, the electrodes 2 is exposed from the end surface S1 (see FIG. 20).

Figure 50:
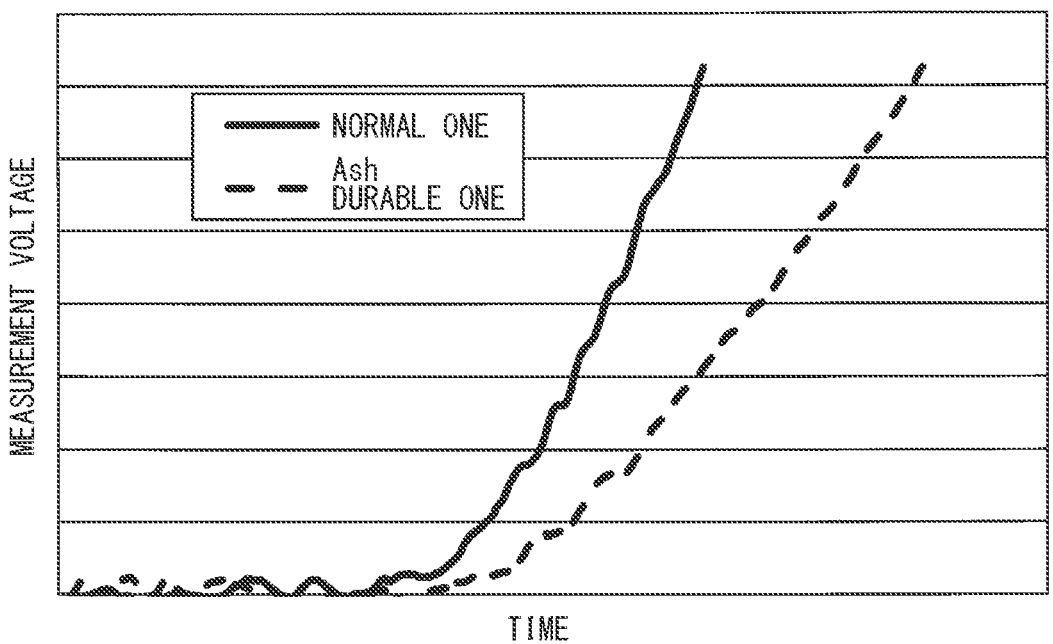
FIG. 50 is a graph measuring, by using the circuit of FIG. 49, the time changes of outputs by the new particulate matter detection sensor and a particulate matter detection sensor to which ash is attached.

The PM 8 in the exhaust gas was measured by utilizing the two PM sensors 20 described above. The concentration of the PM 8 in the exhaust gas was 7 mg/m$^3$. The temperature of the exhaust gas was 200° C. FIG. 50 shows the measurement result. In FIG. 50, the vertical axis means the voltage drop generated at a shunt resistor inside the current sensor 9. As shown in FIG. 50, in the PM sensor 20 to which the ash 17 is attached, the current I is small. Therefore, the detection value is lower than the new PM sensor 20. Therefore, it is understood that, in the PM detection system 1 utilizing the current sensor 9 as the comparative example, it may be hard to accurately detect the PM 8 when the PM sensor 20 is utilized for a long term and the ash 17 is attached.

Figure 51:
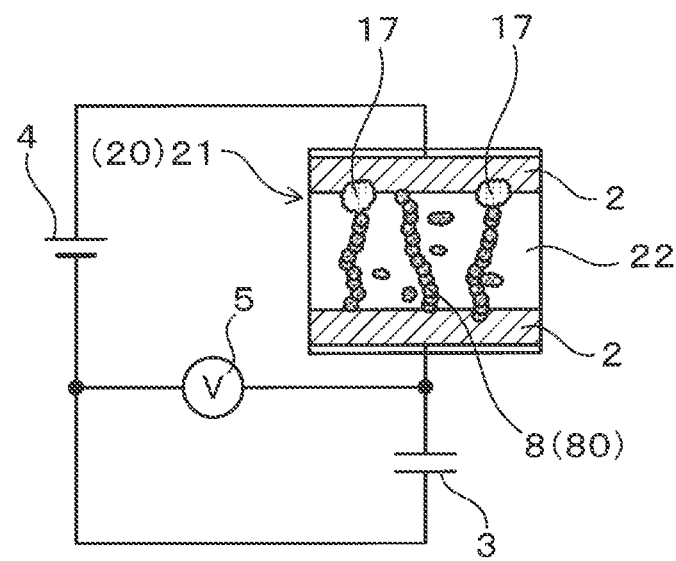
FIG. 51 is a circuit diagram of the particulate matter detection system in the first experimental embodiment.

As shown in FIG. 51, the PM detection system 1 utilizing the capacitor 3 and according to the present disclosure was prepared. The new PM sensor 20 and the PM sensor 20 to which the ash 17 is attached were prepared. The measurement of the PM 8 was performed by utilizing the PM detection system 1 of FIG. 51. As the PM sensor 20, the same one as in the comparative example was utilized. As the capacitor 3, one (see FIG. 20) separated from the PM sensor 20 was utilized. More specifically, a ceramic capacitor with a capacitance of 0.1 (µF) was utilized as the capacitor 3.

Figure 52:
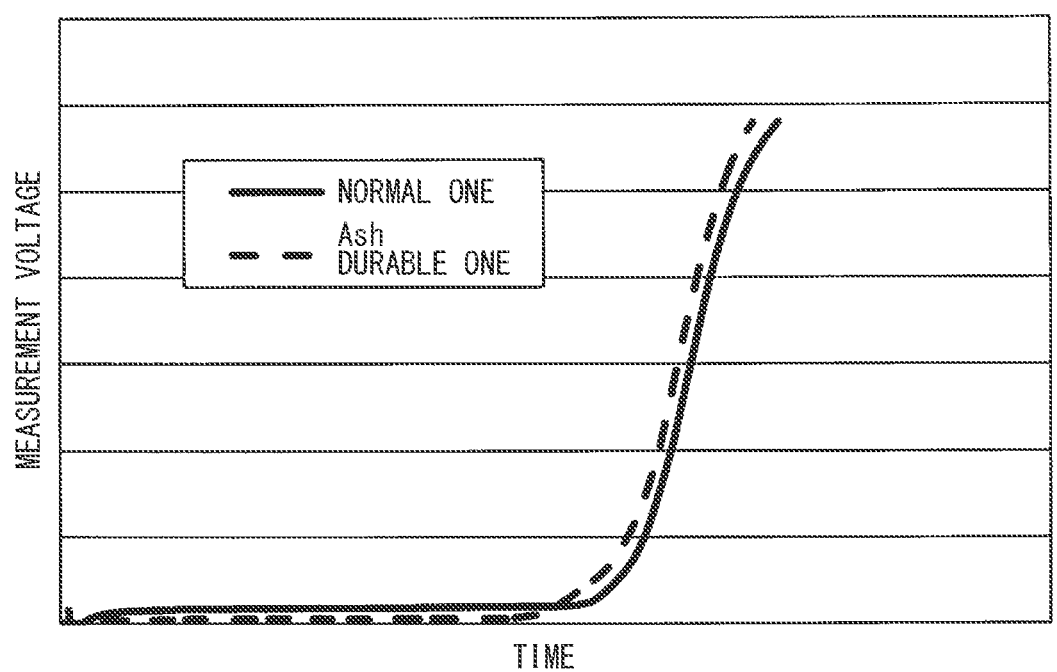
FIG. 52 is a graph measuring, by using the circuit of FIG. 51, the time changes of the outputs by the new particulate matter detection sensor and the particulate matter detection sensor to which the ash is attached.

FIG. 52 shows the measurement result of the PM 8. In the PM sensor 20 to which the ash 17 is attached, the current I is hard to flow as described above. However, by utilizing the capacitor 3, it is understood that the voltage suddenly increases even when the current I is slight. It is understood that the voltage measurement values of the PM sensor 20 to which the ash 17 is attached and the new PM sensor 20 are almost the same. From this, it is understood that, in the present disclosure, the PM 8 is accurately detectable even in a case of utilizing the deteriorated PM sensor 20 due to the attachment of the ash 17. Based on FIG. 52, it is understood that rising of the measurement value in the case of utilizing the capacitor 3 is sharper compared to in the case of utilizing the current sensor 9 (see FIG. 50). Thereby, it is understood that a detection sensitivity of the PM 8 is higher when the capacitor 3 is utilized.

Experimental Example 2

Another experiment was performed for confirming the effect of the present disclosure. The new PM sensor 20 was prepared. The PM sensor 20 in which the electrodes 2 were deteriorated by heating the heater 2 for a long time was prepared.

Figure 53:
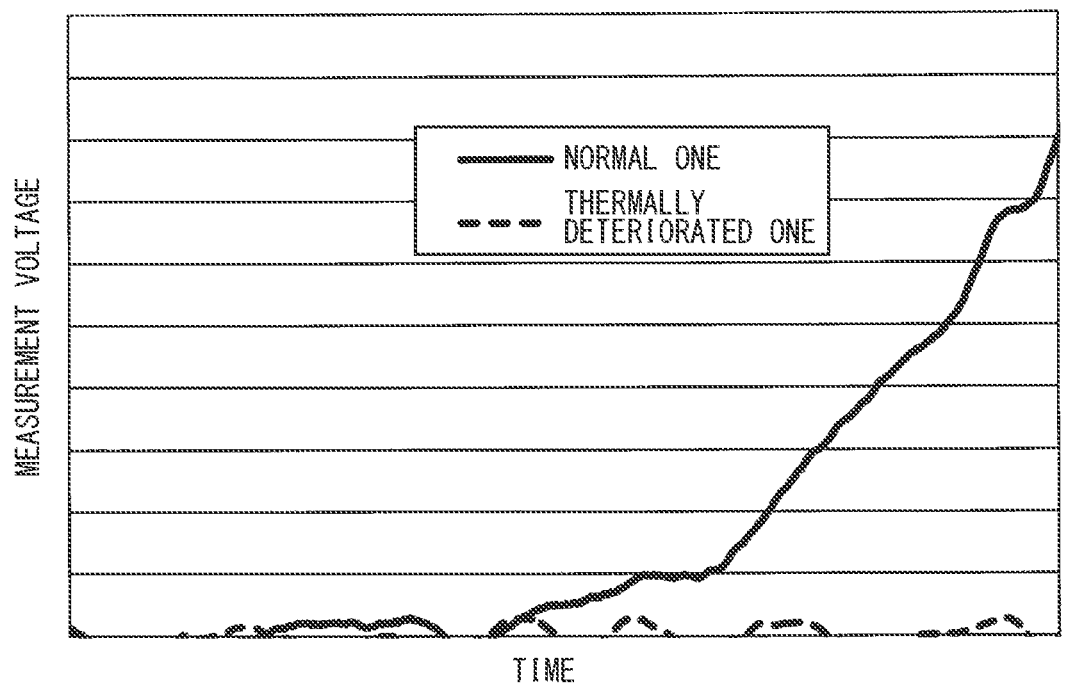
FIG. 53 is a graph measuring, by using the circuit of FIG. 56, the time changes of the outputs by the normal particulate matter detection sensor and a thermally deteriorated particulate matter detection sensor in a second experimental example.

These PM sensors 20 were attached to the PM detection system 1 (see FIG. 56) utilizing the current sensor 9 as the comparative example. The detection of the PM 8 was performed. A condition at the measurement is same as the first experimental example. That is, the concentration of the PM 8 in the exhaust gas was set to be 7 mg/m$^3$. The temperature of the exhaust gas was set to be 200° C. FIG. 53 shows the measurement result.

Figure 55:
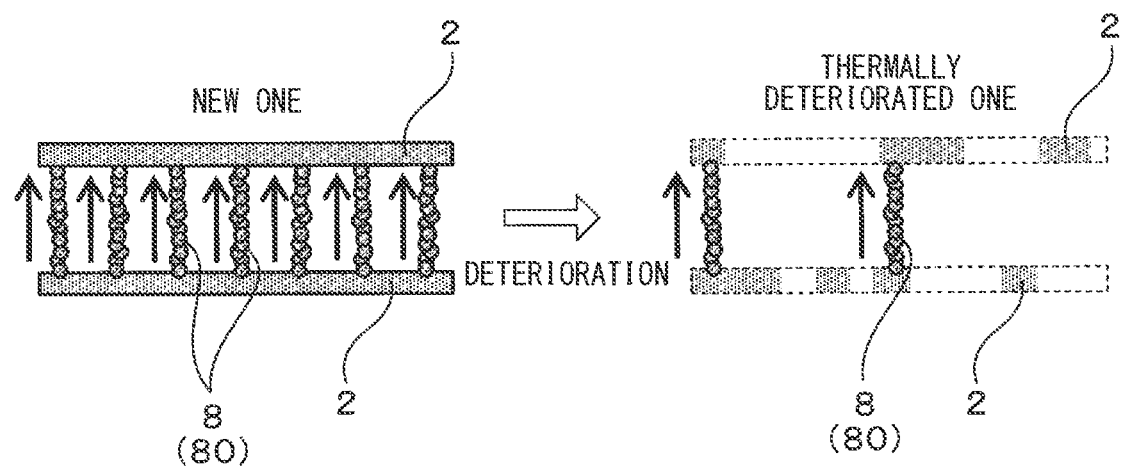
FIG. 55 is a conceptual diagram of the new particulate matter detection sensor and the thermally deteriorated particulate matter detection sensor in the second experimental example.

Based on FIG. 53, in a case of the new PM sensor 20, it is understood that the current flows for a while after the measurement of the PM 8 starts. On the other hand, in a case of the PM sensor 20 deteriorated due to the heat, it is understood that the current hardly flows even when the time passes after the measurement of the PM 8 starts. As this reason, as shown in FIG. 55, it may be considered that, in the case of the new PM sensor 20, the many current paths 80 are formed and the many currents I flow since the electrodes 2 are not evaporated. However, it may be considered that, in the case of the PM sensor 20 deteriorated by the heat, the number of the current paths 80 is small (that is, the current I is small) and the current I is not detectable by the current sensor 9 since the conductive matter (for example, Pt or the like) configuring the electrodes 2 is evaporated to be in a sponge shape.

Figure 54:
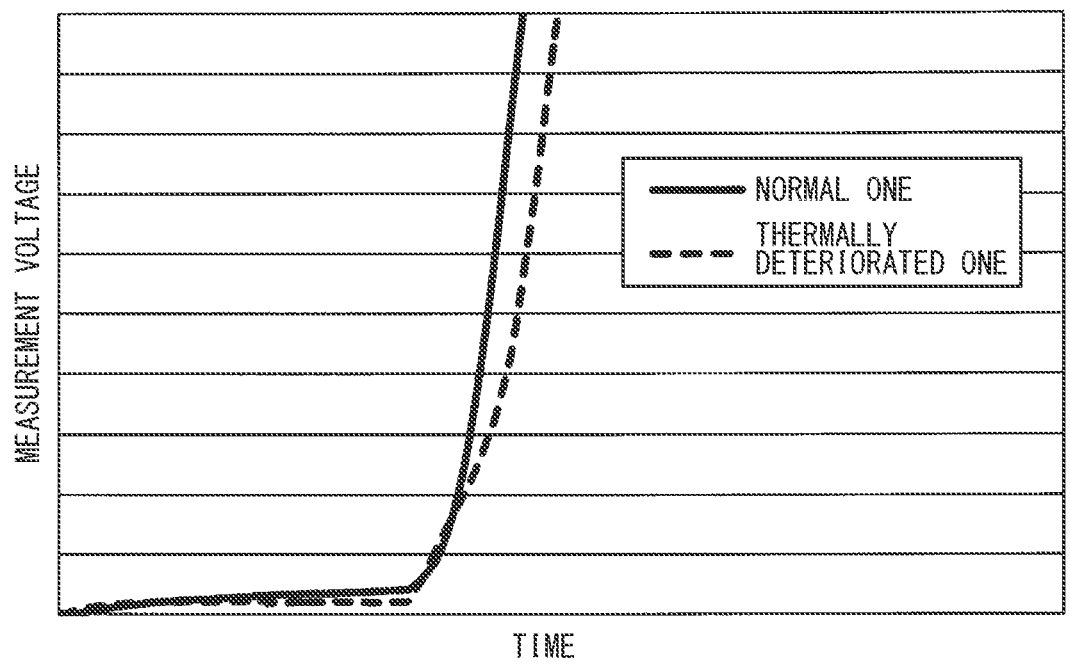
FIG. 54 is a graph measuring, by using the circuit of FIG. 20, the time changes of the outputs by the normal particulate matter detection sensor and the thermally deteriorated particulate matter detection sensor in the second experimental example.

A similar experiment was performed by utilizing the PM detection system 1 according to the example embodiment. That is, the capacitor 3 was connected to the PM sensor 20 in series (see FIG. 20), and the voltage of this capacitor 3 was measured. The capacitor 3 was placed separately from the PM sensor 20. The ceramic capacitor with a capacitance of 0.1 (µF) was utilized as the capacitor 3. FIG. 54 shows the measurement result.

Based on FIG. 54, it is understood that, in the new PM sensor 20 and the thermally deteriorated PM sensor 20, the voltages of the capacitors 3 rise at a substantially simultaneous time. As this reason, it may be considered that, in the case of the thermally deteriorated PM sensor 20, the current I is hard to flow since the electrodes 2 were evaporated to be in the sponge shape. However, it may be considered that, in the case of utilizing the capacitor 3, the voltage of the capacitor 3 suddenly increases even when the current I is slight.

The present disclosure is not limited to the respective embodiments described above, and various modifications may be adopted within the scope of the present disclosure without departing from the spirit of the disclosure.

Although the present disclosure has been described in accordance with the embodiments, it is understood that the present disclosure is not limited to such embodiments or structures. The present disclosure encompasses various modifications and variations within the scope of equivalents. In addition, various combinations and forms, and further, other combinations and forms including only one element, or more or less than these elements are also within the sprit and the scope of the present disclosure.

The invention claimed is:

1. A particulate matter detection system for detecting a particulate matter in exhaust gas, the particulate matter detection system comprising:
a particulate matter detection sensor in which at least one detection portion is provided, the at least one detection portion including
at least one pair of a plurality of electrodes and
a deposition surface which is interposed between the pair of electrodes and which the particulate matter is deposited on;
a capacitor connected to the at least one detection portion in series;
a power supply configured to apply a direct voltage to a series body including the at least one detection portion and the capacitor; and
a voltage measurement portion configured to measure a voltage of the capacitor that increases in response to charge stored in the capacitor from the power supply increasing when the pair of electrodes is conducted by the particulate matter; wherein
the particulate matter in the exhaust gas is detected based on a change in the voltage of the capacitor measured by the voltage measurement portion.

2. The particulate matter detection system according to claim 1, wherein:
the particulate matter detection sensor and the capacitor are separately provided from each other.

3. The particulate matter detection system according to claim 1, wherein:
the plurality of electrodes are arranged at a predetermined distance in the particulate matter detection sensor; and
both of the detection portion and the capacitor are provided by the plurality of electrodes.

4. The particulate matter detection system according to claim 3, wherein:
the capacitor includes the pair of electrodes;
the particulate matter is deposited between the pair of electrodes and is deposited on a surface of the pair of electrodes.

5. The particulate matter detection system according to claim 3, wherein:
a plurality of electrode pairs including the pair of electrodes adjacent to each other are provided in the particulate matter deposition sensor; and
a part of the electrodes among the plurality of electrode pairs has a deposition amount of the particulate matter, the deposition amount being smaller than a deposition amount that a remaining part of the electrode pairs has.

6. The particulate matter detection system according to claim 3, wherein:
a plurality of electrode pairs including the pair of electrodes adjacent to each other are provided in the particulate matter deposition sensor; and
each of the electrode pairs has a different capacitance from each other between the pair of electrodes, the capacitances being different from each other.

7. The particulate matter detection system according to claim 3, wherein:
the capacitor includes the pair of electrodes; and
at least one of the electrodes of the capacitor is covered with an insulation layer.

8. The particulate matter detection system according to claim 7, further comprising:
a switch connected to the capacitor in parallel; and
a control portion configured to control an on-off operation of the switch,
wherein:
the control portion performs
an application process of applying a direct voltage of the power supply to the series body,
a discharge process of, after the application process, causing the switch to turn on and discharging charge stored in the capacitor, and
a measurement process of, after the discharge process, causing the switch to turn off and measuring the voltage of the capacitor.

9. The particulate matter detection system according to claim 7, further comprising:
a series connector that
includes a resistor and the switch connected to the resistor in series and
is connected to the capacitor in parallel; and
a control portion configured to perform an operation control of the switch,
wherein:
the control portion
periodically switches on-off states of the switch,
measures a voltage drop of the resistor by utilizing the voltage measurement portion, and
determines that a large PM corresponding to the particulate matter having a particle diameter larger than 2.5 μm is deposited on the deposition surface when a time change rate of the voltage drop is higher than a predetermined value.

10. The particulate matter detection system according to claim 7, further comprising:
a control portion configured to determine whether the particulate matter is deposited on the deposition surface,
wherein:
the control portion
measures a time increase rate of the voltage of the capacitor,
calculates a resistance between the pair of electrodes based on the measured time increase rate, and
determines that the particulate matter having a predetermined amount is deposited on the deposition surface when a value of the calculated resistance is lower than a predetermined threshold.

11. The particulate matter detection system according to claim 7, further comprising:
a control portion configured to determine whether the particulate matter is deposited on the deposition surface,
wherein:
the control portion
measures a time increase rate of the voltage of the capacitor,
calculates a resistance between the pair of electrodes based on the measured time increase rate, and
determines that the particulate matter having a predetermined amount is deposited on the deposition surface when a value of the calculated resistance changes a predetermined time or more.

12. The particulate matter detection system according to claim 7, further comprising:
a switch connected to the capacitor in parallel; and
a control portion configured to control an on-off operation of the switch, wherein:
the particulate matter detection sensor includes a heater configured to burn the particulate matter deposited on the deposition surface and remove the particulate matter; and
the control portion
measures a time increase rate of the voltage of the capacitor after removing the particulate matter by utilizing the heater; and
causes the switch to turn on at a predetermined time interval and periodically discharges the charge stored in the capacitor when the measured time increase rate is lower than a predetermined threshold.

13. The particulate matter detection system according to claim 12, wherein:
the control portion determines that the particulate matter detection sensor is broken when the time increase rate is higher than the threshold.

14. A particulate matter detection system for detecting a particulate matter in exhaust gas, the particulate matter detection system comprising:
a particulate matter detection sensor in which at least one detection portion is provided, the at least one detection portion including
at least one pair of a plurality of electrodes and
a deposition surface which is interposed between the pair of electrodes and which the particulate matter is deposited on;
a capacitor connected to the at least one detection portion in series;
a power supply configured to apply a direct voltage to a series body including the at least one detection portion and the capacitor; and
a voltage measurement portion configured to measure a voltage of the capacitor; wherein:
the plurality of electrodes are arranged at a predetermined distance in the particulate matter detection sensor;
both of the detection portion and the capacitor are provided by the plurality of electrodes;
a plurality of electrode pairs including the pair of electrodes adjacent to each other are provided in the particulate matter deposition sensor; and
each of the electrode pairs has a different capacitance from each other between the pair of electrodes, the capacitances being different from each other.

15. A particulate matter detection system for detecting a particulate matter in exhaust gas, the particulate matter detection system comprising:
a particulate matter detection sensor in which at least one detection portion is provided, the at least one detection portion including
at least one pair of a plurality of electrodes and
a deposition surface which is interposed between the pair of electrodes and which the particulate matter is deposited on;
a capacitor connected to the at least one detection portion in series;
a power supply configured to apply a direct voltage to a series body including the at least one detection portion and the capacitor; and
a voltage measurement portion configured to measure a voltage of the capacitor; wherein:
the plurality of electrodes are arranged at a predetermined distance in the particulate matter detection sensor;
both of the detection portion and the capacitor are provided by the plurality of electrodes
the capacitor includes the pair of electrodes; and
at least one of the electrodes of the capacitor is covered with an insulation layer.

16. The particulate matter detection system according to claim 15, further comprising:
a switch connected to the capacitor in parallel; and
a control portion configured to control an on-off operation of the switch,
wherein:
the control portion is further configured to perform:
an application process of applying a direct voltage of the power supply to the series body,
a discharge process of, after the application process, causing the switch to turn on and discharging charge stored in the capacitor, and
a measurement process of, after the discharge process, causing the switch to turn off and measuring the voltage of the capacitor.

17. The particulate matter detection system according to claim 15, further comprising:
a switch connected to the capacitor in parallel; and
a control portion configured to control an on-off operation of the switch, wherein:
the particulate matter detection sensor includes a heater configured to burn the particulate matter deposited on the deposition surface and remove the particulate matter; and
the control portion is further configured to:
measure a time increase rate of the voltage of the capacitor after removing the particulate matter by utilizing the heater; and
cause the switch to turn on at a predetermined time interval and periodically discharges the charge stored in the capacitor when the measured time increase rate is lower than a predetermined threshold.

18. The particulate matter detection system according to claim 15, further comprising:
a series connector that
includes a resistor and the switch connected to the resistor in series and
is connected to the capacitor in parallel; and
a control portion configured to perform an operation control of the switch,
wherein:
the control portion is further configured to:
periodically switch on-off states of the switch,
measure a voltage drop of the resistor by utilizing the voltage measurement portion, and
determine that a large PM corresponding to the particulate matter having a particle diameter larger than 2.5 µm is deposited on the deposition surface when a time change rate of the voltage drop is higher than a predetermined value.

19. The particulate matter detection system according to claim 15, further comprising:
a control portion configured to determine whether the particulate matter is deposited on the deposition surface, wherein:
the control portion is further configured to:
   measure a time increase rate of the voltage of the capacitor,
   calculate a resistance between the pair of electrodes based on the measured time increase rate, and
   determine that the particulate matter having a predetermined amount is deposited on the deposition surface when a value of the calculated resistance is lower than a predetermined threshold.

20. The particulate matter detection system according to claim 15, further comprising:
a control portion configured to determine whether the particulate matter is deposited on the deposition surface,
wherein:
the control portion is further configured to:
   measure a time increase rate of the voltage of the capacitor,
   calculate a resistance between the pair of electrodes based on the measured time increase rate, and
   determine that the particulate matter having a predetermined amount is deposited on the deposition surface when a value of the calculated resistance changes a predetermined time or more.

* * * * *